(12) United States Patent
Fischer

(10) Patent No.: US 10,690,358 B2
(45) Date of Patent: Jun. 23, 2020

(54) AIR CONDITIONING WITH RECOVERY WHEEL, PASSIVE DEHUMIDIFICATION WHEEL, COOLING COIL, AND SECONDARY DIRECT-EXPANSION CIRCUIT

(71) Applicant: SEMCO LLC, Columbia, MO (US)

(72) Inventor: John C. Fischer, Marietta, GA (US)

(73) Assignee: SEMCO LLC, Columbia, MO (US)

( * ) Notice: Subject to any disclaimer, the term of this patent is extended or adjusted under 35 U.S.C. 154(b) by 14 days.

(21) Appl. No.: 15/616,702

(22) Filed: Jun. 7, 2017

(65) Prior Publication Data

US 2017/0356661 A1 Dec. 14, 2017

Related U.S. Application Data

(60) Provisional application No. 62/347,517, filed on Jun. 8, 2016.

(51) Int. Cl.
| | |
|---|---|
| F24F 3/147 | (2006.01) |
| F24F 3/14 | (2006.01) |
| F24F 3/153 | (2006.01) |
| F24F 12/00 | (2006.01) |

(52) U.S. Cl.
CPC ........... *F24F 3/147* (2013.01); *F24F 3/1423* (2013.01); *F24F 3/153* (2013.01); *F24F 12/002* (2013.01); *F24F 2003/1464* (2013.01); *F24F 2203/1032* (2013.01); *Y02B 30/563* (2013.01)

(58) Field of Classification Search
CPC ....... F24F 2003/1464; F24F 2203/1032; F24F 3/1423; F24F 3/147
See application file for complete search history.

(56) References Cited

U.S. PATENT DOCUMENTS

| | | | |
|---|---|---|---|
| 3,009,684 | A | 11/1961 | Munters |
| 3,144,901 | A | 8/1964 | Meek |
| 3,844,737 | A | 10/1974 | Macriss |
| 4,484,938 | A | 11/1984 | Okamoto |

(Continued)

OTHER PUBLICATIONS

Pinnacle Technical Guide, SEMCO.

(Continued)

*Primary Examiner* — Filip Zec
(74) *Attorney, Agent, or Firm* — Allan Watts

(57) ABSTRACT

Air conditioning units, systems, and methods that control temperature and humidity within a space in a building, for example, using a recovery wheel, a desiccant-based or passive dehumidification wheel, a primary cooling coil; and a secondary direct-expansion refrigeration circuit that includes a secondary circuit compressor, a secondary circuit evaporator coil, and a secondary circuit condenser coil. In various embodiments, the system forms a supply airstream that passes outdoor air first through the recovery wheel, then through the primary cooling coil, then through the secondary circuit evaporator coil, then through the dehumidification wheel, and then to the space. Further, in many embodiments, the system forms an exhaust airstream that passes return air from the space first through the secondary circuit condenser coil, then through the dehumidification wheel, and then through the recovery wheel. In some embodiments, various quantities of heat and moisture are transferred between the two airstreams.

28 Claims, 13 Drawing Sheets

(56) References Cited

U.S. PATENT DOCUMENTS

| | | |
|---|---|---|
| 4,582,129 A | 4/1986 | Yano |
| 4,594,860 A | 6/1986 | Coellner |
| 4,719,761 A | 1/1988 | Cromer |
| 4,723,417 A | 2/1988 | Meckler |
| 4,729,774 A | 3/1988 | Cohen |
| 4,769,053 A | 9/1988 | Fischer |
| 4,903,503 A | 2/1990 | Meckler |
| 4,955,205 A | 9/1990 | Wilkinson |
| 5,170,633 A | 12/1992 | Kaplan |
| 5,176,005 A | 1/1993 | Kaplan |
| 5,181,387 A * | 1/1993 | Meckler .................. F02G 1/043 62/176.1 |
| 5,300,138 A | 4/1994 | Fischer |
| 5,373,704 A | 12/1994 | McFadden |
| 5,401,706 A | 3/1995 | Fischer |
| 5,448,895 A | 9/1995 | Coellner |
| 5,496,397 A | 3/1996 | Fischer |
| 5,517,828 A | 5/1996 | Calton |
| 5,526,651 A | 6/1996 | Worek |
| 5,542,259 A | 8/1996 | Worek |
| 5,551,245 A | 9/1996 | Calton |
| 5,579,647 A | 12/1996 | Calton |
| 5,649,428 A | 7/1997 | Calton |
| 5,660,048 A | 8/1997 | Belding |
| 5,727,394 A | 3/1998 | Belding |
| 5,758,511 A | 6/1998 | Yoho |
| 5,761,915 A | 6/1998 | Rao |
| 5,771,707 A | 6/1998 | Lagacee |
| 5,943,874 A | 8/1999 | Maeda |
| 6,199,388 B1 | 3/2001 | Fischer |
| 6,751,964 B2 | 6/2004 | Fischer |
| 7,886,986 B2 | 2/2011 | Fischer |
| 9,625,222 B2 | 4/2017 | Fischer |
| 2015/0354839 A1* | 12/2015 | Lee .................. F24F 5/001 62/271 |
| 2016/0169544 A1 | 6/2016 | Fischer |

OTHER PUBLICATIONS

Pinnacle Owner's Manual, SEMCO.
Pinnacle Chilled Beam Application Guide, SEMCO.
IAQ, Total Energy Recovery, Passive Dehumidification and Chilled Beam Technologies, SEMCO.
Federal Technology Alert, Two-Wheel Desiccant Dehumidification System, FEMP, US Dept. of Energy, Apr. 1997.
ASHRAE 1989, vol. 95, Part 2, Vancouver, CA, Two-Stage Desiccant Dehumidification in Commercial Building HVAC System, G. Meckler.
PTAB IPR Decision, U.S. Pat. No. 6,199,388, Jul. 16, 2019.

\* cited by examiner

AIR CONDITIONING WITH RECOVERY WHEEL, PASSIVE DEHUMIDIFICATION WHEEL, COOLING COIL, AND SECONDARY DIRECT-EXPANSION CIRCUIT

RELATED PATENT APPLICATIONS

This U.S. non-provisional patent application claims priority to U.S. Provisional Patent Application Ser. No. 62/347,517, filed on Jun. 8, 2016, and has the same title, inventor, and assignee. The contents of the priority provisional patent application are incorporated herein by reference.

FIELD OF THE INVENTION

Various embodiments of this invention relate to air conditioning units, systems, and methods that control temperature and humidity, for example, within a space within a building. Many embodiments transfer heat, moisture, or both, from outdoor air in a supply airstream to an exhaust airstream. Certain embodiments relate to air conditioning units, systems, and methods that include or use a recovery wheel, a passive dehumidification wheel, and a cooling coil.

BACKGROUND OF THE INVENTION

Heating, ventilating, and air-conditioning (HVAC) systems have been used to maintain desirable temperatures and humidity levels within buildings, and buildings have been constructed with ventilation systems, including HVAC systems, to provide comfortable and safe environments for occupants to live and work. To maintain fresh air within buildings and to reduce the level of indoor air contaminants, in many applications, at least a portion of the air handled by ventilation or HVAC systems has been taken from outdoors, while a portion of the indoor air handled by HVAC systems has been exhausted, for example, to outside the building.

In many situations, outside air introduced to the building to replace exhaust air must be cooled or heated before being introduced to the building to provide temperatures within desired parameters, and often must be dehumidified or humidified to keep humidity levels within desired ranges. But adding or removing heat or humidity (moisture) typically involves the expenditure of energy. To reduce the energy required to condition the outside air, recovery wheels and desiccant-based dehumidification wheels, including passive dehumidification wheels, have been used to transfer heat, moisture, or both, between exhaust air and incoming outside air. Examples of the prior art in these areas are described in U.S. Pat. Nos. 4,769,053 and 6,199,388, and U.S. patent application publication number 2004/0000152, all having at least one inventor in common with the subject matter of this document, and all of which are incorporated herein by reference in their entirety. Certain terms, however, may be used differently in the documents that are incorporated by reference, and if any conflicts exist, this document shall govern herein. These prior art documents also describe many of the potential needs and benefits of such systems and the use of recovery wheels.

In addition, cooling coils have been used to cool and dehumidify outdoor air that is introduced to a building, including cooling coils that are cooled with chilled water that has been cooled by one or more chillers. Furthermore, U.S. Pat. No. 6,199,388 describes systems and methods for controlling temperature and humidity that include a recovery wheel, a passive dehumidification wheel, and a cooling coil, wherein the system forms a supply airstream that passes outdoor air first through the recovery wheel, then through the cooling coil, then through the desiccant-based passive dehumidification wheel, and then to the space, and the system forms an exhaust airstream that passes return air from the space first through the desiccant-based passive dehumidification wheel, and then through the recovery wheel. Examples of prior art systems are shown in FIGS. 2 and 4.

Further, chilled beams have been used to cool spaces within buildings. Patent application publication No. 20130199772 describes active and passive chilled beams and is also incorporated herein by reference. Active chilled beams have been used wherein outdoor air is cooled and dehumidified to become supply air, which is delivered to the chilled beams where the supply air is released into the space through slots or nozzles in a manner that causes induction of room air across a cooling coil positioned within the chilled beam, thereby substantially increasing cooling capacity delivered to the space. Lower levels of humidity in the supply air would be beneficial in some such situations because the chilled beams themselves do not remove humidity from the room air and the supply air may be the only source of dehumidification. Further still, in chilled beam applications, humidity levels in the room air can limit the amount of cooling that can be provided through the chilled beams because the chilled beams cannot be cooled below the room air dew point or else condensation will occur on the chilled beams which will drip on the occupants and other contents of the space. Avoiding such condensation is necessary or beneficial in many situations.

Still further, chillers that produce chilled water have been used as an efficient way to provide cooling and dehumidification, particularly for large buildings. In chilled water systems, however, the minimum temperature that the air leaving the cooling coil can reach has been limited by how cold the chilled water can be produced using traditional chiller performance limitations. As a result, the amount of humidity that can be removed from the outdoor air, for example, is limited. Lower levels of humidity in the supply air, however, would be beneficial in some situations, for example, where chilled beams are used. In addition, supply air volume (i.e., flow rate) is often desired to be greater than exhaust air volume to achieve proper building pressurization to prevent infiltration, but in prior art systems, particularly when the imbalance between supply air volume and exhaust air volume is sufficiently high, condensation has occurred within the exhaust airstream, for instance, on the dehumidification wheel or between the dehumidification wheel and the recovery wheel. Avoiding such condensation would be beneficial, if not essential, in many situations. Moreover, in prior art systems, when supply air was cooled in the cooling coil sufficiently to provide the desired level of supply air humidity, supply air temperatures were often colder than desired. Warmer supply air temperatures would be beneficial in such situations. Needs and opportunities for improvement exist for partially or fully providing one or more of these needs or potential benefits. Room for improvement exists over the prior art in these and various other areas that may be apparent to a person of ordinary skill in the art having studied this document.

SUMMARY OF PARTICULAR EMBODIMENTS OF THE INVENTION

This invention provides, among other things, various air conditioning units, systems, and methods that control temperature and humidity, for instance, within a space in a building. Various units and systems, for example, include a recovery wheel, a (e.g., passive) dehumidification wheel, a primary cooling coil, a secondary cooling coil, and a heating coil. Further, in various embodiments, a supply airstream passes outdoor air first through the recovery wheel, then through the primary cooling coil, then through the secondary cooling coil, then through the dehumidification wheel, and then to the space. Still further, in many embodiments, an exhaust airstream passes return air from the space first through the heating coil, then through the dehumidification wheel, and then through the recovery wheel.

Various embodiments provide, for example, as an object or benefit, that they partially or fully address or satisfy one or more of the needs, potential areas for benefit, or opportunities for improvement described herein, or known in the art, as examples. For instance, various embodiments provide for the removal of more moisture from air (e.g., outdoor air), for instance, in comparison with certain alternatives, while removing much of the enthalpy differential between the outdoor and return airstreams using a recovery wheel, a (e.g., passive) dehumidification wheel, and a cooling coil that is cooled with chilled water that has been cooled by one or more chillers. In some embodiments, for example, systems that primarily use chilled water for cooling provide as much dehumidification as prior art 100 percent direct-expansion systems while providing a higher energy efficiency ratio. Further, various embodiments allow for a greater supply air volume (i.e., flow rate) than exhaust air volume to achieve proper building pressurization to prevent infiltration, without forming any or as much condensation within the exhaust airstream between the dehumidification wheel and the recovery wheel. Still further, many embodiments provide for supply air temperatures that are not undesirably cold where such cold temperatures would otherwise have been necessary to obtain desired low levels of humidity, or else the inefficient expenditure of energy to reheat supply air would have been required.

Even further, some embodiments provide dryer supply air than certain prior art alternatives (e.g., for compatibility with chilled beams), provide less risk of condensation or better cooling performance of the chilled beams (e.g., due to a lower dew point within the space), or a combination thereof. Certain embodiments provide, for example, as objects or benefits, for instance, that they improve the performance of active chilled beam system designs. Different embodiments simplify the design and installation of chilled beam systems, reduce the installed cost of the technology, increase energy efficiency, or a combination thereof, as examples. In addition, various other embodiments of the invention are also described herein, and other benefits of certain embodiments may be apparent to a person of ordinary skill in the art.

Specific embodiments include various systems for controlling temperature and humidity within a space in a building. In many embodiments, for example, the system includes a recovery wheel, a desiccant-based dehumidification wheel, a primary cooling coil, and a secondary direct-expansion refrigeration circuit. Further, in various embodiments, the secondary direct-expansion refrigeration circuit includes a secondary circuit compressor, a secondary circuit evaporator coil, and a secondary circuit condenser coil. Still further, in a number of embodiments, the system forms a supply airstream that passes outdoor air first through the recovery wheel, then through the primary cooling coil, then through the secondary circuit evaporator coil, then through the desiccant-based dehumidification wheel, and then to the space. Even further, in various embodiments, the system forms an exhaust airstream that passes return air from the space first through the secondary circuit condenser coil, then through the desiccant-based dehumidification wheel, and then through the recovery wheel.

In some embodiments, the recovery wheel is a total energy recovery wheel includes a desiccant coating, the recovery wheel transfers sensible heat between the outdoor air of the supply airstream and the exhaust airstream, and the recovery wheel transfers moisture between the outdoor air of the supply airstream and the exhaust airstream. Further, in some embodiments, the desiccant-based dehumidification wheel is a passive dehumidification wheel. Further, in a number of embodiments, the system includes a supply fan located in the supply airstream that moves the outdoor air first through the recovery wheel, then through the primary cooling coil, then through the secondary circuit evaporator coil, then through the desiccant-based dehumidification wheel, and then to the space. Still further, many embodiments include an exhaust fan located in the exhaust airstream that moves the return air from the space first through the secondary circuit condenser coil, then through the desiccant-based dehumidification wheel, and then through the recovery wheel.

Some embodiments include a primary chiller that chills cooling water that passes through the primary cooling coil. Some embodiments, however, include a primary direct-expansion refrigeration circuit. In particular embodiments, the primary direct-expansion refrigeration circuit includes the primary cooling coil, for example, which acts as a primary evaporator when operating in a cooling mode. Further, in a number of embodiments, the primary direct-expansion refrigeration circuit includes a primary condensing coil, which acts as a condenser when operating in the cooling mode, and at least one primary compressor. Further still, in some embodiments, the exhaust airstream passes through the primary condensing coil. Even further, in certain embodiments, the return air of the exhaust airstream passes first through the secondary circuit condenser coil, then through the desiccant-based dehumidification wheel, then through the recovery wheel, and then through the primary condensing coil. Even further still, in many embodiments, the primary direct-expansion refrigeration circuit is a heat pump, for example, that both cools and heats the primary cooling coil depending on whether cooling or heating of the space is demanded.

Various embodiments include a partition between the supply airstream and the exhaust airstream. Further, in a number of embodiments, the recovery wheel is located in a first opening in the partition, the desiccant-based dehumidification wheel is located in a second opening in the partition, and, at least adjacent to the partition, the supply airstream and the exhaust airstream travel in substantially parallel directions. Still further, in many embodiments, at least adjacent to the partition, the supply airstream and the exhaust airstream travel in substantially opposite directions. Further still, in various embodiments, the system includes an enclosure, for example, that contains the recovery wheel, the desiccant-based dehumidification wheel, the primary cooling coil, the secondary circuit evaporator coil, the secondary circuit condenser coil, at least part of the supply airstream, at least part of the exhaust airstream, and the partition.

Further, in particular embodiments, the system includes a geothermal direct-expansion refrigeration circuit, for example, that uses a geothermal heat sink as a geothermal condenser in a cooling mode. Still further, in some embodiments, the space includes multiple zones. Further still, in certain embodiments, each of the multiple zones includes at least one zone direct-expansion refrigeration circuit, for example, that includes a zone compressor, a zone indoor air coil, and a zone outdoor heat exchanger.

In some embodiments, the system includes a system controller, for example, that is configured to perform one or more of certain acts, for instance, under certain conditions or to control particular variables. Such acts, conditions, and variables can include, for example, operating the secondary circuit compressor whenever the system is operating in a cooling mode, operating the secondary circuit compressor whenever the system is operating in a dehumidification mode, modulating cooling at the primary cooling coil to control temperature of the space when operating in the cooling mode, modulating cooling at the primary cooling coil to control absolute humidity level or dew point of the supply airstream delivered to the space when operating in the dehumidification mode, or a combination thereof. Further acts, conditions, and variables can include, for example, modulating cooling at the primary cooling coil to control temperature of the supply airstream delivered to the space when operating in the cooling mode, modulating cooling at the primary cooling coil to control absolute humidity level or dew point of the supply airstream delivered to the space when operating in the dehumidification mode, or both. Still further additional acts, conditions and variables can include optimizing the rotational speed of the passive dehumidification wheel to provide more or less reheat energy to the supply airstream, and taking advantage of the increase in return airstream temperature leaving the second stage condensing coil while still delivering the desired level of dehumidification.

Further, some embodiments include a system controller configured to modulate rotational speed of the dehumidification wheel, for example, based on a measured temperature of the supply airstream delivered to the space, to control the temperature of the supply airstream delivered to the space, or both. Still further, some embodiments include a system controller configured to modulate the secondary circuit compressor to adjust reheat capacity at the secondary condenser coil when operating in a cooling mode. Further still, in some embodiments, the system includes a system controller configured to operate the system in an economizer mode in which cooling at the primary cooling coil is turned off and the secondary circuit compressor is operated, for example, to dehumidify the supply airstream with the secondary circuit evaporator coil and, in some embodiments, the desiccant-based dehumidification wheel. Even further, in some embodiments, the system includes a system controller configured to operate the system in a part-load or recirculation mode in which cooling at the primary cooling coil is modulated down or off and cooling at the secondary cooling coil is modulated to dehumidify the supply airstream, for example, using the desiccant-based dehumidification wheel.

Other specific embodiments include various methods, for example, for controlling temperature and humidity within a space in a building. In some embodiments, the method includes simultaneous acts, for example, of operating a secondary circuit compressor, passing outdoor through particular equipment, and passing return air through certain equipment, for example, in a particular order. In many embodiments, the secondary circuit compressor is part of a secondary direct-expansion refrigeration circuit that includes the secondary circuit compressor, a secondary circuit evaporator coil, and a secondary circuit condenser coil. Further, various methods include passing outdoor air first through a recovery wheel, then through a primary cooling coil, then through the secondary circuit evaporator coil, then through a (e.g., passive) dehumidification wheel, and then to the space. Still further, various methods include passing return air from the space first through the secondary circuit condenser coil, then through the (e.g., passive) dehumidification wheel, and then through the recovery wheel.

In some embodiments, the method further includes transferring moisture between the outdoor air and the return air with a desiccant coating on the recovery wheel. Further, in some embodiments, the method includes modulating the secondary circuit compressor, for example, to adjust reheat capacity at the secondary condenser coil, for instance, when operating in a dehumidification mode. Still further, in some embodiments, the method includes condensing moisture out of the outdoor air with the secondary circuit evaporator coil, transferring sensible heat to the return air with the secondary circuit condenser coil, or both. Further still, in some embodiments, the method includes operating a primary chiller that chills cooling water, and passing the cooling water through the primary cooling coil. On the other hand, some embodiments include operating a primary direct expansion refrigeration circuit, for example, that cools the primary cooling coil and that rejects heat through a primary condenser coil. Even further, certain embodiments include passing the return air from the space first through the secondary circuit condenser coil, then through the (e.g., passive) dehumidification wheel, then through the recovery wheel, and then through the primary condenser coil.

Still other specific embodiments include methods (e.g., of controlling temperature and humidity within a space in a building) that include (e.g., simultaneous) acts of transferring various quantities of head and moisture at particular locations within a system and delivering a supply airstream to the space. Various embodiments, for example, include transferring a first quantity of heat from outdoor air entering a supply airstream to an exhaust airstream. Further, a number of embodiments include cooling the supply airstream downstream of the transferring of the first quantity of heat, for example, including condensing a second quantity of moisture from the supply airstream. Still further, various embodiments include transferring a third quantity of heat from the supply airstream to return air entering the exhaust airstream. Further still, in many embodiments, the transferring of the third quantity of heat from the supply airstream takes place in the supply airstream downstream of the cooling of the supply airstream. Even further, in various embodiments, the transferring of the third quantity of heat from the supply airstream includes condensing a fourth quantity of moisture from the supply airstream.

In a number of embodiments, the transferring of the third quantity of heat from the supply airstream to the return air entering the exhaust airstream is performed using a secondary direct-expansion refrigeration circuit. Further, in various embodiments, the secondary direct-expansion refrigeration circuit includes a secondary circuit compressor, a secondary circuit evaporator coil located in the supply airstream, and a secondary circuit condenser coil located in the exhaust airstream. Still further, many embodiments include transferring a fifth quantity of moisture from the supply airstream to the exhaust airstream. Further still, in various embodiments, the transferring of the fifth quantity of moisture from the supply airstream to the exhaust airstream takes place in the supply airstream downstream of the transferring of the third quantity of heat from the supply airstream to the return air entering the exhaust airstream. Even further, in many embodiments, the transferring of the fifth quantity of moisture from the supply airstream to the exhaust airstream takes place in the exhaust airstream downstream of the transferring of the third quantity of heat from the supply airstream to return air entering the exhaust airstream.

Even further still, many embodiments include, in conjunction with the transferring of the fifth quantity of moisture from the supply airstream to the exhaust airstream, transferring a sixth quantity of sensible heat from the exhaust airstream to the supply airstream. Moreover, in a number of embodiments, the transferring of the sixth quantity of sensible heat from the exhaust airstream to the supply airstream takes place in the supply airstream downstream of the transferring of the third quantity of heat from the supply airstream to the return air entering the exhaust airstream. In addition, in many embodiments, the transferring of the sixth quantity of sensible heat from the exhaust airstream to the supply airstream takes place in the exhaust airstream downstream of the transferring of the third quantity of heat from the supply airstream to the return air entering the exhaust airstream. Furthermore, various embodiments include delivering the supply airstream to the space downstream of the transferring of the sixth quantity of sensible heat from the exhaust airstream to the supply airstream. Additionally, in a number of embodiments, the delivering of the supply airstream to the space takes place in the supply airstream downstream of the transferring of the fifth quantity of moisture from the supply airstream to the exhaust airstream. Meanwhile, in various embodiments, the transferring of the first quantity of heat from the outdoor air entering the supply airstream to the exhaust airstream takes place in the exhaust airstream downstream of the transferring of the fifth quantity of moisture from the supply airstream to the exhaust airstream.

In some embodiments, the first quantity of heat includes both sensible and latent heat. Further, in particular embodiments, the act of transferring the first quantity of heat from outdoor air entering the supply airstream to the exhaust airstream further includes transferring a seventh quantity of moisture from the outdoor air entering the supply airstream to the exhaust airstream. Still further, in certain embodiments, the transferring of the seventh quantity of moisture from the outdoor air entering the supply airstream to the exhaust airstream takes place in the exhaust airstream downstream of the transferring of the fifth quantity of moisture from the supply airstream to the exhaust airstream. Even further, in some embodiments, the cooling of the supply airstream downstream of the transferring of the first quantity of heat includes removing an eighth quantity of heat from the supply airstream and rejecting the eighth quantity of heat to the exhaust airstream downstream, for example, of the transferring of the first quantity of heat to the exhaust airstream. Even further still, in some embodiments, the cooling of the supply airstream downstream of the transferring of the first quantity of heat comprises operating a primary direct-expansion refrigeration circuit, for example, that includes at least one primary circuit compressor, a primary circuit evaporator coil located in the supply airstream, and a primary circuit condenser coil located in the exhaust airstream downstream of where the first quantity of heat is transferred to the exhaust airstream.

Further, in some embodiments, the cooling of the supply airstream downstream of the transferring of the first quantity of heat includes removing an eighth quantity of heat from the supply airstream and rejecting the eighth quantity of heat to the exhaust airstream, for example, downstream of the transferring of the first quantity of heat to the exhaust airstream. For example, in a number of embodiments, the the cooling of the supply airstream downstream of the transferring of the first quantity of heat includes operating a primary direct-expansion refrigeration circuit that includes at least one primary circuit compressor, a primary circuit evaporator coil located in the supply airstream, and a primary circuit condenser coil located in the exhaust airstream, for instance, downstream of where the first quantity of heat is transferred to the exhaust airstream.

Figure 1:
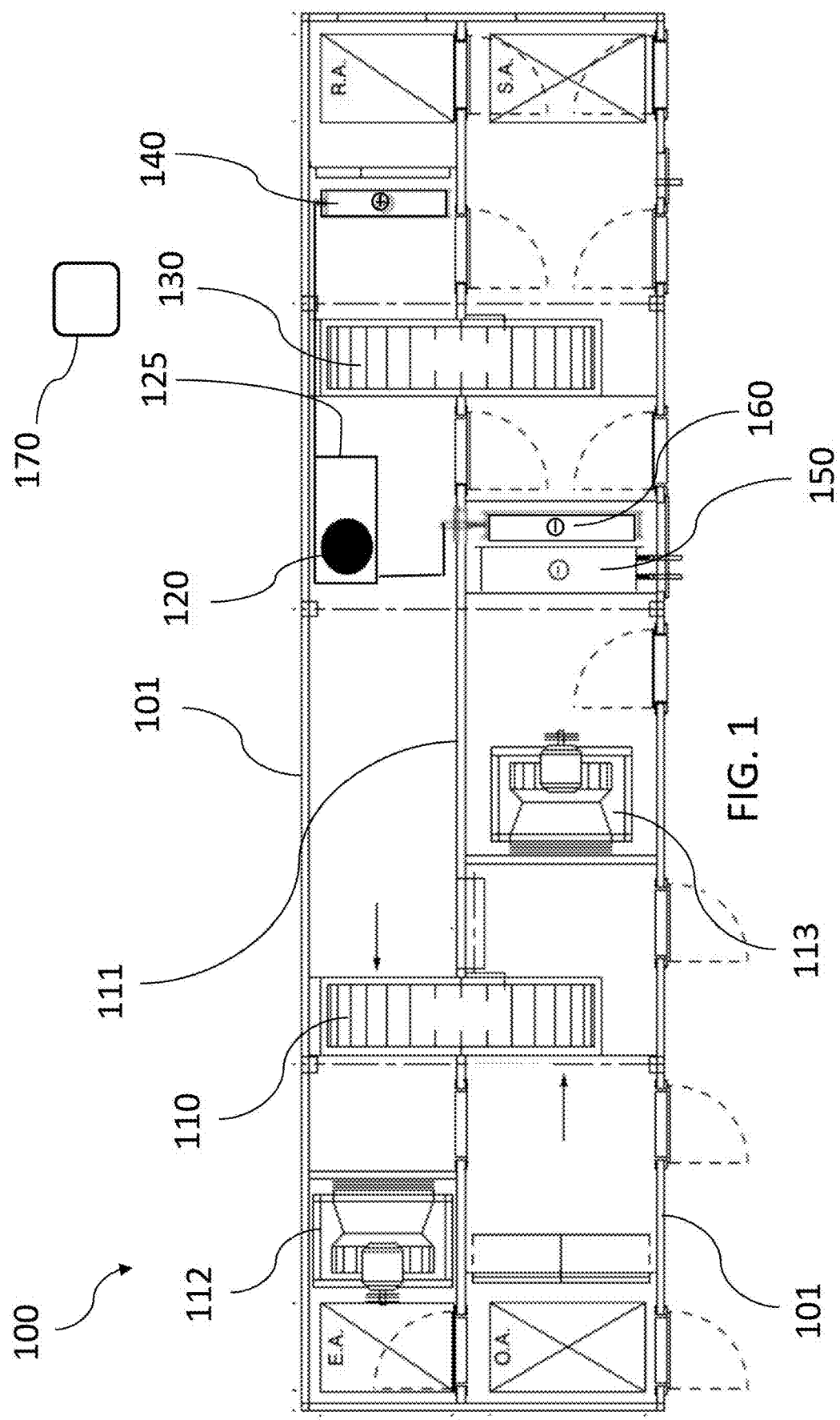
FIG. 1 is a plan view of an example of an air conditioning unit, HVAC unit, or system for controlling temperature and humidity within a space in a building that illustrates a number of embodiments of the invention.

The drawings and written materials provided herewith illustrate, among other things, examples of certain aspects of particular embodiments. Other embodiments, however, may differ. Various embodiments may include aspects shown in the drawings, described in the specification (including the claims), known in the art, or a combination thereof, as examples.

DETAILED DESCRIPTION OF EXAMPLES OF EMBODIMENTS

This patent application describes, among other things, examples of certain embodiments, and certain aspects thereof. Other embodiments may differ from the examples described in detail herein. Various embodiments include systems for controlling temperature and humidity, for example, within a space in a building. Such systems can be or include, for example, air conditioning units or HVAC units. FIGS. 1, 3, 5, 6, 7, 9, 10 and 11 illustrate examples of systems for controlling temperature and humidity, for example, within a space in a building, air conditioning units, or HVAC units. In many embodiments, such a unit or system (e.g., 100, 300, 1000, or 1100) includes a recovery heat exchanger, for example, a recovery wheel (e.g., 110, 310, or 1010), a (e.g., passive) dehumidification wheel (e.g., 130, 330, or 1030), a primary cooling coil (e.g., 150, 350, or 1150), a secondary cooling coil (e.g., 160, 360, or 1060), and a heating coil (e.g., 140, 340, or 1040), for example, a condensing coil.

Figure 3:
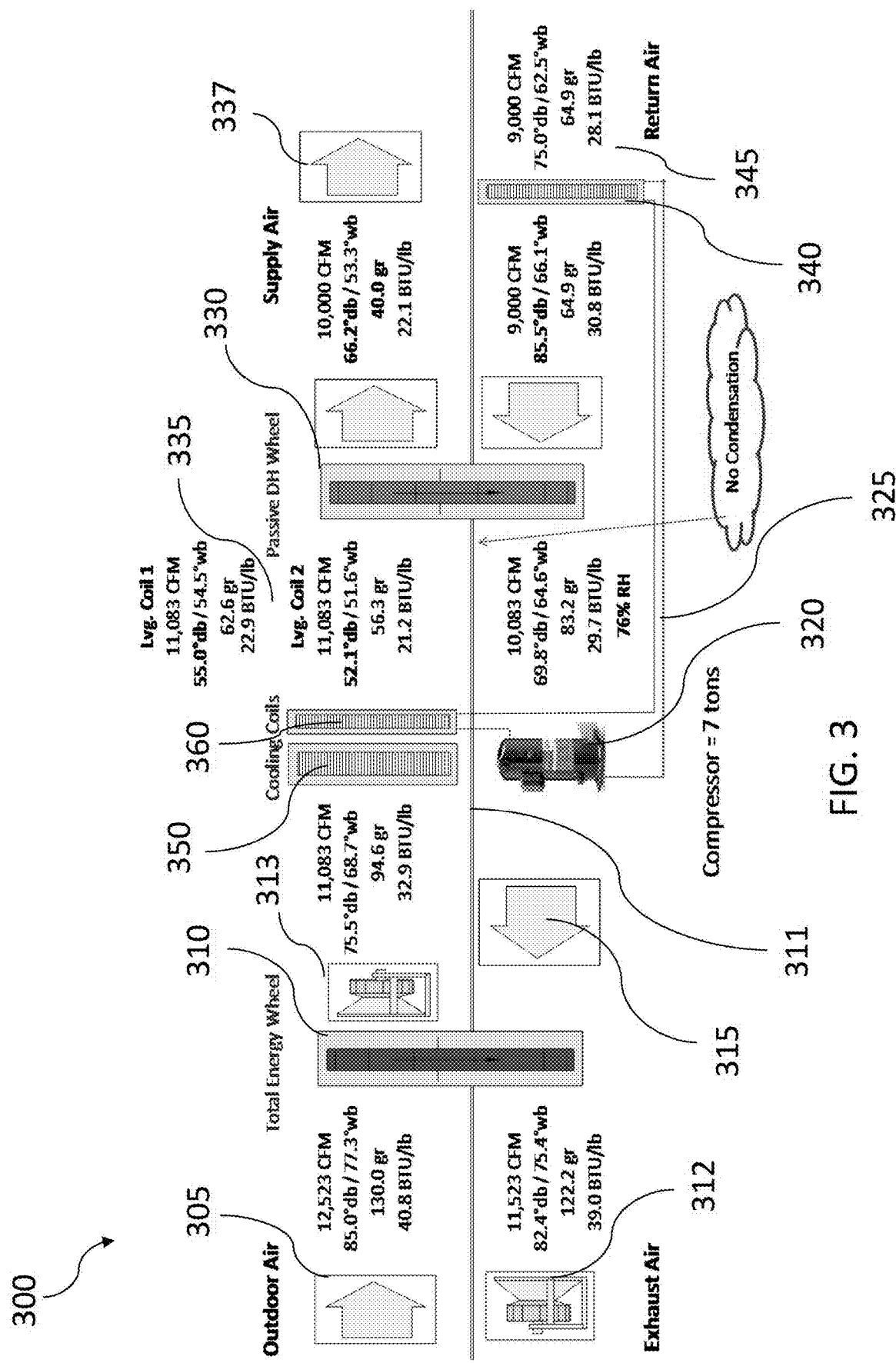
FIG. 3 is a block diagram of an example of an air conditioning unit, HVAC unit, or system for controlling temperature and humidity within a space in a building, that illustrates certain embodiments of the invention, and that illustrates how the prior art problem of condensation within the unit or system (e.g., illustrated in FIG. 2), for example, on the dehumidification wheel, can be overcome while producing supply air with an even lower dew point.

Further, in various embodiments, the unit or system forms a supply airstream (e.g., 335 shown in FIG. 3 or 1135 shown in FIG. 11) that passes outdoor air (e.g., 305) first through the recovery heat exchanger or recovery wheel (e.g., 110 or 310), then through the primary cooling coil (e.g., 150, 350, or 1150), then through the secondary cooling coil (e.g., 160 or 360), then through the dehumidification wheel (e.g., 130 or 330), and then to the space. In many embodiments, the supply airstream (e.g., 335 or 1135) starts as outdoor air (e.g., 305), and then is cooled, dehumidified, and partially reheated, for example, by the recovery heat exchanger or recovery wheel (e.g., 110 or 310), the primary cooling coil (e.g., 150, 350, or 1150), the secondary cooling coil (e.g., 160 or 360), and the dehumidification wheel (e.g., 130 or 330) to become supply air (e.g., 337) that is delivered to the space. Still further, in a number of embodiments, the system (e.g., 300 or 1100) forms an exhaust airstream (e.g., 315 or 1115) that passes exhaust air or return air (e.g., 345 or 1145), for example, from the space, first through the heating coil (e.g., 140 or 340, for example, the secondary condensing coil), then through the dehumidification wheel (e.g., 130 or 330), and then through the recovery wheel (e.g., 110 or 310), for example. In this context, the words "first" and "then" are used to describe the order in which a particular portion of air, of many such portions, passes through various pieces of equipment in the particular embodiment described. It should be understood, however, that different portions of the air pass through these different pieces of equipment simultaneously. Further, where an airstream is described herein as passing through various pieces of equipment in a particular order, it should be understood that different parts of the airstream may be passing through the various pieces of equipment at the same time, but that the order in which a particular portion of air passes through the various pieces of equipment is what is being described.

In different embodiments, the heating coil (e.g., 140 or 340) is or includes a waste-heat heating coil (e.g., a condensing coil for an air conditioning unit or cycle, for instance, 125 or 325). Further, many embodiments include a secondary direct-expansion refrigeration circuit (e.g., 125 or 325), for instance, that includes (e.g., among other things) a secondary direct-expansion refrigeration circuit compressor (e.g., 120, 320, or 1020), a secondary direct-expansion refrigeration circuit evaporator coil (e.g., 160 or 360), a secondary direct-expansion refrigeration circuit condenser coil (e.g., 140 or 340), or a combination thereof. In some embodiments, for example, the trim coil or secondary cooling coil is or includes the secondary direct-expansion refrigeration circuit evaporator coil (e.g., 160 or 360). Still further, in some embodiments, the heating coil is or includes the secondary direct-expansion refrigeration circuit condenser coil (e.g., 140 or 340), for example. Heat from the condenser of an air conditioning circuit that is used primarily for cooling is an example of waste heat, but in some other embodiments, other sources of waste heat can be used. Further, in some embodiments, a direct-expansion refrigeration circuit can reject heat to a location other than to the return air (e.g., 345 or 1145) or exhaust airstream (e.g., 315 or 1115), such as to outdoor air outside the building or to a geothermal heat sink, as examples. But in many such embodiments, a remote condensing section is required and it may be necessary to route refrigerant lines a considerable distance to the condenser. Embodiments that include a secondary direct-expansion refrigeration circuit (e.g., 125 or 325) with a secondary direct-expansion refrigeration circuit condenser coil (e.g., 140 or 340) that rejects heat to the return air (e.g., 345 or 1145) or exhaust airstream (e.g., 315 or 1115) can allow for much shorter refrigerant lines. Further still, in a number of embodiments, the dehumidification wheel (e.g., 130 or 330) is a desiccant-based or passive dehumidification wheel, or both. In some embodiments, bypass dampers are provided, for example, for the dehumidification wheel, to bypass the wheel when the wheel is not needed.

In various embodiments, the system (e.g., 100, 300, or 1100) forms a supply airstream (e.g., 335 or 1135) that passes outdoor air (e.g., 305), for example, first through the recovery heat exchanger or recovery wheel (e.g., 110 or 310), then through the primary cooling coil (e.g., 150, 350, or 1150), then through the secondary direct-expansion refrigeration circuit evaporator coil (e.g., 160 or 360), then through the dehumidification wheel (e.g., 130 or 330), and then to the space. Even further, in many embodiments, the system (e.g., 100, 300, or 1100) forms an exhaust airstream (e.g., 315 or 1115) that passes return air (e.g., 345 or 1145) from the space first through the secondary direct-expansion refrigeration circuit condenser coil (e.g., 140 or 340), then through the dehumidification wheel (e.g., 130 or 330), and then through the recovery heat exchanger or recovery wheel (e.g., 110 or 310). In a number of embodiments, passing the return air (e.g., 345 or 1145) from the space first through heating coil (e.g., 140 or 340) or the secondary direct-expansion refrigeration circuit condenser coil (e.g., 140 or 340), and then through the (e.g., desiccant-based) dehumidification wheel (e.g., 130 or 330) preheats the exhaust airstream (e.g., 315 or 1115) or return air (e.g., 345 or 1145) entering the dehumidification wheel (e.g., 130 or 330) and reduces the relative humidity of the exhaust airstream (e.g., 315 or 1115) that passes through the dehumidification wheel (e.g., 130 or 330), which then removes moisture from the dehumidification wheel (e.g., 130 or 330) more effectively. In some embodiments, this can result in an improvement in dehumidification capacity (e.g., of 10 to 25 percent) with, in some embodiments, the same or similar temperature of the supply airstream (e.g., 335 or 1135) leaving the secondary cooling coil (e.g., 160 or 360) or secondary direct-expansion refrigeration circuit (e.g., 125 or 325) evaporator coil (e.g., 160 or 360).

In many embodiments, the recovery heat exchanger is a recovery wheel (e.g., 110 or 310). In other embodiments, however, the recovery heat exchanger is a plate-type air to air heat exchanger, as an example, or a different type of heat exchanger. Where a recovery wheel is described herein, other embodiments utilize instead a recovery heat exchanger generally, which can be a recovery wheel (e.g., 110 or 310), a plate-type air to air heat exchanger, or a different type of heat exchanger. Further, where a recovery wheel is described herein, a plate-type air to air heat exchanger is specifically contemplated in other particular embodiments. In a number of embodiments, when operating in a cooling mode, the recovery wheel (e.g., 110 or 310) transfers sensible heat from the outdoor air (e.g., 305) of the supply airstream (e.g., 335 or 1135) to the exhaust airstream (e.g., 315 or 1115). Further, in some embodiments, the recovery wheel (e.g., 110 or 310) is a total energy recovery wheel, for example, that includes a desiccant coating. In various embodiments, under appropriate conditions (e.g., when operating in a cooling mode with sufficient outdoor air humidity, or when operating in a dehumidification mode), the recovery wheel (e.g., 110 or 310) transfers moisture from the outdoor air (e.g., 305) of the supply airstream (e.g., 335 or 1135) to the exhaust airstream (e.g., 315 or 1115).

In a number of embodiments, the system (e.g., 100, 300, or 1100) includes a supply fan (e.g., 113, 313, or 1113), for example, located in the supply airstream (e.g., 335 or 1135), that moves the outdoor air (e.g., 305) first through the recovery wheel (e.g., 110 or 310), then through the primary cooling coil (e.g., 150, 350, or 1150), then through the secondary cooling coil or secondary direct-expansion refrigeration circuit evaporator coil (e.g., 160 or 360), then through the (e.g., desiccant-based, passive, or both) dehumidification wheel (e.g., 130 or 330), and then to the space. In particular embodiments, for example, the supply fan is located in the supply airstream, for example, between the dehumidification wheel and the space. In other embodiments, as another example (e.g., as shown), the supply fan (e.g., 113, 313, or 1113) is in the supply airstream (e.g., 335 or 1135) between the recovery wheel (e.g., 110 or 310) and the primary cooling coil (e.g., 150, 350, or 1150). Further, in various embodiments, the system (e.g., 300) includes an exhaust fan (e.g., 312), for example, located in the exhaust airstream (e.g., 315), that moves the return air (e.g., 345) from the space first through the heating coil or (e.g., secondary direct-expansion refrigeration circuit condenser coil (e.g., 340), then through the dehumidification wheel (e.g., 330), and then through the recovery wheel (e.g., 310). In some embodiments, for example, the exhaust fan (e.g., 312) is located in the exhaust airstream (e.g., 315) downstream of the recovery wheel (e.g., 310). In this context, as used herein, "downstream" is relative to the direction of flow of the exhaust airstream (e.g., 315). FIG. 1 also shows exhaust fan 112, which is similarly located.

In many embodiments, the system (e.g., 100 or 300) further includes a primary chiller (not shown), for example, that chills cooling water that passes through the primary cooling coil (e.g., 150 or 350). In some embodiments, the primary chiller includes multiple chillers. Moreover, in various embodiments, the primary chiller is separate from the secondary direct-expansion refrigeration circuit system (e.g., 125 or 325) or compressor (e.g., 120 or 320), or from both.

Further, various embodiments further include a partition (e.g., 111 or 311 shown in FIGS. 1, 3, 6, and 11), for instance, (e.g., with reference to FIGS. 3 and 11) between the supply airstream (e.g., 335 or 1135) and the exhaust airstream (e.g., 315 or 1115). In a number of embodiments, for example, the recovery wheel (e.g., 310) is located in a first opening (e.g., 601 shown in FIG. 6) in the partition (e.g., 311), the (e.g., passive) dehumidification wheel (e.g., 330) is located in a second opening (e.g., 602) in the partition (e.g., 311), or both (e.g., as shown). In various embodiments, the partition (e.g., 111 or 311) is a wall, for example, within the system or air conditioning or HVAC unit (e.g., 100, 300, or 1100), that separates the two airstreams. In some embodiments, for example, the partition (e.g., 111 or 311) is sheet metal. In particular embodiments, for instance, the partition (e.g., 111 or 311) is insulated or includes a layer of insulation.

In various embodiments, at least adjacent to the partition (e.g., 111 or 311), the supply airstream (e.g., 335 or 1135) and the exhaust airstream (e.g., 315 or 1115) travel in substantially parallel directions (e.g., as shown). Further, in many embodiments, at least adjacent to the partition (e.g., 111 or 311), the supply airstream (e.g., 335 or 1135) and the exhaust airstream (e.g., 315 or 1115) travel in substantially opposite directions (e.g., as shown). As used herein, when referring to an angle, "substantially" means to within 10 degrees. In some embodiments, however, at least adjacent to the partition (e.g., 111 or 311), the supply airstream (e.g., 335 or 1135) and the exhaust airstream (e.g., 315 or 1115) travel in parallel directions, in opposite directions, or both, to within 1, 2, 3, 5, 7, 15, 20, or 25 degrees, as other examples. Moreover, as used herein "parallel directions" includes "opposite directions" (e.g., parallel but opposite).

Figure 11:
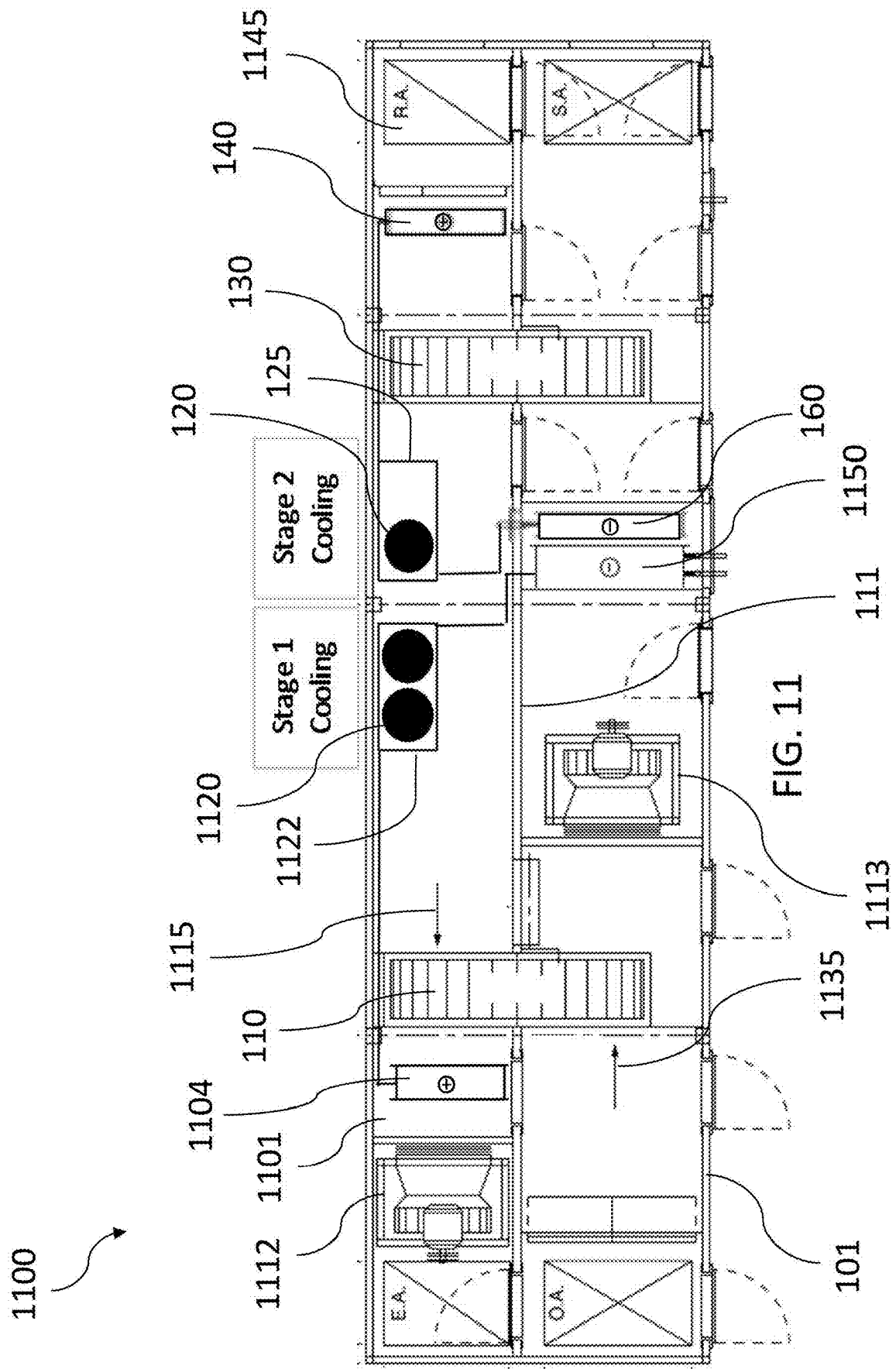
FIG. 11 is a plan view of an example of an air conditioning unit, HVAC unit, or system for controlling temperature and humidity within a space in a building that illustrates several embodiments of the invention having a primary direct expansion refrigeration circuit with the condenser coil located in the exhaust airstream.

Still further, in various embodiments, the system or unit further includes an enclosure (e.g., an air conditioning unit enclosure), for example, that contains the recovery wheel (e.g., 110 or 310), the dehumidification wheel (e.g., 130 or 330), the primary cooling coil (e.g., 150, 350, or 1150), the secondary cooling coil (e.g., 160 or 360), the secondary direct-expansion refrigeration circuit (e.g., 125 or 325), the secondary circuit evaporator coil (e.g., 160 or 360), the heating coil or secondary direct-expansion refrigeration circuit condenser coil (e.g., 140, 340, or 1140), at least part of the supply airstream (e.g., 335 or 1135), at least part of the exhaust airstream (e.g., 315 or 1115), or a combination (e.g., all) thereof (e.g., as shown). FIGS. 1 and 11, for example, show enclosure 101. In some embodiments, for further example, the enclosure (e.g., 101) contains the partition (e.g., 111). In many embodiments, for example, the enclosure (e.g., 101) is or includes sheet metal and has, for example, multiple doors or removeable access panels for access therein (e.g., as shown). In particular embodiments, for instance, the enclosure (e.g., 101) is insulated (e.g., in whole or in part) or includes a layer of insulation. In certain embodiments, part or all of the enclosure is part of the building (e.g., walls, floor, etc.). Further still, in various embodiments, the partition (e.g., 111) extends to or connects to the enclosure (e.g., 101), for instance, as shown. Even further, in some embodiments, the enclosure (e.g., 101) further contains the supply fan (e.g., 113 shown in FIG. 1), the exhaust fan (e.g., 112), or both (e.g., as shown). Even further still, in some embodiments, the enclosure (e.g., 101) further contains the secondary direct-expansion refrigeration circuit (e.g., 125), for example, including the secondary direct-expansion refrigeration circuit compressor (e.g., 120). In a number of embodiments, the secondary direct-expansion refrigeration circuit compressor (e.g., 120 or 320) is located in the exhaust airstream (e.g., 315 or 1115).

In addition, in some embodiments, the system or unit includes a primary heating coil, for instance, located in the supply airstream, for example, for heating the supply airstream when operating the system in a heating mode. In some embodiments, the primary heating coil is in addition to the primary cooling coil (e.g., 150, 350, or 1150). In a number of embodiments, for example, the enclosure further contains the primary heating coil. Moreover, in many embodiments, the system (e.g., for controlling temperature and humidity within a space in a building) further includes ductwork, for example, supply ductwork that delivers the supply airstream (e.g., 335 or 1135), for example, from the dehumidification wheel (e.g., 130 or 330), or the supply air (e.g., 337) to the space. In various embodiments, the ductwork is outside of the enclosure (e.g., 101), connects to the enclosure, or both, as examples. Further, in a number of embodiments, the space includes multiple zones. Still further, in some embodiments the system includes supply ductwork that delivers the supply airstream (e.g., 335 or 1135) to (e.g., each of) the multiple zones. Even further, in many embodiments, the ductwork includes return ductwork, for example, that delivers the return air (e.g., 345 or 1145) from the space or zones to become the exhaust airstream (e.g., 315 or 1115).

In various embodiments, the system (e.g., for controlling temperature and humidity within a space in a building) further includes multiple chilled beams, for example, located within the space, for instance, within the zones. Further, in a number of embodiments, the system includes a main chiller that chills cooling water that passes through the multiple chilled beams. Still further, in some embodiments, the cooling water from the main chiller also passes through the primary cooling coil (e.g., 150 or 350), for example, in parallel, or in series (e.g., first through the primary cooling coil (e.g., 150 or 350). In some embodiments, the primary chiller and the main chiller, as described herein, are the same chiller (or chillers) while in other embodiments, the primary chiller and the main chiller are separate chillers (or sets of chillers). Even further, in various embodiments, the multiple chilled beams (e.g., located within the space or zones) are active chilled beams. Further still, in a number of embodiments, the supply airstream (e.g., 335 or 1135) that passes to the space is delivered to the multiple chilled beams located within the space. Even further still, in some embodiments, the supply airstream (e.g., 335 or 1135) that passes to the space induces room air in the space over or across the cooling coils within the multiple chilled beams, for example, enhancing cooling capacity delivered by the multiple chilled beams. As used herein, in this context, "over" includes along and in contact with. In some embodiments, the room air moves through passageways or between fins of the chilled beams, as examples.

In some embodiments in which the space includes multiple zones, each of the multiple zones includes at least one of the multiple chilled beams (e.g., that are located within the space). Further, in certain embodiments, the system (e.g., for controlling temperature and humidity within a space in a building) further includes a chilled water zone pump, for example, for each of the multiple zones. In a number of embodiments, for instance, the chilled water zone pump circulates chilled water through at least one of the multiple chilled beams that are located within that zone (i.e., the zone that the particular chilled water zone pump serves). Still further, in certain embodiments, the system (e.g., for controlling temperature and humidity within a space in a building) further includes a chilled water temperature sensor, for example, for each of the multiple zones, that measures temperature of the chilled water that passes through the (e.g., at least one of the multiple) chilled beams that are located within that zone (e.g., the zone that the particular chilled water temperature sensor serves). Even further, a number of embodiments further include a chilled water control valve, for instance, for each of the multiple zones, that passes chilled water from a chilled water supply header into the (e.g., at least one of the multiple) chilled beams, for example, that are located within that zone (e.g., the zone that the particular chilled water control valve serves).

Various embodiments include a digital controller, for example, for each of the multiple zones, for instance, that controls flow of chilled water from the chilled water supply header into the (e.g., at least one of the multiple) chilled beams, for example, that are located within that zone. In some embodiments, the digital controller (e.g., for each of the multiple zones) limits flow of chilled water from the chilled water supply header into the (e.g., at least one of the multiple) chilled beams, for instance, that are located within that zone (e.g., the zone that the particular digital controller serves). In particular embodiments, for example, the digital controller (e.g., for each of the multiple zones) limits flow of chilled water from the chilled water supply header into the (e.g., at least one of the multiple) chilled beams, for instance, to avoid formation of condensation on the (e.g., at least one of the multiple) chilled beams, for example, that are located within that zone. For example, in a number of embodiments, the controller limits flow of chilled water from the chilled water supply header into the (e.g., at least one of the multiple) chilled beams to control temperature of the chilled beam(s), for example, to avoid having part of the beam(s) drop below the dew point temperature within the space. In various embodiments, for example, the digital controller (e.g., for each of the multiple zones) controls flow of chilled water, for example, from the chilled water supply header, into the (e.g., at least one of the multiple) chilled beams (e.g., that are located within that zone) based on or in response to a measurement of the room air humidity or dew point within the zone, for instance, at a humidistat located with that zone. Further, in various embodiments, the digital controller (e.g., for each of the multiple zones) controls flow of chilled water, for example, from the chilled water supply header, into the (e.g., at least one of the multiple) chilled beams (e.g., that are located within that zone) to control room air temperature within that zone, for example, in response to a measurement of the room air temperature within the zone for instance, at a thermostat located with that zone (e.g., in addition to controlling temperature to prevent condensation).

Further, certain embodiments (e.g., of a system for controlling temperature and humidity within a space in a building) include a geothermal heat sink. In some embodiments, for example, heat from the primary cooling coil (e.g., 150, 350, or 1150) is rejected to the geothermal heat sink. Still further, some embodiments (e.g., of a system for controlling temperature and humidity within a space in a building) include a direct-expansion refrigeration circuit, for instance, that uses the geothermal heat sink as a geothermal condenser in a cooling mode. Even further, in various embodiments, the direct-expansion refrigeration circuit uses the geothermal heat sink as an evaporator in a heating mode. Further still, in some embodiments, the direct-expansion refrigeration circuit is a primary direct-expansion refrigeration circuit, or the system (e.g., 100 or 300) includes a primary direct-expansion refrigeration circuit that uses the primary cooling coil (e.g., 150 or 350) as a primary evaporator. In some embodiments, for example, the primary direct-expansion refrigeration circuit is a heat pump that both cools and heats the primary cooling coil (e.g., 150, 350, or 1150) depending on whether cooling or heating of the space is demanded (e.g., by at least one thermostat located within the space). In a number of embodiments, when the system (e.g., 100, 300, or 1100) is operating in a heating mode, the secondary direct-expansion refrigeration circuit (e.g., 125 or 325) is turned off and when the system) is operating in a cooling mode, the secondary direct-expansion refrigeration circuit (e.g., 125 or 325) is turned on.

Even further, in some embodiments, the secondary direct-expansion refrigeration circuit evaporator coil (e.g., 160 or 360), the secondary direct-expansion refrigeration circuit condenser coil (e.g., 140 or 340), or both, are not in the geothermal well field. Consequently, in a number of embodiments, since the cost of drilling geothermal wells can be based on the amount (e.g., tons) of cooling required, having the secondary direct-expansion refrigeration circuit evaporator coil (e.g., 160 or 360), the secondary direct-expansion refrigeration circuit condenser coil (e.g., 140 or 340), or both, not in the geothermal well field, can reduce the cost of installation of the geothermal well field, for example, in comparison with other geothermal alternatives that provide equivalent performance (e.g., cooling, humidity removal, or both). Even further still, in various embodiments, using a geothermal heat sink or source can be beneficial (e.g., in addition to rejecting or obtaining heat at a preferable temperature) because the air conditioning or HVAC unit can be installed indoors (e.g., entirely or to a greater extent) since there are no condensing (e.g., in a cooling mode) fans that need access to outdoor air.

In various embodiments, the primary cooling coil (e.g., 150, 350, or 1150) is larger, transfers more heat or enthalpy, or has more rows than the secondary cooling coil or secondary direct-expansion refrigeration circuit evaporator coil (e.g., 160 or 360). In some embodiments, for example, the primary cooling coil (e.g., 150, 350, or 1150) has at least three times as many rows as the secondary cooling coil or secondary direct-expansion refrigeration circuit (evaporator coil (e.g., 160 or 360). In various embodiments, for further examples, the primary cooling coil (e.g., 150, 350, or 1150) has at least 1.5, 2, 2.5, 3.5, 4, 4.5 5, 6, 7, or 8 times as many rows as the secondary cooling coil or secondary direct-expansion refrigeration circuit (evaporator coil (e.g., 160 or 360). Further, in particular embodiments, the primary cooling coil (e.g., 150, 350, or 1150) has six to eight rows. In other embodiments, the primary cooling coil (e.g., 150, 350, or 1150) has four to ten rows, four to twelve rows, six to ten rows, six to twelve rows, four or more rows, five or more rows, six or more rows, seven or more rows, eight or more rows, or ten or more rows, as other examples. In comparison, in some embodiments, the secondary cooling coil or secondary direct-expansion refrigeration circuit evaporator coil (e.g., 160 or 360) has one row. Still further, in some embodiments, the heating coil or secondary direct-expansion refrigeration circuit condenser coil (e.g., 140 or 340) has one row. In other embodiments, however, as further examples, the secondary cooling coil or secondary direct-expansion refrigeration circuit (e.g., 125 or 325) evaporator coil (e.g., 160 or 360) has two or three rows, the heating coil (e.g., 140 or 340) or secondary direct-expansion refrigeration circuit (e.g., 125 or 325) condenser coil (e.g., 140 or 340) has two or three rows, or a combination thereof.

Even further, in various embodiments, the primary cooling coil (e.g., 150, 350, or 1150) transfers more heat (e.g., at design or maximum capacity, or on average) than the secondary cooling coil or secondary direct-expansion refrigeration circuit evaporator coil (e.g., 160 or 360) transfers (e.g., at design or maximum capacity or on average). For example, in some embodiments, the primary cooling coil (e.g., 150, 350, or 1150) transfers more than twice as much heat at maximum capacity than the secondary cooling coil or secondary direct-expansion refrigeration circuit evaporator coil (e.g., 160 or 360) transfers at maximum capacity. In other embodiments, the primary cooling coil (e.g., 150, 350, or 1150) transfers more than 1.5, 1.75, 2.25, 2.5, 3, 4, 5, 6, 7, 8, 9, 10, or 12 times as much heat (e.g., at design or maximum capacity or on average) than the secondary cooling coil or secondary direct-expansion refrigeration circuit evaporator coil (e.g., 160 or 360) transfers (e.g., at design or maximum capacity or on average), as further examples.

In various embodiments (e.g., of a system for controlling temperature and humidity within a space in a building) in which the space includes multiple zones, (e.g., each of) the multiple zones include a (e.g., at least one) zone direct-expansion refrigeration circuit, for example, that includes a zone compressor, a zone indoor air coil, and a zone outdoor heat exchanger, for example, among other things. In some embodiments, for example, one or more zone direct-expansion refrigeration circuits are used instead of chilled beams in some or all of the zones. Further, in some embodiments, (e.g., each or at least one) zone direct-expansion refrigeration circuit is or includes a heat pump that both cools and heats the space (e.g., depending on whether cooling or heating is demanded by the thermostat), for example, that both cools and heats a single zone of the multiple zones. Still further, in particular embodiments, each zone outdoor heat exchanger is a geothermal heat exchanger. Even further, in certain embodiments, the direct-expansion refrigeration circuit described herein, for example, that uses the geothermal heat sink as a geothermal condenser in a cooling mode that uses the geothermal heat sink as an evaporator in a heating mode, or both, includes one or more of the zone direct-expansion refrigeration circuits.

In various embodiments, the secondary direct-expansion refrigeration circuit (e.g., 125 or 325) is energized, for example, under control of the system controller (e.g., 170 shown in FIG. 1), for instance, to ensure that condensation does not occur during low airflow conditions on the return air (e.g., 345 or 1145) side, for example, on the partition (e.g., 111 or 311), for instance, resulting from pressurization needs or variable volume operation, by increasing the relative humidity entering and leaving the return air (e.g., 345 or 1145) side of the dehumidification wheel (e.g., 130 or 330). In many embodiments, for example, the supply airstream (e.g., 335 or 1135) is greater (e.g., in volumetric flowrate) than the exhaust airstream (e.g., 315 or 1115), for example, to pressurize the building, for instance, to prevent infiltration through the building exterior of (e.g., warm, humid, or both) outdoor air into the space. In various embodiments, the flow rates can be adjusted by changing the speed of the fans (e.g., 112, 312, 113, 313 or a combination thereof), for example. Various embodiments described herein allow for a wide imbalance between the supply airstream (e.g., 335 or 1135) and the exhaust airstream (e.g., 315 or 1115) without causing (e.g., any or as much) condensation formation within the exhaust airstream or, in many embodiments, limiting dehumidification performance (e.g., passive dehumidification wheel performance). Moreover, in various embodiments, the system controller (e.g., 170) is configured to operate or energize the secondary direct-expansion refrigeration circuit compressor (e.g., 120 or 320) to ensure that condensation does not occur during low airflow conditions on the return air or exhaust airstream side resulting from pressurization needs or variable volume operation. In a number of embodiments, condensation is avoided by decreasing the relative humidity entering and leaving the exhaust airstream (e.g., 315 or 1115) side of the dehumidification wheel (e.g., 130 or 330).

Still further, in some embodiments, the system (e.g., 100, 300, or 1100) includes a system controller (e.g., controller 170 shown in FIG. 1), for example, in particular embodiments, configured to operate the secondary direct-expansion refrigeration circuit compressor (e.g., 120 or 320) when (e.g., whenever) the system (e.g., 100, 300, or 1100) is operating in a cooling mode. As used herein, a controller being "configured", to perform one or more acts under one or more conditions means that the controller contains software that, when executed, or circuits that when energized, cause the controller to direct equipment to perform the one or more acts when the one or more conditions occur. Further, as used herein, a controller being "configured", to perform one or more acts to accomplish a particular result means that the controller contains software that, when executed, or circuits that when energized, cause the controller to direct the equipment in a manner that accomplishes the particular result. Further still, as used herein, a controller being "configured", to perform one or more acts to control a particular variable means that the controller contains software that, when executed, or circuits that when energized, cause the controller to direct the equipment in a manner that controls the particular variable. For example, in various embodiments, the system controller (e.g., 170) is configured to modulate cooling at the primary cooling coil (e.g., 150, 350, or 1150) to control temperature of the space when operating in a cooling mode, when operating in a dehumidification mode, or both.

Still further, in many embodiments, the system controller (e.g., 170) is configured to modulate cooling at the primary cooling coil (e.g., 150, 350, or 1150) to control temperature of the supply airstream (e.g., 335 or 1135) delivered to the space when operating in a cooling mode, when operating in a dehumidification mode, or both. In some embodiments, for example, the temperature of the supply airstream (e.g., 335 or 1135) delivered to the space is limited to a minimum temperature (e.g., even if the temperature of the space is greater than the thermostat set point) to avoid delivering air that is uncomfortably cold to the space or zones. Moreover, in some embodiments, the system controller (e.g., 170) is configured to modulate cooling at the primary cooling coil (e.g., 150, 350, or 1150) to control humidity, for example, absolute humidity, or dew point, of the space or supply air when operating in a cooling mode, when operating in a dehumidification mode, or both. For example, in some embodiments, the system controller (e.g., 170) is configured to modulate cooling at the primary cooling coil (e.g., 150, 350, or 1150) to control absolute humidity level or dew point of the supply airstream delivered to the space when operating in the cooling mode or the dehumidification mode. Further, in some embodiments, the secondary cooling circuit (e.g., 125 or 325) is modulated (e.g., as well) to control absolute humidity level or dew point of the supply airstream delivered to the space, for example, when operating in the cooling mode or the dehumidification mode.

Even further, in some embodiments, when the supply airstream (e.g., 335 or 1135) delivered to the space is uncomfortably cold, or approaches such a temperature, the controller (e.g., 170) or software increases the speed of the (e.g., passive) dehumidification wheel (e.g., 130 or 330) is increased (e.g., via a variable speed drive or variable speed control) to increase the amount of sensible heat that is transferred from the return airstream (e.g., 345 or 1145) or the exhaust airstream (e.g., 315 or 1115) to the supply airstream (e.g., 335 or 1135) to heat the supply airstream. Further, in some embodiments, the secondary direct-expansion refrigeration circuit condenser coil (e.g., 140 or 340), when the secondary direct-expansion refrigeration circuit is operated, raises the temperature of the return airstream, thereby providing more reheat capacity for the modulating dehumidification wheel (e.g., 130 or 330) when in the reheat mode.

Conversely, in some embodiments, when the space is dry, the thermostat set point is exceeded (e.g., too warm when operating in a cooling mode), or both, the speed of the dehumidification wheel (e.g., 130 or 330) is decreased (e.g., slowed or even stopped, for example, by controller 170) to decrease the amount of sensible heat that is transferred from the exhaust airstream (e.g., 315 or 1115) to the supply airstream (e.g., 335 or 1135). In a number of embodiments, a controller (e.g., 170) or one or more control algorithms (e.g., within controller 170) determine and control the speed of the dehumidification wheel (e.g., 130 or 330), for example, to control the amount of sensible heat, moisture, or both, that is transferred from the return airstream (e.g., 345 or 1145) or the exhaust airstream (e.g., 315 or 1115) to the supply airstream (e.g., 335 or 1135).

In a number of embodiments, the system controller (e.g., 170) is configured to modulate the rotational speed of the dehumidification wheel (e.g., 130 or 330), for example, based on a measured temperature of the supply airstream delivered to the space (e.g., of supply air 337). Further, in a number of embodiments, the system controller (e.g., 170) is configured to modulate the rotational speed of the dehumidification wheel (e.g., 130 or 330) specifically to control the temperature of the supply airstream delivered to the space. In various embodiments, the system controller (e.g., 170) is configured to modulate the rotational speed of the dehumidification wheel (e.g., 130 or 330) while the secondary circuit or secondary circuit compressor is operating, for example. In a number of embodiments, heat from the secondary condenser coil increases the impact that a change in dehumidification wheel speed has on temperature of the supply air.

Even further, in various embodiments, the secondary direct-expansion refrigeration circuit) compressor (e.g., 120 or 320) has a variable-speed drive (VSD). Even further still, in some embodiments, the system controller (e.g., 170) is configured to modulate speed of the secondary direct-expansion refrigeration circuit compressor (e.g., 120 or 320), for example, to adjust reheat capacity at the secondary condenser coil (e.g., 140 or 340) when operating in a cooling mode, when operating in a dehumidification mode, or both. In various embodiments, the controller (e.g., 170) is "configured", as used herein, with software that, when executed, causes the controller to control the various items of equipment in the manner described. In other embodiments, however, the controller can be "configured" through the configuration of the hardware that forms the controller. In some embodiments, for instance, operating the secondary direct-expansion refrigeration circuit compressor (e.g., 120 or 320) at a higher speed while reducing cooling at the primary cooling coil (e.g., 150, 350), or 1150, for instance, for system 300, by reducing chilled water flow to the primary cooling coil (e.g., 350) or raising the chilled water temperature, can increase the temperature of the supply airstream (e.g., 335) delivered to the space, in some embodiments and conditions, without a corresponding increase in the moisture content of the supply airstream or supply air (e.g., 337) delivered to the space.

Further still, in some embodiments, the secondary direct-expansion refrigeration circuit compressor (e.g., 120 or 320) is a variable capacity compressor and variable capacity drive or variable capacity control (VCC) is used rather than, or in addition to, a variable-speed drive. In various embodiments, compressor volume or displacement (e.g., stroke) is modulated to control capacity, for example. Even further still, in some embodiments, the system controller (e.g., 170) is configured to modulate capacity of the secondary direct-expansion refrigeration circuit compressor (e.g., 120 or 320), for example, to adjust reheat capacity at the secondary condenser coil (e.g., 140 or 340), for instance, when operating in a cooling mode, when operating in a dehumidification mode, or both. In different embodiments. VSD, VCC, or both, are used. Moreover, in various embodiments, the system controller (e.g., 170) is configured to modulate the secondary direct-expansion refrigeration circuit (e.g., 125 or 325) compressor (e.g., 120 or 320) (e.g., speed, capacity, or both), for example, to adjust reheat capacity at the secondary condenser coil (e.g., 140 or 340) when operating in a cooling mode, when operating in a dehumidification mode, or both.

In a number of embodiments, the system controller (e.g., 170) is configured to lower the speed or capacity of the secondary direct expansion circuit compressor (e.g., 120 or 320) when the dew point or humidity level in the space or supply air (e.g., 337) drops below a setpoint dew point or humidity level threshold, at least when supply air temperature or space temperature, or both, are below a setpoint temperature threshold. In various embodiments, the system controller (e.g., 170) is configured to lower the rotational speed of the dehumidification wheel (e.g., 130 or 330), for example, and maintain the speed or capacity of the secondary direct expansion circuit compressor (e.g., 120 or 320), when the dew point or humidity level in the space or supply air (e.g., 337) drops below the setpoint dew point or humidity level threshold and the supply air temperature or space temperature (or both) are above the temperature setpoint threshold.

Further, in a number of embodiments, the system controller (e.g., 170) is configured to increase the speed or capacity of the secondary direct expansion circuit compressor (e.g., 120 or 320) when the dew point or humidity level in the space or supply air (e.g., 337) exceeds (e.g., the same or a different) setpoint dew point or humidity level threshold, at least when supply air temperature or space temperature, or both, are above (e.g., the same or a different) setpoint temperature threshold. Moreover, in various embodiments, the system controller (e.g., 170) is configured to increase the rotational speed of the dehumidification wheel (e.g., 130 or 330), for example, and maintain the speed or capacity of the secondary direct expansion circuit compressor (e.g., 120 or 320), when the dew point or humidity level in the space or supply air (e.g., 337) exceeds (e.g., the same or a different) setpoint dew point or humidity level threshold and the supply air temperature or space temperature (or both) are below (e.g., the same or a different) temperature setpoint threshold.

In particular embodiments, the system controller (e.g., 170) is configured to operate the system (e.g., 100, 300, or 1100) in an economizer mode in which cooling at the primary cooling coil (e.g., 150, 350, or 1150) is turned off. In some embodiments, for example, the primary chiller or chillers that chill cooling water that passes through the primary cooling coil (e.g., 150 or 350), or the main chiller(s) as described herein, are turned off and remain off during the economizer mode. In other embodiments, the primary direct expansion refrigeration circuit (e.g., 1122, as otherwise described herein, or other such systems), are turned off and remain off during the economizer mode. In various embodiments, however, during the economizer mode, at least when humidity levels warrant, the secondary direct-expansion refrigeration circuit (e.g., 125 or 325) or compressor (e.g., 120 or 320) thereof is operated to dehumidify the supply airstream (e.g., 335 or 1135) with the secondary direct-expansion refrigeration circuit evaporator coil (e.g., 160 or 360), the (e.g., desiccant-based or passive) dehumidification wheel (e.g., 130 or 330), or both. In some embodiments, the secondary circuit is operated during the economizer mode (e.g., only) when outdoor air (e.g., 305) humidity is high enough that such dehumidification is necessary or desirable. In such circumstances, the (e.g., smaller) secondary circuit compressor (e.g., 120 or 320) of the secondary circuit (e.g., 125 or 325) can be operated to provide the dehumidification rather than operating the primary cooling circuit (e.g., chiller or chillers or primary direct expansion circuit or compressors). As used herein, when a compressor or cooling is said to be turned off during a particular mode of operation (e.g., the economizer mode), unless indicated otherwise, the compressor or cooling is to remain off for the duration of that particular mode of operation.

Still further, in some embodiments, the system controller (e.g., 170) is configured to operate the system (e.g., 100, 300, or 1100) in a part-load mode in which cooling at the secondary cooling coil (e.g., 160 or 360) is turned off and cooling at the primary cooling coil (e.g., 150, 350, or 1150) is modulated, for example, to dehumidify the supply airstream (e.g., 335 or 1135) using the (e.g., desiccant-based) dehumidification wheel (e.g., 130 or 330). Even further, in some embodiments, the system controller (e.g., 170) is configured to operate the system (e.g., 100, 300, or 1100) in a part-load or recirculation mode in which cooling at the primary cooling coil (e.g., 150, 350, or 1150) is modulated down or off, and cooling the secondary cooling coil (e.g., 160 or 360) is modulated, for example, to dehumidify the supply airstream (e.g., 335 or 1135), for instance, using the dehumidification wheel (e.g., 130 or 330).

Further still, in a number of embodiments, the secondary direct-expansion refrigeration circuit (e.g., 125 or 325) can provide cooling when the chilled water plant or chiller is turned off, or when the primary direct expansion refrigeration circuit (e.g., 1122) is turned off, for example, due to temperature lockout or time of year. In some cases, the chilled water plant may be active but the outdoor air system may be the only system that requires chilled water, for example, for dehumidification purposes. In such cases, especially when the ambient conditions are cool, extremely cold chilled water may be produced, for example, in low quantities, which may complicate the control of the single chilled water coil. Accordingly, in some embodiments, the system controller (e.g., 170) is configured to operate the system (e.g., 100, 300, or 1100) in a part-load mode in which cooling at the primary cooling coil (e.g., 150, 350, or 1150) is turned off and the supply airstream (e.g., 335 or 1135) is cooled using the secondary cooling coil (e.g., 160 or 360).

In a number of embodiments, for example, cooling at the secondary cooling coil (e.g., 160 or 360) is modulated, for example, by the system controller (e.g., 170) to control temperature of the supply airstream (e.g., 335 or 1135), the space, or both. In some embodiments, (e.g., when warranted by conditions) the supply airstream (e.g., 335 or 1135) is dehumidified, for example, with the secondary cooling coil (e.g., 160 or 360), the dehumidification wheel (e.g., 130 or 330), or both, for example, in addition to or instead of cooling with the secondary cooling coil (e.g., 160 or 360) when the primary cooling coil (e.g., 150, 350, or 1150) is turned off. Further, in certain embodiments, the system controller (e.g., 170) is configured to stop the (e.g., desiccant-based or passive) dehumidification wheel (e.g., 130 or 330), for example, when warranted by conditions (e.g., when not needed to reduce humidity or to warm the supply air). The dehumidification wheel (e.g., 130 or 330) can be stopped, for example, to avoid reheating the supply airstream (e.g., 335 or 1135) after being cooled by the secondary cooling coil (e.g., 160 or 360), for example, when operating in a mode where the primary cooling coil (e.g., 150, 350, or 1150) is turned off.

Even further, in a number of embodiments, the secondary direct-expansion refrigeration circuit (e.g., 125 or 325) can provide cooling, dehumidification, or condensation control during the startup and construction phase of a building. In certain embodiments, the system controller (e.g., 170) is configured to operate and control (e.g., modulate) the secondary direct-expansion refrigeration circuit (e.g., 125 or 325) to provide such cooling, dehumidification, and/or condensation control specifically during the startup and construction phase of the building. For example, in some embodiments, due to unconditioned areas, lack of finalized air balancing or controls, or both, the secondary direct-expansion refrigeration circuit (e.g., 125 or 325) can provide temporary cooling or dehumidification, for instance, during times when the space humidity is high or even uncontrollable. Accordingly, in some embodiments, the system controller (e.g., 170) is configured to operate and control (e.g., modulate) the secondary direct-expansion refrigeration circuit (e.g., 125 or 325) to provide temporary cooling during times when the space humidity is high or even uncontrollable, at least to design levels. Further, during such times, condensation can occur, for example, on the (e.g., passive) dehumidification wheel (e.g., 130 or 330), for instance, served by a primary or chilled water system. In various situations, this can, for example, damage the wheel or cause corrosion.

In a number of embodiments, the inclusion of the secondary direct-expansion refrigeration circuit (e.g., 125 or 325), which can raise the moisture-carrying capability of the return airstream (e.g., 345 or 1145) before the dehumidification wheel (e.g., 130 or 330), solves this problem under many conditions. Further, in particular embodiments, the system controller (e.g., 170) is configured to operate and control (e.g., modulate) the secondary direct-expansion refrigeration circuit (e.g., 125 or 325) to prevent condensation, for example, on the dehumidification wheel (e.g., 130 or 330) served by a chilled water system, for instance, to avoid problems, for example, which can cause corrosion or damage the wheel. In various embodiments, the system controller (e.g., 170) is configured to operate and control (e.g., modulate) the secondary direct-expansion refrigeration circuit (e.g., 125 or 325) to raise the temperature of the return airstream (e.g., 345 or 1145) before the dehumidification wheel (e.g., 130 or 330), for example, to prevent condensation on the dehumidification wheel (e.g., 130 or 330).

In some embodiments, the secondary direct-expansion refrigeration circuit (e.g., 125 or 325) can be operated or modulated (e.g., by the system controller, for instance, 170) to deliver a warmer supply air (e.g., 337) temperature to the occupied space or active chilled beams, for example, to avoid over-cooling of the space by the primary airflow alone. When low dew points are desired, for example, colder air may be required to be delivered to the dehumidification wheel (e.g., 130 or 330) which can result in colder air leaving the dehumidification wheel. In some conditions, this reheat capability can be highly advantageous. In some embodiments, for example, the system controller (e.g., 170) is configured to operate the secondary direct-expansion refrigeration circuit (e.g., 125 325) or compressor (e.g., 120 or 320), for example, to deliver a warmer supply air (e.g., 337) temperature to the occupied space or active chilled beams, for instance, to avoid over-cooling of the space by the primary airflow alone (e.g., when temperature, humidity, or both conditions warrant such operation). Further, in certain embodiments, the system controller (e.g., 170) is configured to modulate the secondary direct-expansion refrigeration circuit (e.g., 125 or 325) or compressor (e.g., 120 or 320) (e.g., speed or capacity), for example, to deliver a warmer supply air (e.g., 337) temperature to the occupied space or active chilled beams, for instance, to avoid over-cooling of the space by the primary airflow or to control cooling thereof.

In various embodiments, the secondary direct-expansion refrigeration circuit (e.g., 125 or 325) or secondary compressor (e.g., 120 or 320) can be modulated down (e.g., reduced in speed or capacity), or even turned off, when conditions within the space have a high sensible load and low latent load, when cold air is desired from the system or unit, and when condensation on the return air (e.g., 345 or 1145) side leaving the dehumidification wheel (e.g., 130 or 330) is not a concern, for example. Under such conditions, cooling can be provided with the primary cooling coil (e.g., 150, 350, or 1150), for instance. Under such conditions, the primary cooling coil (e.g., 150, 350, or 1150) may also provide dehumidification, even though greater dehumidification may result if the secondary circuit were used. In some embodiments, for example, the system controller (e.g., 170) is configured to turn off the secondary direct-expansion refrigeration circuit (e.g., 125 325) or compressor (e.g., 120 or 320) and provide cooling with the primary cooling coil (e.g., 150, 350, or 1150) when conditions within the space have a high sensible load and low latent load, when cold air is desired from the unit, when condensation on the return air (e.g., 345 or 1145) side leaving the dehumidification wheel (e.g., 130 or 330) is not a concern, or a combination thereof.

In particular embodiments, the system controller (e.g., 170) is configured to reduce the speed or capacity of the secondary compressor (e.g., 120 or 320) or reduce the capacity of the secondary direct-expansion refrigeration circuit (e.g., 125 or 325) when conditions within the space have a high sensible load and low latent load, when cold air is desired from the unit, when condensation on the return air side leaving the dehumidification wheel (e.g., 130 or 330) is not a concern, or a combination thereof. These control strategies can be beneficial, for example, under conditions that are relatively hot and dry. In a number of embodiments, the controller (e.g., 170) can modulate down or turn off the secondary direct-expansion refrigeration circuit (e.g., 125 or 325) or compressor (e.g., 120 or 320), for example, in response to space temperature relative to one or more thermostat setpoints, and one or more humidity or dew point measurements, for example.

In many projects, for example, in many schools, there is a need or desire to maintain space humidity during unoccupied hours. Further, in a number of situations, the number of these hours can be substantial. Accordingly, various embodiments provide an unoccupied mode where minimal outdoor air (e.g., 305), and thereby cooling load, is required. In a number of embodiments, under these conditions, the secondary direct-expansion refrigeration circuit (e.g., 125 or 325) can be operated to perform dehumidification, for example, in some embodiments, all of the dehumidification needs, without the need for operating the primary chilled water, direct expansion (e.g., 1122), or heat pump circuit. In some embodiments, for example, the system controller (e.g., 170) is configured to operate or modulate the secondary direct-expansion refrigeration circuit (e.g., 125 or 325) or compressor (e.g., 120 or 320) to maintain space humidity during unoccupied hours or to provide an unoccupied mode where minimal outdoor air (e.g., 305), and thereby cooling load, is required (e.g., or both). In a number of embodiments, the system controller (e.g., 170) is configured to operate or modulate the secondary direct-expansion refrigeration circuit (e.g., 125 or 325) or compressor (e.g., 120 or 320) (e.g., during unoccupied periods, under appropriate conditions, or both) to perform dehumidification (e.g., all of the dehumidification needs), for instance, without operating (e.g., while turning off and leaving turned off) the primary cooling coil (e.g., 150, 350, or 1150) (e.g., chilled water, direct expansion, or heat pump circuit).

In various situations where the primary cooling coil (e.g., 150 or 350) or circuit (e.g., chiller or chillers) is operated to provide dehumidification, however, under such conditions, other cooling at the space may not be needed so the chiller may be operated at a low load and problems can be encountered maintaining a desired or consistent cooling water temperature. For example, in some conditions where a cooling water temperature of 42 degrees was desired, the chilled water temperature fluctuated between 36 and 40 degrees, as examples, which caused problems controlling the air temperature from the primary cooling coil. In a number of embodiments that have a secondary (e.g., refrigeration) circuit, however, the primary cooling coil (e.g., 150 or 350) is not used at all under certain low-cooling-demand circumstances or when only dehumidification is required, and air temperature can be easier to control, can be controlled more precisely, or both.

Still further, in a number of embodiments, conditions can exist where the primary cooling coil (e.g., 150, 350, or 1150) (e.g., chiller or chillers or direct expansion system, for instance, 1122) is needed to cool outdoor air (e.g., 305) introduced to the space but other cooling at the space (e.g., chilled beams or zone direct expansion units, such as geothermal units) are not needed to provide further cooling. Various embodiments provide cooling of outdoor air (e.g., 305) at the primary cooling coil (e.g., 150, 350, or 1150) under such circumstances without providing other cooling at the space. Even further, in some embodiments, the system (e.g., 100, 300, or 1100) or unit can be operated in an unoccupied mode. In particular embodiments, for example, air is recirculated within the system or unit in an unoccupied mode. Moreover, in various embodiments, an unoccupied mode can include, at least under certain circumstances, using the secondary (e.g., direct-expansion refrigeration) circuit alone (i.e., without cooling at the primary cooling coil (e.g., 150, 350, or 1150). In various applications, less sensible cooling is required when the building is unoccupied, but some level of dehumidification, (e.g., less than when the building is occupied) may be required or desirable. In a number of embodiments, the secondary direct-expansion refrigeration circuit (e.g., 125 or 325) can provide such dehumidification.

An example of a dehumidification wheel (e.g., 130 or 330), as used herein, is a passive dehumidification wheel. As used herein a "passive dehumidification wheel" is a dehumidification wheel that transfers a significant quantity of moisture from the supply airstream (e.g., 335 or 1135) chilled by the primary cooling coil (e.g., 150, 350, or 1150) to the exhaust airstream (e.g., 315 or 1115) without the exhaust airstream being heated to promote regeneration of the dehumidification wheel. Dehumidification wheels 130 and 330 are passive dehumidification wheels in many embodiments. Further, as used herein, the "passive dehumidification wheel" (e.g., 130 or 330) is one that provides moisture removal from the (e.g., saturated or near saturated) supply airstream (e.g., 335 or 1135) leaving the primary (e.g., 150, 350, or 1150) or secondary cooling coil (e.g., 160 or 360) when operated, with or without the modest added heat provided, for example, by the secondary direct-expansion refrigeration circuit (e.g., 125 or 325) condenser coil (e.g., 140 or 340) located in the return airstream (e.g., 345 or 1145). In many embodiments, for example, the adsorbed moisture contained within the passive (e.g., desiccant) wheel is removed (i.e., regenerated), or can be, by using the lower relative humidity air contained within the return or exhaust airstream (e.g., 315 or 1115) alone.

In many embodiments, the dehumidification wheel (e.g., 130 or 330) regenerates when removing moisture from the (e.g., saturated or near saturated) supply airstream (e.g., 335 or 1135) with exhaust air (e.g., 315 or 1115) returned from the space that is at a temperature below 95 degrees F. In other embodiments, the dehumidification wheel (e.g., 130 or 330) regenerates when removing moisture from the (e.g., saturated or near saturated) supply airstream (e.g., 335 or 1135) with exhaust air (e.g., 315 or 1115) returned from the space that is at a temperature below 100, 97, 93, or 90 degrees F., as other examples. Further, in many embodiments, the dehumidification wheel (e.g., 130 or 330) regenerates without the regenerating airstream (e.g., exhaust airstream 335 or 1135) having been heated with a burner that burns a fuel. Further still, in many embodiments, the dehumidification wheel (e.g., 130 or 330) regenerates without the regenerating airstream (e.g., exhaust airstream 335 or 1135) having been heated to a temperature that exceeds 95 degrees F. Still further, in various embodiments, the dehumidification wheel (e.g., 130 or 330) regenerates without the regenerating airstream (e.g., exhaust airstream 335 or 1135) having been heated to a temperature that exceeds 100, 97, 93, or 90 degrees F., as other examples. Even further, in many embodiments, heat from the secondary condenser coil (e.g., 140 or 340) is the only heat added to the return air (e.g., 345 or 1145) after the return air leaves the space but before the return air is used to regenerate the dehumidification wheel (e.g., 130 or 330). In fact, in various embodiments, no heat other than the heat from the secondary condenser coil (e.g., 140 or 340) is added to the return air (e.g., 345 or 1145) between the time that the return air leaves the space and the return air is used to regenerate the dehumidification wheel (e.g., 130 or 330). In further embodiments, no substantial heat other than the heat from the secondary condenser coil (e.g., 140 or 340) is added to the return air (e.g., 345 or 1145) between the time that the return air leaves the space and the return air is used to regenerate the dehumidification wheel (e.g., 130 or 330). In this context, "substantial" means enough to raise the temperature of the air by more than five degrees. In other embodiments, no heat other than the heat from the secondary condenser coil (e.g., 140 or 340) is added to the return air (e.g., 345 or 1145) between the time that the return air leaves the space and the return air is used to regenerate the dehumidification wheel (e.g., 130 or 330) that is enough heat to raise the temperature of the return air by more than 4, 6, 8, 10, 12, or 15 degrees, as other examples.

Further, in a number of embodiments, there are times when it is beneficial (e.g., for higher energy efficiency during part load conditions) to operate the system or unit (e.g., 100, 300, or 1100) without operating the secondary direct-expansion refrigeration circuit (e.g., 125 or 325), or the compressor thereof (e.g., 120 or 320). Still further, in some embodiments, the system (e.g., 100, 300, or 1100), unit, or controller (e.g., 170) is configured (e.g., programmed) to operate the system or unit without operating the secondary direct-expansion refrigeration circuit (e.g., 125 or 325) or compressor (e.g., 120 or 320), cooling the supply airstream (e.g., 335 or 1135) at the secondary direct-expansion refrigeration circuit evaporator coil or secondary cooling coil (e.g., 160 or 360), or heating the exhaust airstream (e.g., 315 or 1115) at the secondary direct-expansion refrigeration circuit condenser coil or heating coil (e.g., 140 or 340), for example, under part load conditions. In many embodiments, the system, unit, or controller is configured to turn off the secondary circuit when it is beneficial to do so (e.g., when dehumidification or additional dehumidification from the secondary direct-expansion refrigeration circuit (e.g., 125 or 325) or secondary cooling coil (e.g., 160 or 360) and dehumidification wheel (e.g., 130 or 330) is not needed or desirable). In various embodiments, control algorithms determine when the secondary direct-expansion refrigeration circuit (e.g., 125 or 325) is on or, in some embodiments, is modulated, during cooling or dehumidification modes (or both).

Further still, where passive dehumidification wheels (e.g., 130 or 330) are described herein, other embodiments, an active dehumidification wheel is another alternative that is contemplated. Adding significant additional regenerative heat can, however, among other things, reduce or eliminate the benefit of the recovery wheel (e.g., 110 or 310), at least in a number of the equipment configurations described herein, or in some circumstances. For this and other reasons, including the need for additional regenerative heat for an active dehumidification wheel, various embodiments described herein use a passive dehumidification wheel (e.g., 130 or 330) rather than an active dehumidification wheel. As mentioned, however, other embodiments may differ.

Figure 2:
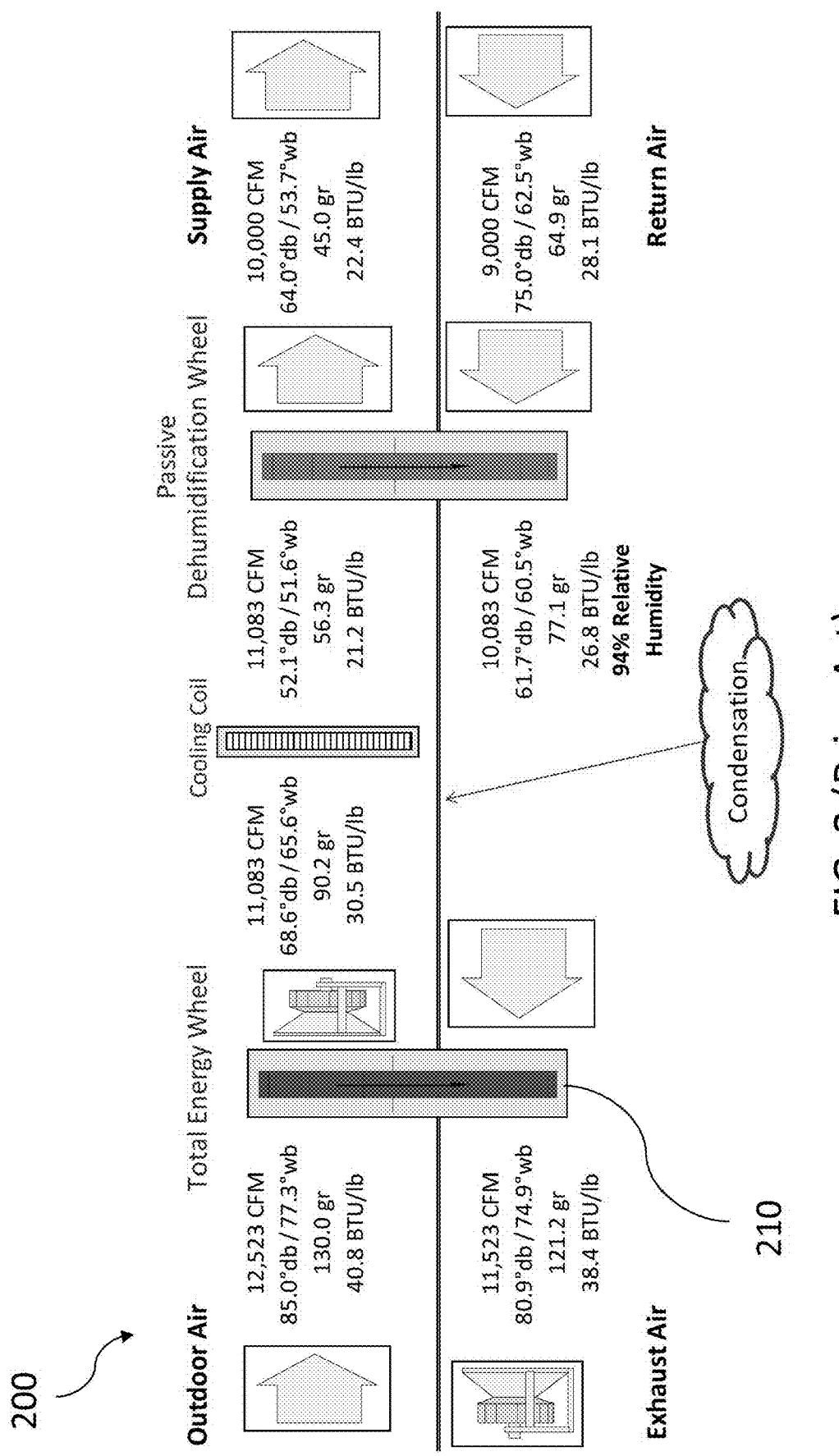
FIG. 2 is a block diagram of an example of a prior art air conditioning unit, HVAC unit, or system for controlling temperature and humidity within a space in a building, illustrating a prior art problem of condensation within the unit or system, for example, at the dehumidification wheel, when supply air with a low dew point is produced.
Figure 4:
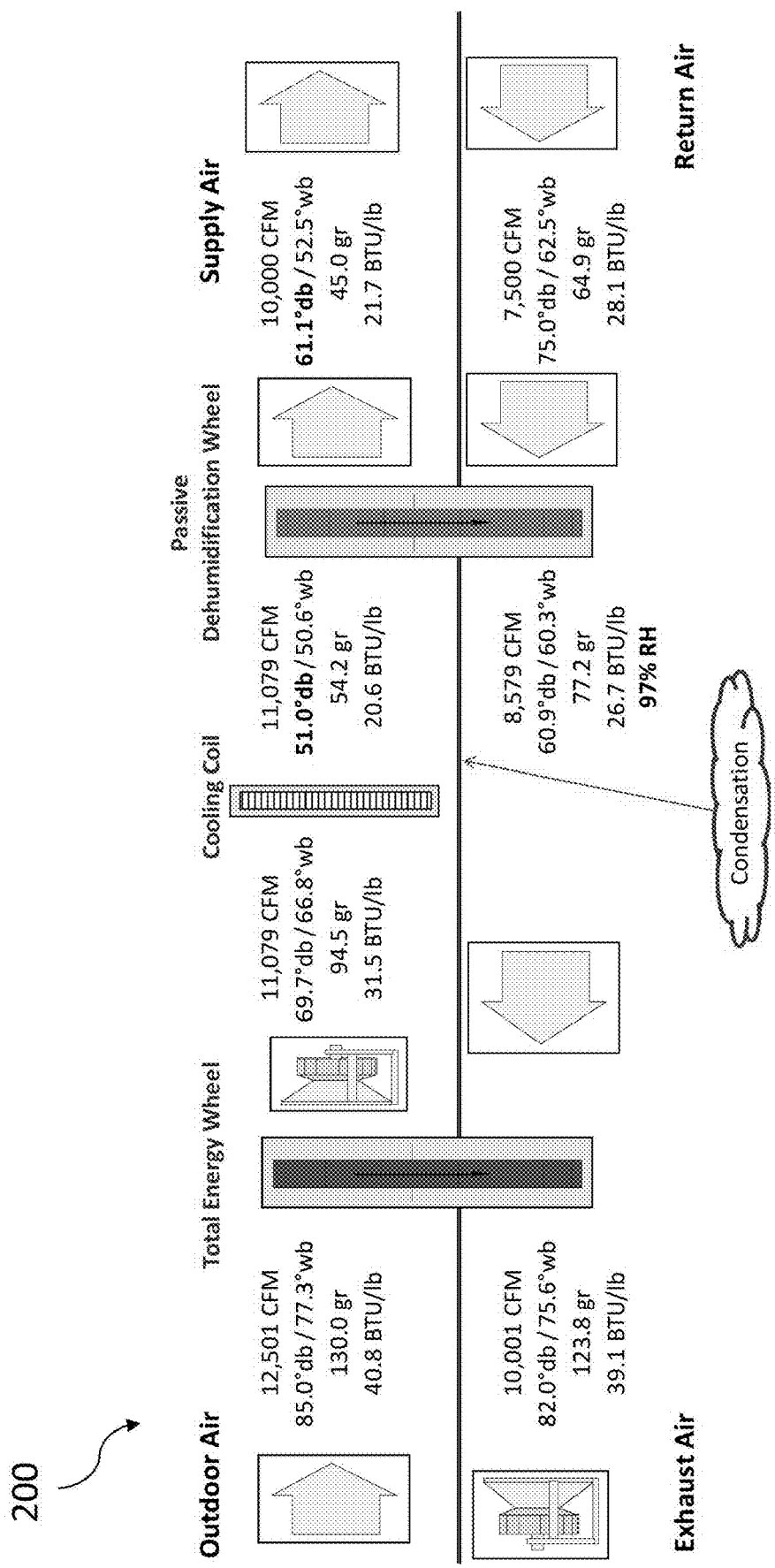
FIG. 4 is a block diagram of the example of FIG. 2 of the prior art air conditioning unit, HVAC unit, or system for controlling temperature and humidity within a space in a building, illustrating a prior art problem of condensation within the unit when there is substantial flow imbalance.

In many embodiments where the primary cooling coil, for instance, 150 or 350, is cooled with chilled water, the secondary direct-expansion refrigeration circuit (e.g., 125 or 325) can be used to deliver colder air than would be possible with a chilled water system alone due to the temperature limitation of the chilled water available. In particular embodiments, this allows air that is colder or that has a lower dew point (or both) to be produced and delivered, for example, in conjunction with the dehumidification wheel (e.g., 130 or 330). As described, in chilled water systems, the minimum temperature that the air leaving the cooling coil (e.g., 150 or 350) can reach has been limited by how cold the chilled water can be produced using traditional chiller performance limitations. As a result, the minimum temperature and the amount of humidity that can be removed from the outdoor air (e.g., 305) are limited. Lower levels of humidity in the supply air (e.g., 337), however, can be beneficial in some situations, for example, where chilled beams are used. In some embodiments, for example, the system controller (e.g., 170) is configured to operate the secondary direct-expansion refrigeration circuit (e.g., 125 or 325) to deliver colder air than would be possible with a chilled water system alone, for example, due to the temperature limitation of the chilled water available. In various embodiments, the system controller (e.g., 170) is configured to operate the secondary direct-expansion refrigeration circuit (e.g., 125 or 325) to allow air that is colder or that has a lower dew point (or both, in a number of embodiments) to be produced and delivered, for example, in conjunction with the dehumidification wheel (e.g., 130 or 330, for instance, in comparison with a system having chilled water that does not have a secondary direct expansion circuit), for example, as shown in FIGS. 2 and 4.

In many situations, it is beneficial for components of the system (e.g., air conditioning or HVAC, for instance, 100, 300, or 1100) to be located within the building rather than outdoors. In a number of embodiments, the secondary circuit (e.g., 125 or 325) is (e.g., entirely) located within the building. For instance, the second stage DX evaporator coil (e.g., 160 or 360) is matched with the condenser coil (e.g., 140 or 340) contained within the building exhaust airstream (e.g., 315 or 1115). In this configuration, a remote condensing section, outside the building, is typically not required for the secondary circuit (e.g., 125 or 325). When chilled water is used for the first stage cooling coil (e.g., 150 or 350), chilled water must be supplied, but refrigerant lines to a remote condensing section, outside the building, is typically not required for the first stage cooling coil (e.g., 150 or 350).

When the first cooling stage (e.g., serving primary cooling coil 150 or 350) is also designed to be a direct expansion circuit or heat pump, a remote condensing section outside the building can be used, in a number of embodiments, so that a high volume of outdoor air can be pulled across the condensing coil and ejected to the outdoors. This approach, however, requires refrigerant lines to the remote condensing section outside the building, which typically must be installed, connected, tested, and charged at the job site. In addition, in many installations, outdoor space suitable for the remote condensing section outside the building may be in short supply. In some embodiments, water source condensing sections are employed for the first stage cooling (e.g., at primary coil 150 or 350), and can offer certain performance advantages over air cooled condensing sections by providing a more moderate temperature heat sink or source, especially when heat pump capability is utilized. Using a water source approach, however, requires drilling either one or more geothermal wells or installing a cooling tower and installing a water loop, both of which require space that may not be available and may increase the cost of installation.

As illustrated in FIG. 11, an alternate approach in some embodiments utilizes a first stage or primary direct expansion cooling circuit (e.g., 1122), for example, in addition to the (e.g., integrated) second stage DX cooling circuit (e.g., 125). In many embodiments, the condenser coil (e.g., 140 or 340) for the secondary cooling circuit (e.g., 125 or 325) is located within the return air or exhaust airstream (e.g., 315 or 345 shown in FIG. 3, or 1115 or 1145 in FIG. 11) from the conditioned space as described herein. In various embodiments, the unit or system (e.g., 1100) includes a primary direct-expansion refrigeration circuit (e.g., 1122) that includes the primary cooling coil (e.g., 1150) which acts as a primary evaporator when operating in a cooling mode.

In many embodiments, the primary direct-expansion refrigeration circuit (e.g., 1122) also includes a primary condensing coil (e.g., 1104) which acts as a condenser when operating in the cooling mode, and at least one primary compressor (e.g., 1120). In a number of embodiments, the exhaust airstream (e.g., 1115) passes through the primary condensing coil (e.g., 1104, as shown). In various embodiments (e.g., system 1100), the return air (e.g., 1145) of the exhaust airstream (e.g., 1115) passes first through the secondary circuit condenser coil (e.g., 140), then through the (e.g., desiccant-based) dehumidification wheel (e.g., 130), then through the recovery wheel (e.g., 110), and then through the primary condensing coil (e.g., 1104).

In some embodiments, the first stage direct expansion cooling circuit (e.g., 1122) is (e.g., totally) integrated within the enclosure (e.g., 101) of the system or unit (e.g., 1100). In the embodiment shown, condenser coil 1104 for first stage or primary circuit 1122 (e.g., of cooling) is installed within exhaust air outlet section 1101 of system 1100 allowing the existing exhaust air fan 1112 to also function as the condenser fan. The enhanced static pressure capability associated with such an exhaust/condenser fan (e.g., 1112), in various embodiments, provides performance advantages over conventional, low static capability condenser fans. These advantages can include, for example, the ability to use a deeper, more efficient condensing coil (e.g., 1104) with increased rows, tighter fins, more capacity, or a combination thereof, as examples. Another advantage, in some embodiments, is improved performance during frosting conditions when the first cooling stage (e.g., 1122) is operated as a heat pump (e.g., heating primary coil 1150 to heat the space).

In other embodiments, both an outdoor air condensing coil and a condensing coil in the return air are used. In some embodiments, however, this requires an outdoor condensing unit, with some or all of the concerns described herein. In other embodiments, outdoor air delivered to the unit or enclosure (e.g., 101, for example, delivered with supply air 335 or 1135) feeds the outdoor air condensing coil, before joining the exhaust airstream (e.g., 315 or 1115). In many embodiments, the secondary circuit (e.g., 125), dehumidification wheel (e.g., 130), or both, make an integrated first stage direct expansion cooling circuit (e.g., 1122) more feasible or function better, at least under certain conditions. In some other configurations, the amount of heat rejected from the condenser coil (e.g., analogous to 1104) cannot be absorbed by the exhaust air (e.g., analogous to 1115) leaving the system without resulting in unacceptably high condensing temperatures. Extreme condensing temperatures can substantially reduce the compressor cooling output and efficiency and can also reduce the life of the compressor (e.g., analogous to 1120). With many prior art systems (e.g., shown in FIGS. 2 and 4), all of the cooling input required to achieve the necessary cooling and dehumidification is typically accomplished using a single, stage 1 cooling circuit. As a result, the temperature leaving this stage 1 cooling coil needs to be low enough to satisfy that need (e.g., in conjunction with the dehumidification wheel) to deliver the desired dew point. Stated more simply, the air temperature leaving the stage 1 cooling coils of the prior art must be much lower than that leaving the stage 1 coil (e.g., 1150) of many embodiments described herein (e.g., system 1100), since the integrated second stage coil (e.g., 160) included in such embodiments provides the final, low dew point cooling necessary.

Since system 1100, for example, can deliver an air temperature off of the stage 1 cooling circuit (e.g., leaving primary coil 1150, cooled by primary DX circuit 1122), that is less cold, a higher suction temperature can be used at the stage 1 coil (e.g., 1150), while providing the same performance as the systems in FIGS. 2 and 4, for example. This increases the operating efficiency of the primary circuit compressor(s) (e.g., 1120 in FIG. 11) and helps to offset the decrease in system efficiency associated with operating at a higher condensing temperature (e.g., at coil 1104). Further, in many embodiments, the total cooling load requirement is reduced by the addition of the stage 2 cooling circuit (e.g., 125) and since (e.g., in system 1100) the condensing needs are satisfied by the return air (e.g., 1145) from the space, the stage 1 cooling circuit (e.g., 1122) can be smaller, in a number of embodiments, requiring fewer tons than many prior art systems (e.g., 200 shown in FIGS. 2 and 4).

Further, in many configurations (e.g., 200), the air temperature exhausted from the system is cooler than the outdoor air temperature since the recovery system is not 100% efficient. Further still, in many embodiments, the purge and seal leakage airflow volumes, often thought of as parasitic energy losses, increase the return airflow volume leaving the conditioned space or through the primary condenser coil (e.g., 1104). This increase in "condenser airflow" and reduction in "condenser airflow temperature" can help to increase the operating efficiency of system 1100, for example. When combined with the benefit of a higher suction temperature and smaller stage 1 cooling circuit previously described, the condensing capacity requirement can be reduced low enough, under many conditions, to allow the exhaust airflow volume (e.g., at 1115 or through coil 1104) to be used for rejection of the heat from the primary circuit (e.g., 1122), thereby eliminating the need, in other configurations or embodiments, for a remote condensing section.

Still further, in some embodiments, for instance, during times of extreme outdoor temperatures, the exhaust air temperature, airflow, or both (e.g., at exhaust air outlet section 1101 or condenser coil 1104), in many US climatic conditions is not adequate to maintain a desirable condensing (head) pressure (e.g., within primary direct expansion circuit 1122) and can cause high pressure trips or premature compressor (e.g., 1120) failure, in particular embodiments, even with the benefits described herein. In some circumstances, for example, the exhaust air temperature can be too high, the exhaust airflow (e.g., at 1115 or through coil 1104) can be too low, or a combination thereof. Some embodiments address this potential problem by monitoring the condensing pressure (e.g., within primary direct expansion circuit 1122, for example, monitoring using the system controller, for example, 170), and implementing a change that increases the system condensing side capacity when necessary.

An example of a way of increasing condensing side capacity (e.g., under extreme conditions) is to "flash evaporate" a fine water mist ahead (i.e., upstream) of the condenser coil (e.g., between recovery wheel 110 and condenser coil 1104 in FIG. 11). This can substantially lower the air temperature entering the coil, thereby increasing condensing capacity. Another way to increase condensing capacity is to use evaporative cooling pads in place of the flash evaporation mist (e.g., between recovery wheel 110 and condenser coil 1104). As used herein, flash evaporation of a fine water mist, and evaporative cooler pads, are both examples of evaporative cooling. Yet another way to increase condensing capacity is to add outdoor air to the exhaust air, for example, upstream of the condensing coil (e.g., between recovery wheel 110 and condenser coil 1104) to increase condenser airflow. In some embodiments, such added outdoor air is cooled with evaporative cooling (e.g., in different embodiments, before or after being combined with return air). Further, in some embodiments that include evaporative cooling for cooling condenser air (e.g., for condenser 1104), the evaporative cooling is used even when outdoor temperatures are not extreme, but when cooling is demanded, to reduce electricity consumption (e.g., by compressor 1120) or increase capacity of the direct expansion refrigeration circuit (e.g., 1122), or both. In certain embodiments, however, evaporative cooling can be turned off (e.g., by the system controller, for example, 170) when humidity or dew point (e.g., of outdoor air, return air, or both) exceeds a (e.g., set) threshold.

Certain embodiments provide variable refrigerant flow (VRF), include or are used as a dedicated outdoor air supply or dedicated outdoor air system (DOAS), or both. Variable refrigerant flow systems, in a number of embodiments, can provide simultaneous heating and cooling to different zones within one or more buildings, for example. Like a number of embodiments of heat pump systems, however, many VRF systems do not handle raw outdoor air very well. Many VRF systems can be highly efficient in processing sensible (temperature) loads, but, in many cases, are less efficient or effective at handling the latent loads, for example, associated with high density spaces, for instance, like school classrooms. As a result, some embodiments serve VRF systems with a dedicated outdoor air system. In a number of embodiments, for example, VRF systems are served by an outdoor air system (e.g., 1100) that can decouple the latent load from the VRF room modules so that the zone VRF coils can handle sensible only loads and operate with higher suction temperatures. This can increase overall system efficiency, for example. Further, removing the latent load from the VRF modules can reduce the cooling capacity requirement and therefore size of the unit required in each classroom, for example. This can provide many system design advantages under various circumstances.

Still further, in many embodiments, installing smaller VRF units can decrease the installation cost due, for example, to the smaller units and refrigerant lines. Even further, in some embodiments, a smaller main condensing unit can be employed. Even further still, in particular embodiments, condensate management can be reduced or eliminated since the latent load is partially or fully handled by the DOAS (e.g., 1100). Moreover, in many embodiments, fewer pounds of refrigerant are being pumped through the building, addressing one substantial concern regarding this technology should there be a refrigerant leak. Additionally, one challenge facing VRF systems is efficiently delivering the necessary heating capacity in colder climates. In some embodiments, rotational speed of the VRF compressor is increased to increase the heating output at low ambient temperatures, for example, but limitations still exist and it would be highly beneficial to increase the heating output available as well as the efficiency or coefficient of performance.

In various embodiments, two effective ways of increasing the heating capacity available to the conditioned spaces are to minimize the heating capacity required by the DOAS to condition the outdoor air and to allocate a sizeable and more effective "outdoor coil" for the VRF system where a substantial airflow can be used as a heat source (e.g., cooled to obtain heat to add to the space). Some embodiments (e.g., system 1100) can provide both of these enhancements. As an example, assume a school has a wing including 10 classrooms and needs 3,000 cfm of outdoor air for ventilation purposes. Decoupling the space latent load from the individual room VRF modules, in this example, allows classroom units, operating to handle the sensible cooling load only, to be sized for 2 tons each (24,000 BTUs). A conventional DOAS (e.g., system 200 shown in FIG. 2) employing a total energy recovery wheel (e.g., 210) would require approximately 16 tons of cooling input for this example to process the 3,000 cfm of outdoor air from a condition of 95 degrees F. DB and 78 degrees F. WB to deliver the 50-grain supply air humidity condition required to handle both the outdoor air and space dehumidification load. In contrast, in a number of embodiments (e.g., 1100) where the primary condenser coil (e.g., 1104) for the first stage circuit (e.g., 1122) is installed within the exhaust air outlet section (e.g., 1101), the primary or stage 1 cooling circuit (e.g., 1122) only requires 10 tons of cooling input. As a result, the total cooling for the school wing can be achieved with only 30 tons in this example.

Now the same school operating during the winter with the outdoor air being 0 degrees F. DB needs 23,000 BTUs of heat for each classroom to maintain the set point of 70 degrees F. DB. The DOAS can deliver air to each room at 85 degrees F. DB providing 4,860 BTUs of heat so each VRF module must deliver the remaining 18,140 BTUs. At 0 degrees F. DB, the typical VRF module rated at 2 tons with an outdoor condensing unit can only deliver 16,000 BTUs when the outdoor VRF condensing unit cannot pull heat from any other zone. As a result, the spaces would not have adequate heating capacity. In contrast, with certain embodiments (e.g., system 1100 shown in FIG. 11), the stage 1 cooling circuit condensing coil (e.g., 1104) is installed within the exhaust air section (e.g., 1101) of the DOAS instead of utilizing an outdoor condensing unit. In various embodiments, this coil, whether outdoors or in the exhaust air section (e.g., the latter being shown in FIG. 11), serves as a condensing coil when cooling and an evaporator coil when heating. On a 0-degree F. DB day, the air over the evaporator coil (e.g., 1104) in the exhaust air section (e.g., 1101), in this example, is in the range of 15 degrees F. DB since the recovery device is not 100% efficient. This provides approximately 4,000 cfm of exhaust air from the dual wheel (e.g., 110 and 130) energy recovery system at the 15-degree F. DB that passes across the VRF evaporator coil and functions as an effective heat source to allow the main VRF condensing section to operate more efficiently.

In this example, adding the evaporator load associated with the 4,000 cfm of air at 15 degrees F. DB with the evaporator load of the main VRF condensing section allows for a substantial increase in heating output at the VRF modules installed in each classroom. In this example, the heating output from a 2-ton module would be increased from approximately 16,000 BTUs to the 18,140 BTUs needed. Likewise, a similar cooling season performance enhancement is recognized in this school example when the condenser (e.g., 1104) in the exhaust airstream (e.g., section 1101) processes air at approximately 90 degrees F. DB as opposed to the ambient 95 degrees F. DB condition is combined with the main VRF condensing section. Further, in many embodiments, the stage 2 cooling circuit (e.g., 125), that handles the final, lower air temperature cooling function, allows the stage 1 cooling circuit (e.g., 1122) to operate at a higher suction temperature and to deliver air that is less cold. In various embodiments, this provides an excellent match with the VRF system as it operates more effectively when under these conditions. With the DOAS typically requiring 40% of the total system cooling capacity or more, off-loading approximately 25% of the DOAS cooling capacity requirements on to the stage 2 cooling circuit (e.g., 125)

handled by a designated compressor (e.g., 120) that is not part of the VRF grid is a significant advantage in a number of embodiments. For example, this allows for a smaller main VRF condensing section to be utilized and reduces the size of the refrigerant lines required as well as the quantity of refrigerant required.

In a number of embodiments, a unit or system (e.g., for controlling temperature and humidity within a space in a building) includes a recovery wheel, a (e.g., desiccant-based) dehumidification wheel, and a primary direct-expansion refrigeration circuit. FIG. 11 provides an example, system 1100. In various embodiments, the primary direct-expansion refrigeration circuit (e.g., 1122) includes, for example, at least one primary circuit compressor (e.g., 1120), a primary circuit evaporator coil (e.g., 1150), and a primary circuit condenser coil (e.g., 1104). Further, in a number of embodiments, the system forms a supply airstream (e.g., 1135), for instance, that passes outdoor air first through the recovery wheel (e.g., 110), then through the primary circuit evaporator coil (e.g., 1150), then through the dehumidification wheel (e.g., 130), and then to the space. Still further, in various embodiments, the system forms an exhaust airstream (e.g., 1115), for example, that passes return air (e.g., 1145) from the space first through the dehumidification wheel (e.g., 130), then through the recovery wheel (e.g., 110), and then through the primary circuit condenser coil (e.g., 1104).

Some such embodiments (e.g., as shown in FIG. 11) further include a secondary direct-expansion refrigeration circuit (e.g., 125), for instance, that includes a secondary circuit compressor (e.g., 120), a secondary circuit evaporator coil (e.g., 160), and a secondary circuit condenser coil (e.g., 140). Moreover, in a number of embodiments, the supply airstream (e.g., 1135) passes the outdoor air first through the recovery wheel (e.g., 110), then through the primary circuit evaporator coil (e.g., 1150), then through the secondary circuit evaporator coil (e.g., 160), then through the dehumidification wheel (e.g., 160), and then to the space. Further, in particular embodiments, the exhaust airstream (e.g., 1115) passes the return air (e.g., 1145) from the space first through the secondary circuit condenser coil (e.g., 140), then through the dehumidification wheel (e.g., 140), then through the recovery wheel (e.g., 110), and then through the primary circuit condenser coil (e.g., 1104). Even further, in particular embodiments, the primary circuit evaporator coil (e.g., 1150) has at least three times as many rows as the secondary circuit evaporator coil (e.g., 160), for example.

In certain embodiments, the recovery wheel (e.g., 110) is a total energy recovery wheel that includes a desiccant coating, the recovery wheel transfers sensible heat between the outdoor air of the supply airstream (e.g., 1135) and the exhaust airstream (e.g., 1115), the recovery wheel transfers moisture between the outdoor air of the supply airstream and the exhaust airstream, or a combination thereof. Further, in particular embodiments, the (e.g., desiccant-based) dehumidification wheel (e.g., 130) is a passive dehumidification wheel, the system further includes a supply fan (e.g., 1113) located in the supply airstream (e.g., 1135) that moves the outdoor air to the space, the system further includes an exhaust fan (e.g., 1112) located in the exhaust airstream (e.g., 1115) that moves the return air from the space, or a combination thereof. Still further, in a number of embodiments, the system (e.g., 1100) includes a partition (e.g., 111), for example, between the supply airstream (e.g., 1135) and the exhaust airstream (e.g., 1115), the recovery wheel (e.g., 115) is located in a first opening (e.g., 601 shown in FIG. 6) in the partition (e.g., 111 or 311), the dehumidification wheel is located in a second opening (e.g., 602 shown in FIG. 6) in the partition, at least adjacent to the partition (e.g., 111 or 311), the supply airstream (e.g., 1135) and the exhaust airstream (e.g., 1115) travel in substantially parallel directions, at least adjacent to the partition, the supply airstream and the exhaust airstream travel in substantially opposite directions, and the system (e.g., 1100) further includes an enclosure (e.g., 101) that contains the recovery wheel (e.g., 110), the (dehumidification wheel (e.g., 130), the at least one primary circuit compressor (e.g., 1120), the primary circuit evaporator coil (e.g., 1150), and the primary circuit condenser coil (e.g., 1104), at least part of the supply airstream (e.g., 1135), at least part of the exhaust airstream (e.g., 1115), and the partition (e.g., 111).

Even further, in some embodiments, the system (e.g., 1100, for instance, as shown) further includes, within the enclosure (e.g., 101), the secondary direct-expansion refrigeration circuit (e.g., 125), for example, including the secondary circuit compressor (e.g., 120), the secondary circuit evaporator coil (e.g., 160), the secondary circuit condenser coil (e.g., 140), or a combination thereof. In various embodiments (e.g., of a unit or system), the primary direct-expansion refrigeration circuit (e.g., 1122) is a heat pump, for example, that both cools and heats the primary circuit evaporator coil (e.g., 1150) depending on whether cooling or heating of the space is demanded.

Further still, in some embodiments, the unit or system (e.g., for controlling temperature and humidity within a space in a building) includes an evaporative cooler (not shown), for example, that precools air entering the primary circuit condenser coil (e.g., 1104 shown in FIG. 11). In particular embodiments, for instance, the evaporative cooler is located between the recovery wheel (e.g., 110) and the primary circuit condenser coil (e.g., 1104). Still further, in a number of embodiments, the exhaust airstream (e.g., analogous to 1115) passes through the evaporative cooler. Even further, in some embodiments, supplemental outdoor air is added to the exhaust airstream. In particular embodiments, for example, the supplemental outdoor air passes through the evaporative cooler. Still further, in certain embodiments, the supplemental outdoor air passes through the primary circuit condenser coil, for instance, after the supplemental outdoor air passes through the evaporative cooler. Even further still, in some embodiments, the supplemental outdoor air is added to the exhaust airstream between the recovery wheel and the primary circuit condenser coil.

Some embodiments (e.g., of a system for controlling temperature and humidity within a space in a building, for instance, as described herein) include a variable refrigerant flow subsystem (not shown), for example, serving multiple zones within the space. In a number of embodiments, for example, each of the multiple zones includes a fan coil unit of the variable refrigerant flow subsystem, and the supply airstream (e.g., described herein) provides a dedicated outdoor air supply (DOAS) that serves the variable refrigerant flow subsystem. A particular example is a system (e.g., for controlling temperature and humidity within a space in a building) that includes a variable refrigerant flow subsystem and a dedicated outdoor air supply subsystem that includes, a recovery wheel, a (e.g., desiccant-based) dehumidification wheel, a primary cooling coil, and at least one condenser coil. System 1100, shown in FIG. 11, is an example of such a dedicated outdoor air supply subsystem. In a number of embodiments, the variable refrigerant flow subsystem includes multiple fan coil units serving multiple zones within the space. Further, in various embodiments, the dedicated outdoor air supply subsystem (e.g., 1100) serves the multiple zones. Still further, in many embodiments, the dedicated outdoor air supply subsystem forms a supply airstream (e.g., 1135) that passes outdoor air first through the recovery wheel (e.g., 110), then through the primary cooling coil (e.g., 1150), then through the dehumidification wheel (e.g., 130), and then to the space. Further still, in various embodiments, the dedicated outdoor air supply subsystem (e.g., system 1100) forms an exhaust airstream (e.g., 1115) that passes return air (e.g., 1145) from the space through the dehumidification wheel (e.g., 130) and then through the recovery wheel (e.g., 110), for instance, as shown. Even further, in a number of embodiments, the exhaust airstream (e.g., 1115) also passes through the at least one condenser coil (e.g., 140 or 1104).

In some embodiments (e.g., 1100), the dedicated outdoor air supply further includes a secondary direct-expansion refrigeration circuit (e.g., 125), for example, that includes a secondary circuit compressor (e.g., 120), a secondary circuit evaporator coil (e.g., 160), and a secondary circuit condenser coil (e.g., 140). Further, in some embodiments, the at least one condenser coil (e.g., described above) includes the secondary circuit condenser coil (e.g., 140). Still further, in some embodiments, the exhaust airstream (e.g., 1115) passes the return air (e.g., 1145) from the space first through the secondary circuit condenser coil (e.g., 140), then through the dehumidification wheel (e.g., 130), and then through the recovery wheel (e.g., 110). Further still, in many embodiments, the supply airstream (e.g., 1135) passes through the secondary circuit evaporator coil (e.g., 160). Even further, in some embodiments, the supply airstream passes the outdoor air first through the recovery wheel (e.g., 110), then through the primary cooling coil (e.g., 1150), then through the secondary circuit evaporator coil (e.g., 160), then through the (e.g., desiccant-based) dehumidification wheel (e.g., 130), and then to the space.

In a number of embodiments, the dedicated outdoor air supply (e.g., system or subsystem 1100) further includes a primary direct-expansion refrigeration circuit (e.g., 1122), for example, that includes at least one primary circuit compressor (e.g., 1120), a primary circuit evaporator coil (e.g., 1150), and a primary circuit condenser coil (e.g., 1104). In various embodiments, for example, the supply airstream (e.g., 1135) passes through the primary circuit evaporator coil (e.g., 1150), the primary cooling coil is the primary circuit evaporator coil (e.g., 1150), the at least one condenser coil (e.g., described above) is or includes the primary circuit condenser coil (e.g., 1104), or a combination thereof. In some embodiments, for instance, the exhaust airstream (e.g., 1115) passes the return air (e.g., 1145) from the space first through the dehumidification wheel (e.g., 130), and then through the recovery wheel (e.g., 110), and then through the primary circuit condenser coil (e.g., 1104), for example, as shown. Moreover, in many embodiments, the primary direct-expansion refrigeration circuit (e.g., 1122) is a heat pump that both cools and heats the primary circuit evaporator coil (e.g., 1104) depending on whether cooling or heating of the space is demanded.

In some embodiments, the dedicated outdoor air supply further includes an evaporative cooler (not shown, e.g. as described herein), for example, that precools air entering the primary circuit condenser coil (e.g., 1104). In particular embodiments, for example, the evaporative cooler is located between the recovery wheel (e.g., 110) and the primary circuit condenser coil (e.g., 1104), the exhaust airstream (e.g., 1115) passes through the evaporative cooler, or both. Further, in some embodiments, supplemental outdoor air (not shown) is added to the exhaust airstream of the dedicated outdoor air supply. In various embodiments, the supplemental outdoor air passes through the evaporative cooler, the supplemental outdoor air passes through the primary circuit condenser coil (e.g., in some embodiments, after the supplemental outdoor air passes through the evaporative cooler), or both. Still further, in a number of embodiments, supplemental outdoor air is added to the exhaust airstream, the supplemental outdoor air passes through the primary circuit condenser coil (e.g., 1104), the supplemental outdoor air is added to the exhaust airstream between the recovery wheel and the primary circuit condenser coil, or a combination thereof.

Figure 12:
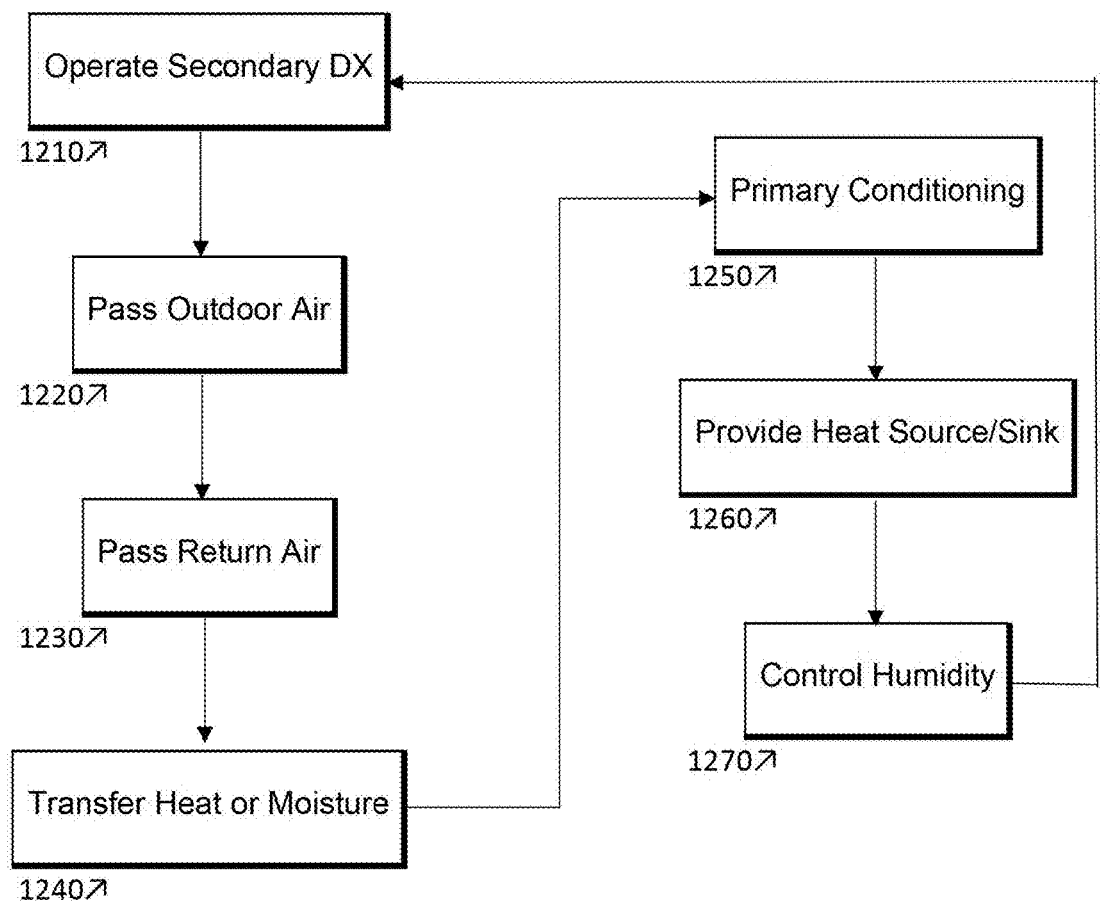
FIG. 12 is a flow chart illustrating an example of method for controlling temperature and humidity within a space in a building.
Figure 13:
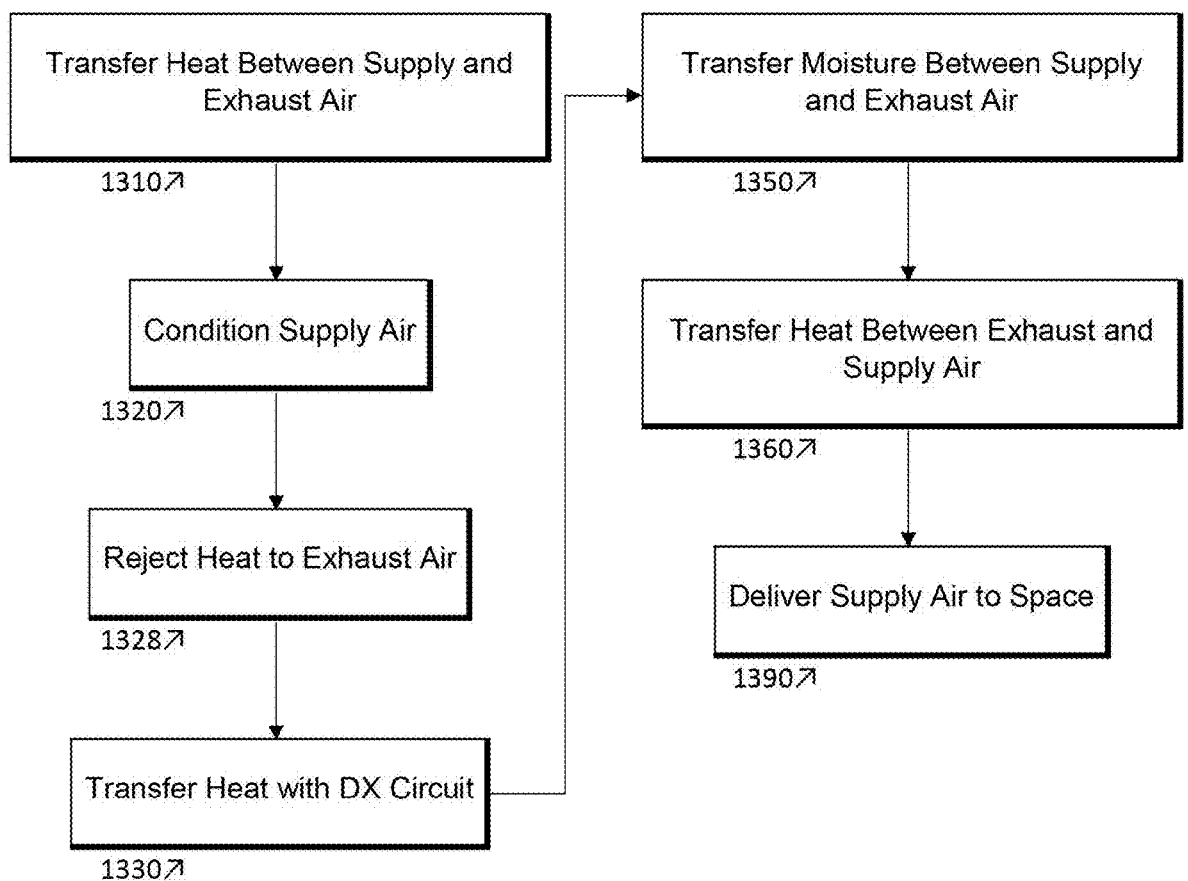
FIG. 13 is a flow chart illustrating another example of method for controlling temperature and humidity within a space in a building.

Turning now from units and systems (e.g., for controlling temperature and humidity within a space in a building, for instance, air conditioning or HVAC units or systems) to methods, various embodiments are or include methods, for instance, for controlling temperature and humidity within a space, for example, in a building. In many embodiments, such a method includes certain acts, which can be performed in different orders, or in some embodiments, some or all of which are performed, simultaneously. Methods 1200 and 1300 shown in FIGS. 12 and 13 are examples of embodiments. Different embodiments include some or all of the acts shown or described, or a combination of such acts.

Method 1200, for instance, is an example of a method of controlling temperature and humidity within a space, for example, in a building. Method 1200 includes (e.g., simultaneous) acts of: operating a secondary direct-expansion refrigeration circuit (e.g., act 1210, for instance, secondary circuit 125 or 325 shown in FIGS. 1, 3, and 11). In some embodiments, for example, this act (e.g., 1210) includes operating (i.e., running) a secondary compressor (e.g., 120 or 320). Further, in the embodiment illustrated, method 1200 includes passing outdoor air (e.g., act 1220, for example, outdoor air 305 shown in FIG. 3), for example, through various components, for instance, in a particular order (e.g., to a space). In the embodiment shown, method 1200 also includes passing return air (e.g., act 1230, for example, return air 345 or 1145 shown in FIGS. 3 and 11), for example, from the space, for instance, through various (e.g., of the same or different) components, for example, in a certain order.

In a number of embodiments, for example, the secondary direct-expansion refrigeration circuit compressor (e.g., 120 or 320) is part of the secondary direct-expansion refrigeration circuit (e.g., 125 or 325 of act 1210), for instance, that includes (e.g., in addition to the secondary direct-expansion refrigeration circuit compressor) a secondary direct-expansion refrigeration circuit evaporator coil or secondary cooling coil (e.g., 160 or 360), and a secondary direct-expansion refrigeration circuit condenser coil or heating coil (e.g., 140 or 340). Further, various embodiments include (e.g., in act 1220) passing outdoor air (e.g., outdoor air 305 or supply airstream 335 or 1135) first through a recovery wheel (e.g., 110 or 310), then through a primary cooling coil (e.g., 150, 350, or 1150), then through the secondary direct-expansion refrigeration circuit evaporator coil or secondary cooling coil (e.g., 160 or 360), then through a (e.g., passive) dehumidification wheel (e.g., 130 or 330), and then to the space. For example, in the embodiment shown in FIG. 3, act 1220 can be performed using supply fan 113, 313, or 1113, for example, under the control of controller 170 shown in FIG. 1.

Still further, a number of embodiments (e.g., of method 1200) include (e.g., in act 1230) passing return air (e.g., 345 or 1145, for instance, with exhaust fan 112, 312, or 1112) from the space or an exhaust airstream (e.g., 315 or 1115)

first through the secondary direct-expansion refrigeration circuit condenser coil, heating coil, or preheating coil (e.g., 140 or 340), then through the (e.g., passive) dehumidification wheel (e.g., 130 or 330), and then through the recovery wheel (e.g., 110 or 310). In various embodiments, the act of passing the return air (e.g., 1230) from the space is performed by operating an exhaust fan (e.g., 112, 312, or 1112) that blows the return air (e.g., 345 or 1145). Further, in various embodiments the act of passing the return air (e.g., 1230) from the space includes exhausting the return air (e.g., 345 or 1145), for example, to outdoors, after the return air (e.g., 345 or 1145) passes through the recovery wheel (e.g., 110 or 310). In some embodiments, the exhaust airstream (e.g., 315) is exhausted to or used to ventilate another space, for example, a parking garage, attic, or equipment room, as other examples.

Various methods, including method 1200, further include transferring heat or moisture (e.g., in act 1240), or both, for example, between airstreams (e.g., supply air to exhaust air when operating in a cooling mode). Some embodiments, for example, specifically include (e.g., in act 1240) transferring moisture from the outdoor air (e.g., 305) to the return air (e.g., 345 or 1145), for example, with a desiccant coating on the recovery wheel (e.g., 110 or 310). Further, many embodiments include (e.g., in act 1240) transferring sensible heat from the outdoor air (e.g., 305) to the return air (e.g., 345 or 1145) with the recovery wheel (e.g., 110 or 310).

A number of embodiments further include primary conditioning (e.g., act 1250 of method 1200, for instance, operating a primary cooling system, subsystem, or circuit), for example, that cools, or in some embodiments, (e.g., when demanded, for instance, in a heating mode) heats (e.g., at primary coil 150, 350, or 1150, or at a different coil in series therewith), the supply airstream (e.g., 335 or 1135). In some embodiments, for example, act 1250 includes operating at least one primary chiller that chills cooling water, passing the cooling water through the primary cooling coil (e.g., 150, 350, or 1150), or both. On the other hand, other embodiments include operating a primary direct expansion refrigeration circuit (e.g., 1122 shown in FIG. 11) that cools the primary cooling coil (e.g., 1150) and that, in the embodiment shown in FIG. 11, rejects heat through a primary condenser coil (e.g., 1104). Method 1200 is an example of such a method involving a primary direct expansion refrigeration circuit (e.g., 1122) as well, and also includes act 1260 of providing a heat source or sink, for example, to reject or obtain heat that is transferred in act 1250. Certain (e.g., of these) embodiments include, for example, passing (e.g., in act 1230) the return air (e.g., 1145) from the space first through the secondary circuit condenser coil (e.g., 140), then through the (e.g., passive) dehumidification wheel (e.g., 130), then through the recovery wheel (e.g., 110, for instance, performing act 1240), and then through the primary condenser coil (e.g., 1104, performing act 1260).

Further, various methods (e.g., 1200) include controlling humidity (e.g., act 1270), for example, in the space or in the supply air (e.g., 337). In particular embodiments, controlling humidity (e.g., act 1270), or other acts of method 1200 (e.g., act 1210), can include condensing moisture out of the outdoor air (e.g., 305 or supply airstream 335 or 1135) with the secondary circuit evaporator coil (e.g., 160 or 360), transferring sensible heat to the return air with the secondary circuit condenser coil (e.g., 140 or 340), or both, as examples. Other ways of controlling humidity are described herein, including using the primary cooling coil, recovery wheel, and (e.g., passive) dehumidification wheel.

Figure 5:
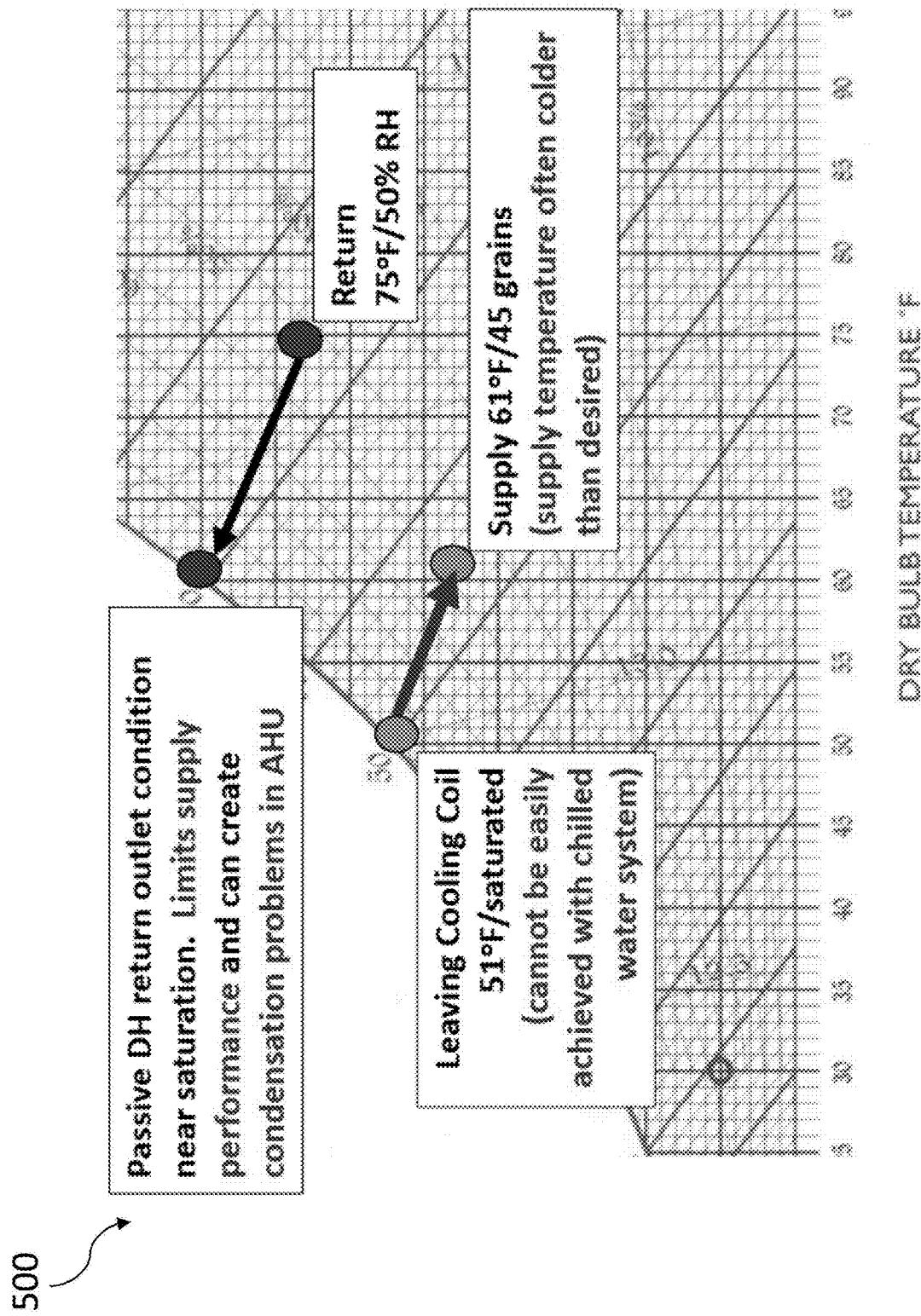
FIG. 5 is a psychometric chart illustrating limitations of the prior art air conditioning unit, HVAC unit, or system of FIGS. 2 and 4.
Figure 6:
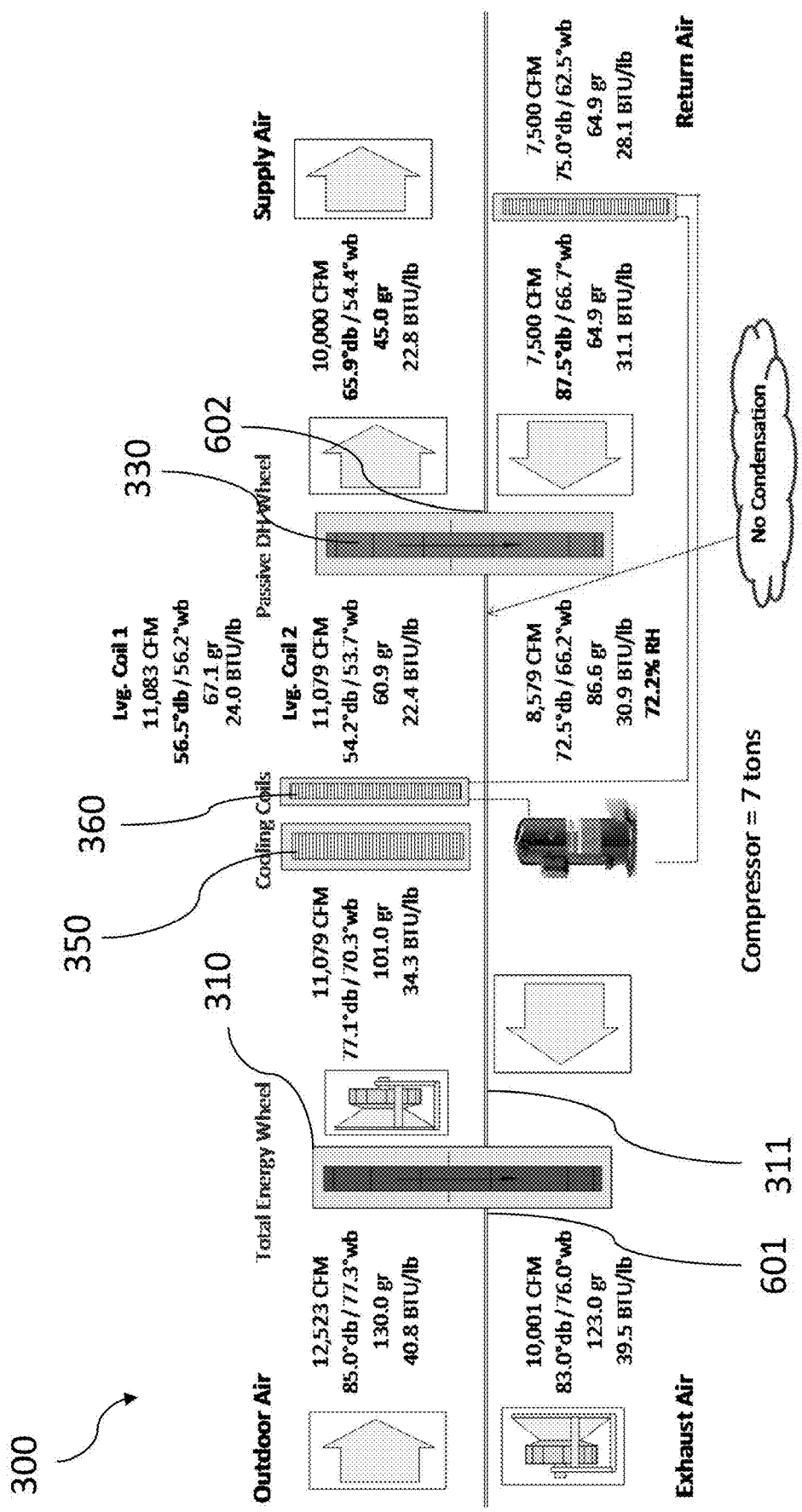
FIG. 6 is a block diagram of the example of FIG. 3 of the air conditioning unit, HVAC unit, or system for controlling temperature and humidity within a space in a building, that illustrates certain embodiments of the invention, and that illustrates how the prior art problem of condensation within the unit or system, when there is substantial flow imbalance (e.g., illustrated in FIG. 4) can be overcome.
Figure 7:
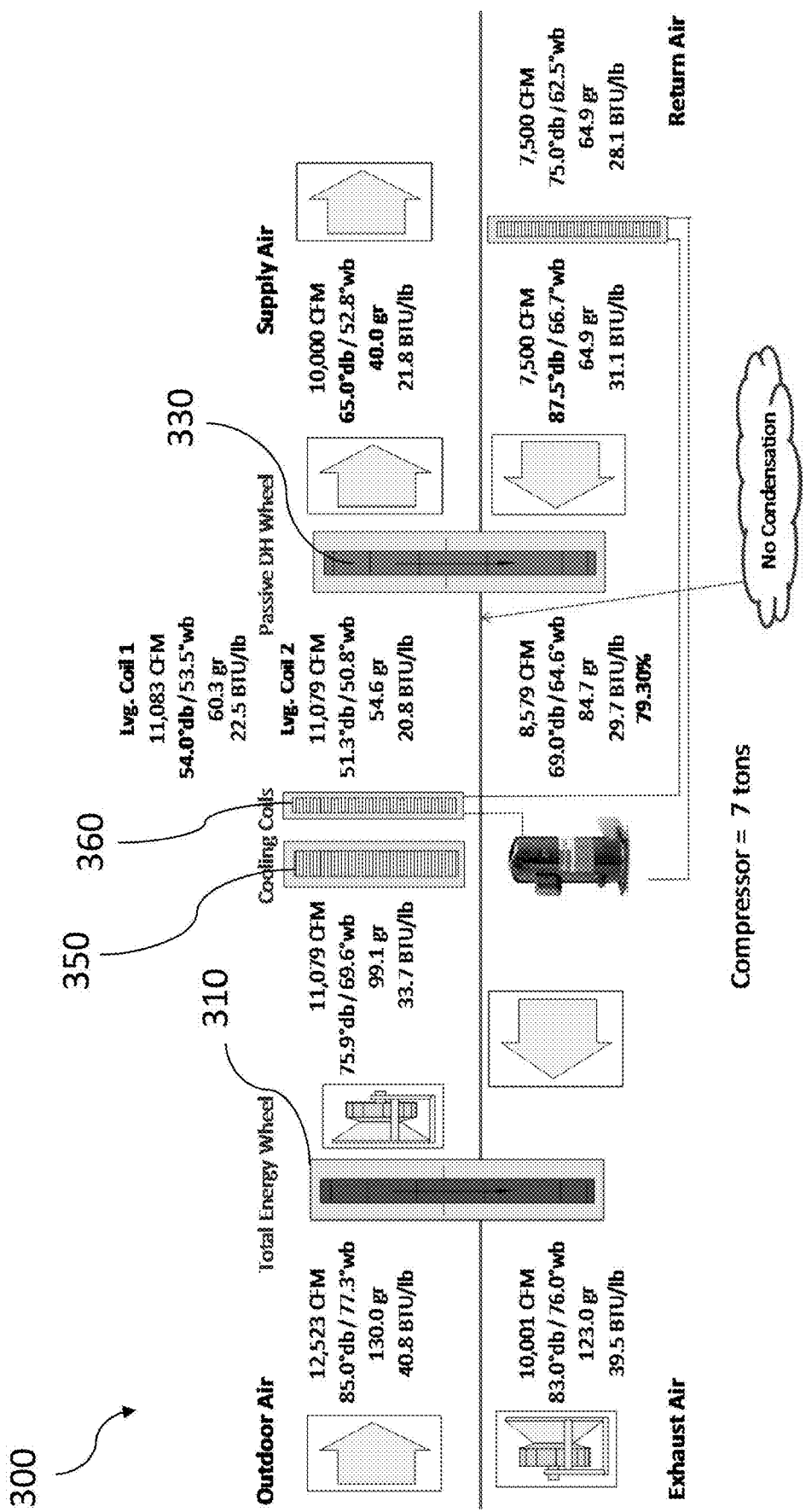
FIG. 7 is a block diagram of the example of FIGS. 3 and 6 of the air conditioning unit, HVAC unit, or system for controlling temperature and humidity within a space in a building, that further illustrates how the prior art problem of condensation within the unit when there is substantial flow imbalance (e.g., illustrated in FIG. 4) can be overcome by certain embodiments of the invention while delivering an even lower dew point than shown in FIG. 6.
Figure 8:
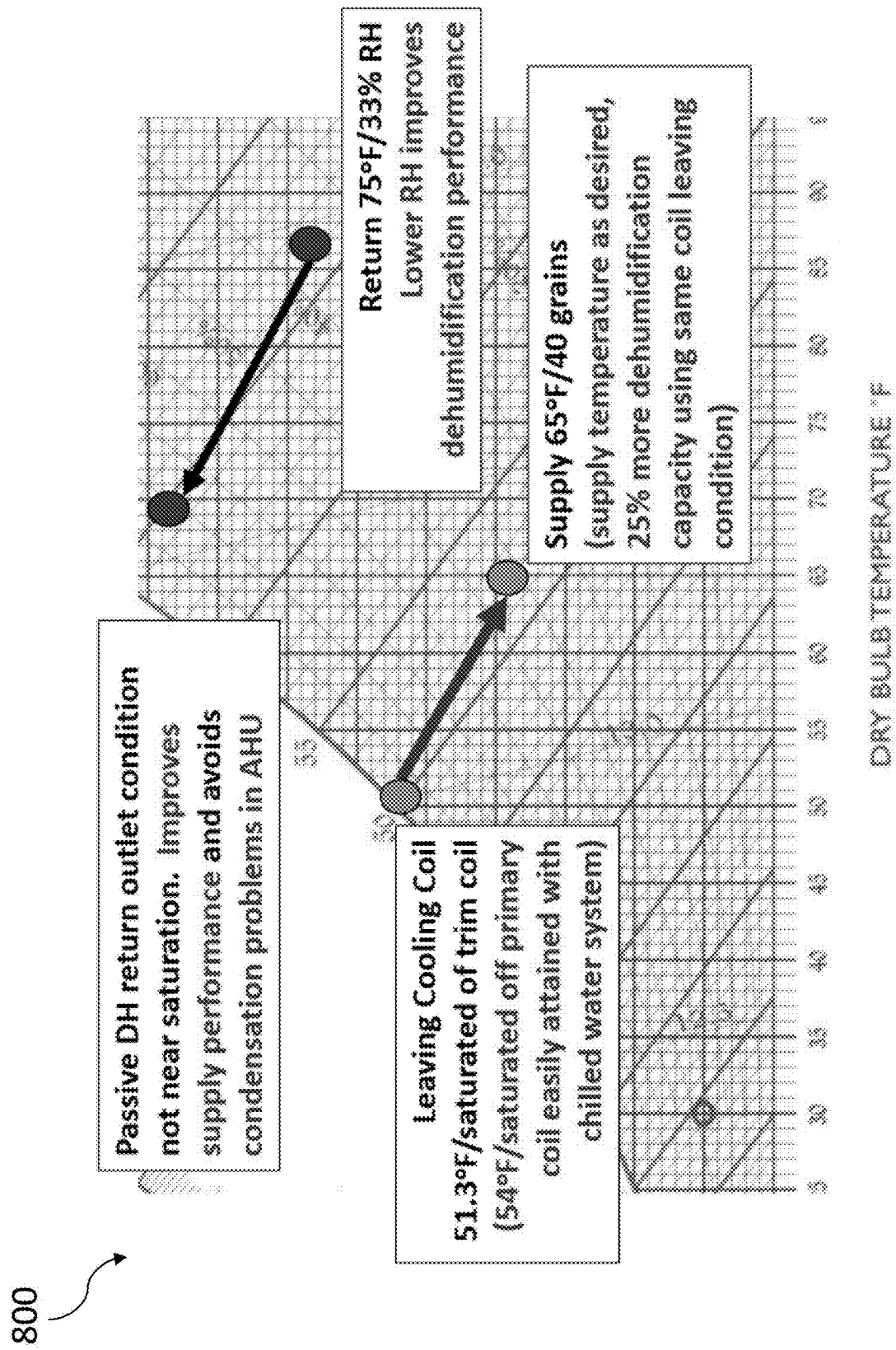
FIG. 8 is a psychometric chart illustrating performance of the air conditioning unit, HVAC unit, or system of FIGS. 3, 6, and 7.
Figure 9:
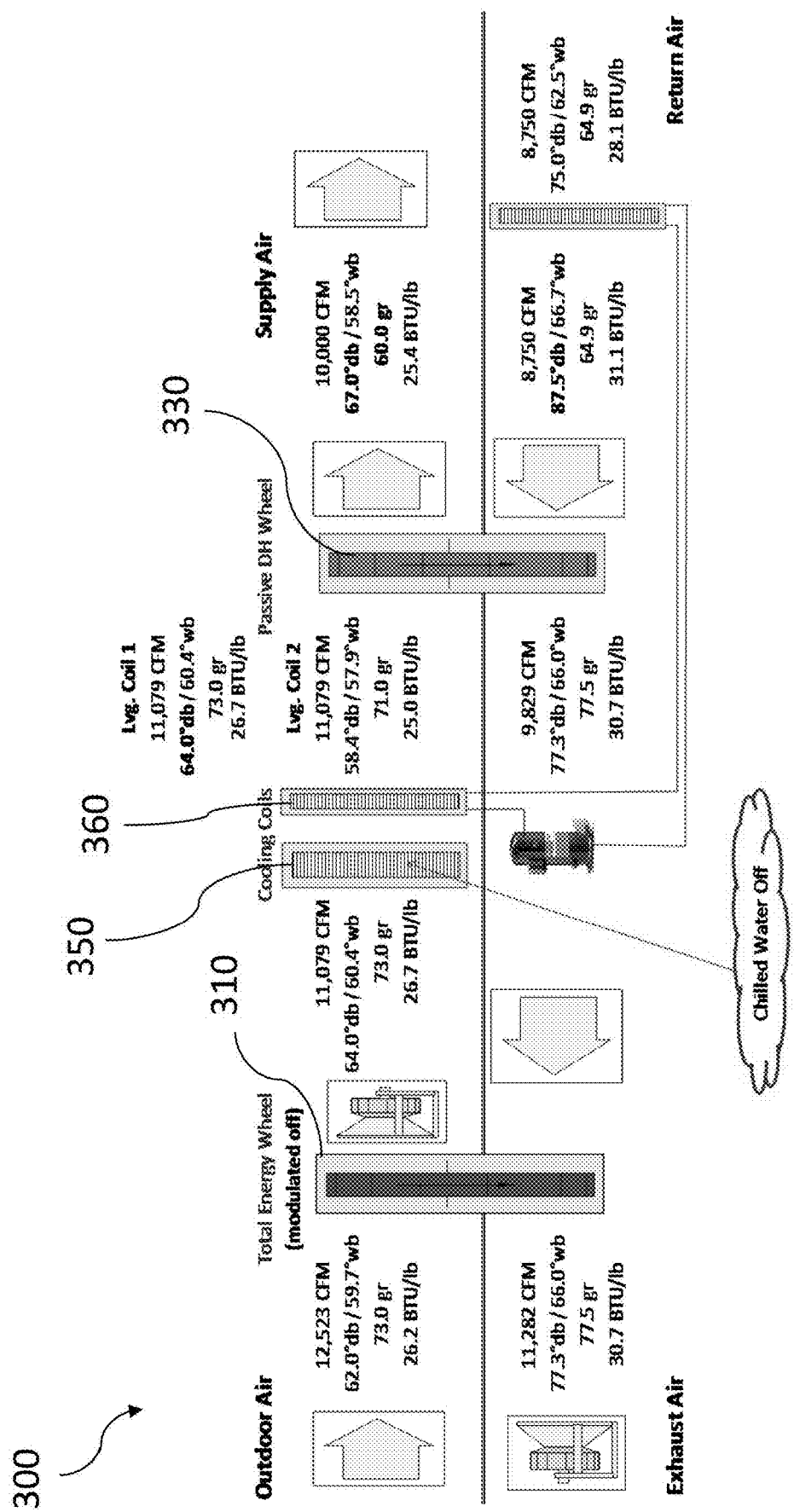
FIG. 9 is a block diagram of the example of FIGS. 3, 6, and 7 of the air conditioning unit, HVAC unit, or system for controlling temperature and humidity within a space in a building, that illustrates how the unit or system can perform when there is no primary cooling (e.g., when the primary cooling coil chilled water or primary direct expansion circuit is turned off)
Figure 10:
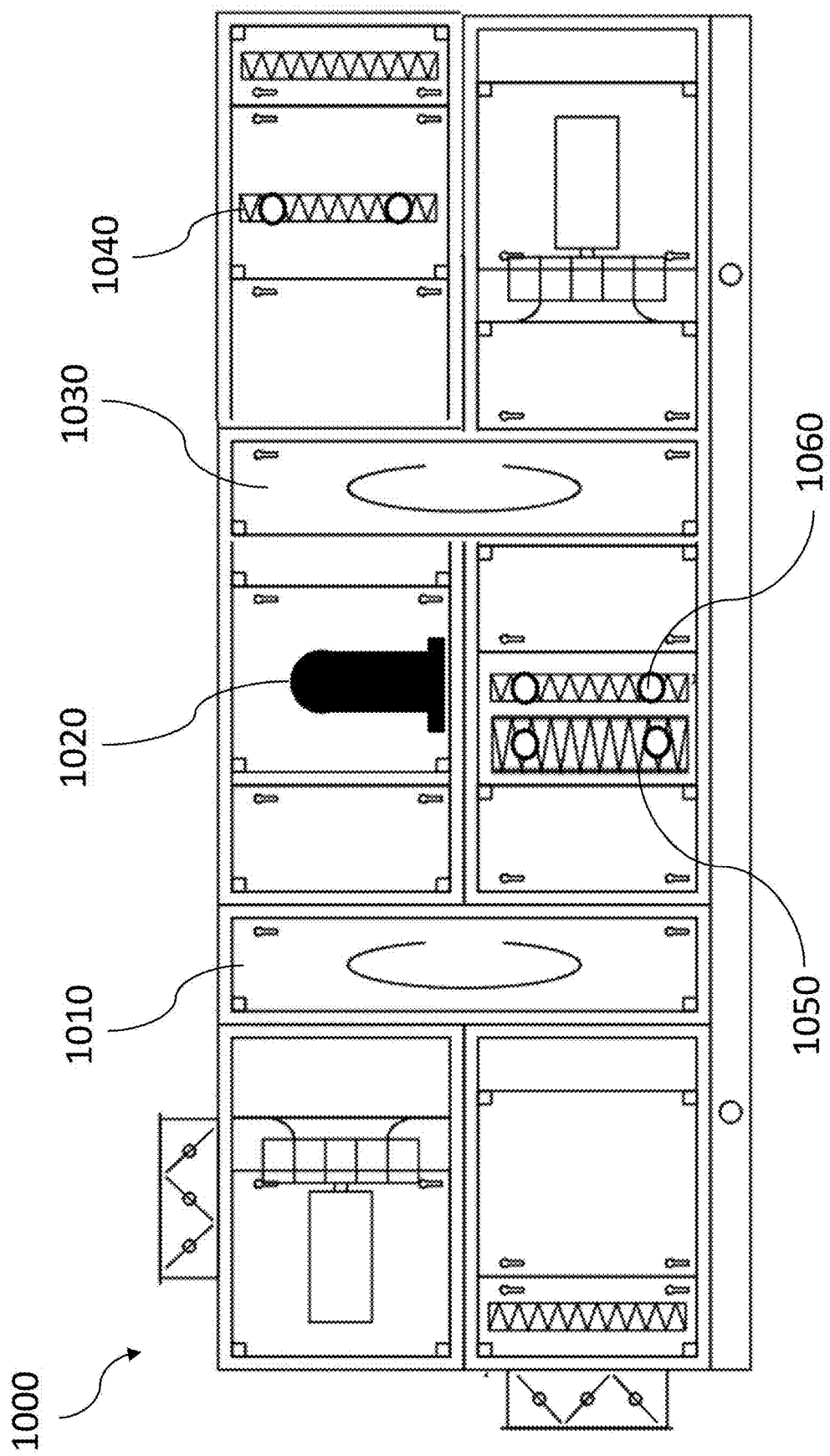
FIG. 10 illustrates an example of an equipment layout for certain embodiments of the invention.

Various embodiments involve transferring certain quantities, for example, of heat or moisture, for instance, from particular sources to particular destinations. Method 1300 in FIG. 13 illustrates some examples. Method 1300 include certain acts, many of which can involve transferring certain quantities. As used herein, a "quantity" can be a rate, for example, a quantity (e.g., of energy) per unit of time, which can vary depending on conditions, demand, or both. In a number of embodiments, an act involving a quantity can be steady (e.g., steady state), but in various embodiments, the rate can vary over time, for example, as the conditions that require the cooling, dehumidification, etc., change. Such acts can include, for example, transferring (e.g., in act 1310), a first quantity of heat. In some embodiments, for example, the first quantity of heat is transferred (e.g., in act 1310) to an exhaust airstream (e.g., 115 or 315) from outdoor air (e.g., 305) entering a supply airstream (e.g., 335 or 1135). In various embodiments, the first quantity of heat (e.g., of act 1310) can be, or can include, sensible or latent heat, or both. In a number of embodiments, the first quantity of heat can be transferred, (e.g., in act 1310), for instance, with a recovery wheel (e.g., 110 or 310). FIGS. 3 and 6-9, including psychometric chart 800, provide several specific examples of quantities. FIGS. 2, 4, and 5, including psychometric chart 500, provide several specific examples of prior art that may be used for comparison, for example, to illustrate differences or potential improvements.

Various methods (e.g., 1300) further include an act (e.g., 1320) of conditioning (e.g., cooling when in a cooling mode) the supply airstream (e.g., 335 or 1135), for example, with a primary cooling coil (e.g., 150, 350, or 1150), for example, downstream of the transferring (e.g., in act 1310) of the first quantity of (e.g., sensible or latent) heat, for instance. In some embodiments, conditioning the supply air (e.g., act 1320) includes condensing a second quantity of moisture from the supply airstream (e.g., 335 or 1135). As used herein, when referring to a particular airstream, "downstream" means relative to that airstream. For example, in the act (e.g., 1320) of conditioning the supply airstream (e.g., 335 or 1135) downstream of the transferring of the first quantity of sensible or latent heat, "downstream" means relative to the supply airstream (e.g., 335 or 1135).

Further, many embodiments (e.g., method 1300) include transferring (e.g., in act 1330) a third quantity of heat from the supply airstream (e.g., 335 or 1135) to return air (e.g., 345 or 1145) entering the exhaust airstream (e.g., 315 or 1115). In some embodiments, this (e.g., act 1330) is done with a secondary direct-expansion refrigeration circuit (e.g., 125 or 325), for example. In various embodiments, for example, the transferring (e.g., act 1330) of the third quantity of heat from the supply airstream (e.g., 335 or 1135) takes place in the supply airstream (e.g., 335 or 1135) downstream of the conditioning or cooling (e.g., act 1320) of the supply airstream (e.g., 335 or 1135, for example, with the primary cooling coil, for instance, 150, 350, or 1150). Still further, in some embodiments, the transferring of the third quantity of heat (e.g., In act 1330) from the supply airstream (e.g., 335 or 1135) includes condensing a fourth quantity of moisture from the supply airstream (e.g., 335 or 1135), for example, at the secondary evaporator coil (e.g., 160 or 360). Further, in a number of embodiments, more heat is transferred (e.g., in act 1330) to the return air (e.g., 345 or 1145) entering the exhaust airstream (e.g., 315 or 1115), for example, at the secondary condenser coil (e.g., 140 or 340) than is transferred (e.g., in act 1330) from the supply airstream (e.g., 335 or 1135), even if latent energy is considered, due to energy added by secondary direct-expansion refrigeration circuit (e.g., 125 or 325, for instance, by compressor 120 or 320). In some embodiments, more than the third quantity of heat is transferred (e.g., in act 1330) to the return air (e.g., 345 or 1145) entering the exhaust airstream (e.g., 315 or 1115).

In a number of embodiments, such a method (e.g., 1300) can further include transferring (e.g., in act 1350) a fifth quantity of moisture, for example, from the supply airstream (e.g., 335 or 1135) to the exhaust airstream (e.g., 315 or 1115). In a number of embodiments, for example, this (e.g., act 1350) can be performed, with a (e.g., desiccant based, passive, or both) dehumidification wheel (e.g., 130 or 330). Even further, in various embodiments, the transferring (e.g., in act 1350) of the fifth quantity of moisture from the supply airstream (e.g., 335 or 1135) to the exhaust airstream (e.g., 315 or 1115) takes place in the supply airstream (e.g., 335 or 1135) downstream of the transferring (e.g., in act 1330) of the third quantity of heat from the supply airstream (e.g., 335 or 1135), for example, with the secondary direct-expansion refrigeration circuit) evaporator coil (e.g., 160 or 360) to the return air (e.g., 345 or 1145) entering the exhaust airstream (e.g., 315 or 1115). Further still, in various embodiments, the transferring (e.g., in act 1350) of the fifth quantity of moisture from the supply airstream (e.g., 335 or 1135) to the exhaust airstream (e.g., 315 or 1115) takes place in the exhaust airstream (e.g., 315 or 1115) downstream of the transferring (e.g., in act 1330) of the third quantity of heat (e.g., with the secondary direct-expansion refrigeration circuit condenser coil (e.g., 140 or 340) from the supply airstream (e.g., 335 or 1135) to the return air (e.g., 345 or 1145) entering the exhaust airstream (e.g., 315 or 1115).

Even further still, in some such embodiments, in conjunction with the transferring (e.g., in act 1350) of the fifth quantity of moisture from the supply airstream (e.g., 335 or 1135) to the exhaust airstream (e.g., 315 or 1115), the method (e.g., 1300) includes transferring (e.g., in act 1360) a sixth quantity of sensible heat from the exhaust airstream (e.g., 315 or 1115) to the supply airstream (e.g., 335 or 1135), for example, with the (e.g., passive, desiccant-based, or both) dehumidification wheel (e.g., 130 or 330). As used herein, in this context, "in conjunction with" means at the same location or using the same component (e.g., with the dehumidification wheel (e.g., 130 or 330). Moreover, in various such embodiments (e.g., method 1300), the act (e.g., 1360) of transferring of the sixth quantity of sensible heat (e.g., with the dehumidification wheel, for instance, 130 or 330) from the exhaust airstream (e.g., 315 or 1115) to the supply airstream (e.g., 335 or 1135) takes place in the supply airstream (e.g., 335 or 1135) downstream of the transferring (e.g., in act 1330) of the third quantity of heat (e.g., with the secondary direct-expansion refrigeration circuit, for instance, 125 or 325) from the supply airstream (e.g., 335 or 1135) to the return air (e.g., 345 or 1145) entering the exhaust airstream (e.g., 315 or 1115). Further, in various embodiments, the transferring (e.g., in act 1360) of the sixth quantity of sensible heat from the exhaust airstream (e.g., 315 or 1115) to the supply airstream (e.g., 335 or 1135) takes place in the exhaust airstream (e.g., 315 or 1115) downstream of the transferring (e.g., in act 1330) of the third quantity of heat from the supply airstream (e.g., 335 or 1135) to return air (e.g., 345 or 1145) entering the exhaust airstream (e.g., 315 or 1115, for example, with secondary direct-expansion refrigeration circuit condenser coil 140 or 340).

Still further, various methods (e.g., 1300) include delivering (e.g., in act 1270) the supply airstream (e.g., 335 or 1135) to the space (e.g., through the supply ductwork) downstream of the transferring (e.g., in act 1260) of the sixth quantity of sensible heat from the exhaust airstream (e.g., 315 or 1115) to the supply airstream (e.g., 335 or 1135), for example, with the (e.g., passive) dehumidification wheel (e.g., 130 or 330). In many embodiments, the dehumidification wheel (e.g., 130 or 330) is designed and operated to maximize moisture transfer (e.g., the fifth quantity of moisture, for instance, transferred in act 1350) and minimize heat transfer (e.g., the sixth quantity of sensible heat, for instance, transferred in act 1360). In various embodiments, however, the sixth quantity of sensible heat, which includes some of the third quantity of heat (e.g., transferred via the secondary direct-expansion refrigeration circuit, for example, 125 or 325, transferred in act 1330) provides for warmer supply air (e.g., 337), for example, cooled and dehumidified outdoor air (e.g., 305) despite a low supply air (e.g., 337) temperature prior to the transferring (e.g., in act 1360) of the sixth quantity of sensible heat from the exhaust airstream (e.g., 315 or 1115) to the supply airstream (e.g., 335 or 1135, for example, with the dehumidification wheel, for instance, 130 or 330). This can achieve a low dew point of the supply air (e.g., 337) delivered to the space (e.g., in act 1390) and also can avoid having supply air (e.g., 337) delivered to the space that is overly or uncomfortably cold.

Even further, in various embodiments, the transferring (e.g., in act 1310) of the first quantity of (e.g., sensible or latent) heat from the outdoor air (e.g., 305) entering the supply airstream (e.g., 335 or 1135) to the exhaust airstream (e.g., 315 or 1115, for instance, with the recovery wheel, for example, 110 or 310) takes place in the exhaust airstream (e.g., 315 or 1115) downstream of the transferring (e.g., in act 1350) of the fifth quantity of moisture from the supply airstream (e.g., 335 or 1135) to the exhaust airstream (e.g., 315 or 1115, for instance, with the (e.g., passive) dehumidification wheel, for example, 130 or 330). Further, in some embodiments, the act (e.g., 1310) of transferring the first quantity of heat from outdoor air (e.g., 305) entering the supply airstream (e.g., 335 or 1135) to the exhaust airstream (e.g., 315 or 1115) further includes transferring a seventh quantity of moisture from the outdoor air (e.g., 305) entering the supply airstream (e.g., 335 or 1135) to the exhaust airstream (e.g., 315 or 1115), for example, downstream, relative to the exhaust airstream, of the transferring (e.g., in act 1350) of the fifth quantity of moisture from the supply airstream (e.g., 335 or 1135) to the exhaust airstream (e.g., 315 or 1115). The seventh quantity of moisture is transferred (e.g., in act 1310), in many embodiments, with a desiccant coating on the total energy recovery wheel (e.g., 110 or 310), for example, in conjunction with transferring sensible heat. In various embodiments, the seventh quantity of moisture is transferred (e.g., in act 1310) from the outdoor air (e.g., 305) entering the supply airstream (e.g., 335 or 1135) to the exhaust airstream (e.g., 315 or 1115), downstream (with respect to the exhaust airstream) of the dehumidification wheel (e.g., 130 or 330).

Moreover, in some embodiments, or under some conditions, the conditioning (e.g., cooling) of the supply airstream (e.g., 1135 shown in FIG. 11, for instance, in act 1320), for example, downstream of the transferring (e.g., in act 1310) of the first quantity of heat includes removing an eighth quantity of heat from the supply airstream (e.g., at primary cooling coil 1150) and rejecting (e.g., in act 1328) the eighth quantity of heat, for instance, to the exhaust airstream (e.g., 1115), for example, downstream (i.e., relative to the exhaust airstream) of the transferring (e.g., in act 1310) of the first quantity of heat to the exhaust airstream (e.g., at primary condenser coil 1104 shown in FIG. 11). In various embodiments, the conditioning or cooling (e.g., in act 1320) of the supply airstream (e.g., downstream, relative to the supply airstream, of the transferring of the first quantity of heat, for example, in act 1310) takes place at the primary cooling coil (e.g., 1150), for example.

In various embodiments, further heat (e.g., compressor energy, for instance, from compressor 1120, that has been converted to heat by first stage or primary direct expansion refrigeration circuit 1122), in addition to the eighth quantity of heat that was removed from the supply airstream (e.g., 1135), is rejected (e.g., in act 1328) to the exhaust airstream (e.g., 1115), for example, downstream (i.e., relative to the exhaust airstream) of the transferring (e.g., in act 1310) of the first quantity of heat to the exhaust airstream. Further, in a number of embodiments, including in the embodiment illustrated, the conditioning (e.g., cooling, for example, in act 1320) of the supply airstream (e.g., 1135) downstream of the transferring (e.g., in act 1310) of the first quantity of heat includes operating a primary direct-expansion refrigeration circuit (e.g., 1122) that includes at least one primary circuit compressor (e.g., 1120), a primary circuit evaporator coil (e.g., 1150) located in the supply airstream (e.g., 1135), and a primary circuit condenser coil (e.g., 1104). In a number of embodiments, the primary circuit condenser coil (e.g., 1104) is located in the exhaust airstream (e.g., 1115), for example, downstream (i.e., relative to the exhaust airstream) of the recovery wheel (e.g., 110) where the first quantity of heat is transferred (e.g., in act 1310) to the exhaust airstream (e.g., 1115).

Further, various embodiments include separating the outdoor air (e.g., 305 shown in FIG. 3) or supply airstream (e.g., 335 or 1135) from the return air (e.g., 345 or 1145) or exhaust airstream (e.g., 315 or 1115), for example, with a partition (e.g., 111 or 311). In various embodiments, for instance, the recovery wheel (e.g., 110 or 310) is located in a first opening (e.g., 601 shown in FIG. 6) in the partition (e.g., 111 or 311), the (e.g., passive) dehumidification wheel (e.g., 130 or 330) is located in a second opening (e.g., 602 shown in FIG. 6) in the partition (e.g., 111 or 311), or both. Still further, various methods include guiding (e.g., with ductwork or walls) the outdoor air (e.g., 305) and the return air (e.g., 345 or 1145), for example, in substantially opposite directions (e.g., as shown). Even further, a number of embodiments include (e.g., an act of) enclosing within an enclosure (e.g., 101), the recovery wheel (e.g., 110 or 310), the dehumidification wheel (e.g., 130 or 330), the primary cooling coil (e.g., 150, 350, or 1150), the secondary direct-expansion refrigeration circuit evaporator coil (e.g., 160 or 360), the secondary direct-expansion refrigeration circuit condenser coil (e.g., 140 or 340), or a combination thereof. In some embodiments, for example, the secondary direct-expansion refrigeration circuit (e.g., 125 or 325) is substantially or entirely enclosed with the enclosure, for example. Further still, various embodiments include enclosing within the enclosure the supply fan (e.g., 113, 313, or 1113) that moves the outdoor air (e.g., 305) or supply airstream (e.g., 335 or 1135), for example, first through the recovery wheel (e.g., 110 or 310), then through the primary cooling coil (e.g., 150, 350, or 1150), then through the secondary cooling coil or secondary direct-expansion refrigeration circuit evaporator coil (e.g., 160 or 360), then through the dehumidification wheel (e.g., 130 or 330), and then to the space (e.g., in act 1390). Even further still, various embodiments include (e.g., an act of) enclosing within the enclosure (e.g., 101) the exhaust fan (e.g., 112, 312, or 1112) that moves the return air (e.g., 345 or 1145) (e.g., from the space), for instance, first through the heating coil or secondary direct-expansion refrigeration circuit condenser coil (e.g., 140 or 340), then through the dehumidification wheel (e.g., 130 or 330), and then through the recovery wheel (e.g., 110 or 310). Moreover, some embodiments include (e.g., an act of) enclosing within the enclosure (e.g., 101) the partition (e.g., 111 or 311) that separates the outdoor air (e.g., 305) or supply airstream (e.g., 335 or 1135) from the return air (e.g., 345 or 1145), for example, within the enclosure.

In many embodiments, the method includes (or act 1390 includes, for example) passing the supply air (e.g., 337), supply airstream (e.g., 335 or 1135), or outdoor air (e.g., 305, for example, once cooled and dehumidified, as described herein) through supply ductwork that delivers the outdoor air (e.g., 305) or supply airstream (e.g., 335 or 1135) to the space, for example, after the outdoor air (e.g., 305) or supply airstream (e.g., 335 or 1135) passes through the (e.g., passive) dehumidification wheel (e.g., 130 or 330). Further, in some embodiments, the method (or act 1390) includes delivering the outdoor air (e.g., 305) or supply airstream (e.g., 335 or 1135) to multiple zones within the space, cooling the space, for example, with multiple chilled beams located within the space, or both. Still further, some embodiments include operating a main chiller that chills cooling water, or chilling the cooling water, and passing the cooling water through the multiple chilled beams located within the space. Even further, in some embodiments, the method includes (or act 1250 or 1320 includes) passing the cooling water from the main chiller (e.g., the primary chiller, or, in some embodiments, from a separate chiller) through the primary cooling coil (e.g., 150 or 350). Further still, in particular embodiments, the act of cooling the space (e.g., with multiple chilled beams located within the space) or act 1390, as another example, includes cooling the space with active chilled beams, delivering the outdoor air or supply air (e.g., 337) to the multiple chilled beams located within the space, inducing room air across the chilled beams or cooling coils within the chilled beams so as to enhance the cooling capacity delivered to the space, or a combination thereof. For example, in certain embodiments, the act of cooling the space with the multiple chilled beams located within the space, or act 1390 of delivering the supply air, includes moving the supply airstream (e.g., 335 or 1135) delivered to the space through slots or nozzles within the multiple chilled beams to induce room air in the space over coils within the multiple chilled beams to enhance cooling capacity provided by the multiple chilled beams.

Even further still, in certain embodiments, act 1390, or, in particular embodiments, the act of cooling the space with the multiple chilled beams located within the space, includes cooling each of the multiple zones with at least one of the multiple chilled beams, circulating chilled water through at least one of the multiple chilled beams, for example, with a separate chilled water zone pump for each of the multiple zones, measuring temperature of chilled water that passes through the multiple chilled beams located within the space, modulating a chilled water control valve for each of the multiple zones, passing chilled water from a chilled water supply header into the at least one of the multiple chilled beams that are located within that zone, or a combination thereof. Moreover, in some embodiments, the method includes controlling flow of chilled water from a chilled water supply header into the (e.g., multiple) chilled beams to avoid formation of condensation on the multiple chilled beams, using a digital controller for each of the multiple zones to control the flow of the chilled water from the chilled water supply header into the at least one of the multiple chilled beams in that zone, controlling zone air temperature in response to a measurement of zone air temperature, or a combination thereof, as examples. Other alternatives and other embodiments are described herein or would be apparent to a person of ordinary skill in the art. For example, other alternatives for cooling the space or zones are also described herein and acts of cooling the space with other equipment (e.g., as described herein) besides chilled beams are included in other embodiments.

Various methods or acts, in particular embodiments, include rejecting heat (e.g., from the space) to a geothermal heat sink (e.g., in act 1260 shown in FIG. 12. For example, some embodiments include rejecting heat (e.g., obtained in act 1250 or 1320) from the primary cooling coil (e.g., 150, 350, or 1150) to the geothermal heat sink. Further, certain embodiments include using a direct-expansion refrigeration circuit that uses the geothermal heat sink as a geothermal condenser in a cooling mode. Still further, in some (e.g., heat pump) embodiments, the method includes using the geothermal heat sink as an evaporator in a heating mode. Further still, in some embodiments, the method includes operating a primary direct-expansion refrigeration circuit that uses the primary cooling coil (e.g., 150, 350, or 1150) as a primary evaporator (e.g., in act 1250 or 1320). Even further, in some embodiments, the method (e.g., 1200 or 1300) includes operating a heat pump that both cools and heats the primary cooling coil (e.g., 150, 350, or 1150) depending on whether cooling or heating of the space is demanded, for example, by at least one thermostat located within the space.

Even further still, in various embodiments, the space includes multiple zones, and the method includes cooling each of the multiple zones with at least one zone direct-expansion refrigeration circuit, for example, by operating a zone compressor, cooling a zone indoor air coil, and rejecting heat from the zone through a zone (e.g., outdoor) heat exchanger, for example. In various embodiments, the act of cooling each of the multiple zones with at least one zone direct-expansion refrigeration circuit includes rejecting heat from the zone to a geothermal heat exchanger (e.g., the zone outdoor heat exchanger). Further, in various embodiments, for instance, each at least one zone direct-expansion refrigeration circuits is a heat pump and the method further includes heating each of the multiple zones with the at least one zone direct-expansion refrigeration circuit by operating the zone compressor, heating the zone indoor air coil, and obtaining heat for the zone (e.g., in act 1260) through the zone outdoor heat exchanger (e.g., geothermal heat exchanger), for example.

In some embodiments, the method includes transferring more heat with the primary cooling coil (e.g., 150, 350, or 1150, for instance, in act 1250 or 1320), for example, at maximum capacity, than the secondary cooling coil or secondary direct-expansion refrigeration circuit evaporator coil (e.g., 160 or 360, for instance, in act 1210 or 1330), for instance, at maximum capacity. For example, in particular embodiments, the method includes transferring more than twice as much heat with the primary cooling coil (e.g., 150, 350, or 1150) at maximum capacity than the secondary cooling coil or secondary direct-expansion refrigeration circuit (e.g., 125 or 325) evaporator coil (e.g., 160 or 360) transfers at maximum capacity. Further, in some embodiments, the method includes passing (e.g., in act 1220) the outdoor air (e.g., 305) or supply airstream (e.g., 335 or 1135) at a greater volumetric flowrate than the return air (e.g., 345 or 1145, for instance, in act 1230), for example, to pressurize the building. Further still, in some embodiments, the method includes modulating the speed of the secondary direct-expansion refrigeration circuit (e.g., 125 or 325) or compressor (e.g., 120 or 320, for example, in act 1210, 1270, or 1330), for instance, to control the humidity of the air delivered to the space (e.g., in act 1390).

Even further, in some embodiments, the method includes operating (e.g., in act 1210 or 1330) the secondary direct-expansion refrigeration circuit (e.g., 125 or 325), or specifically, the compressor (e.g., 120 or 320), for example, whenever the system (e.g., 100, 300, or 1100) is operating (e.g., in act 1250 or 1320) in a cooling mode. Still further, in particular embodiments, the method includes modulating cooling at the primary cooling coil (e.g., 150, 350, or 1150, for instance, in act 1250 or 1320), for example, to control temperature of the space when operating in a cooling mode, when operating in a dehumidification mode (e.g., in act 1270), or both. Even further still, in some embodiments, the method includes modulating cooling at the primary cooling coil (e.g., 150, 350, or 1150) to control temperature of the (e.g., air conditioned) outdoor air (e.g., 305) or supply airstream (e.g., 335, 1135) leaving the (e.g., passive) dehumidification wheel (e.g., 130 or 330, for example, supply air 337) when operating in a cooling mode, when operating in a dehumidification mode, or both. Moreover, in certain embodiments, the method includes modulating (e.g., in act 1210 or 1330) the speed of the secondary direct-expansion refrigeration circuit (e.g., 125 or 325) compressor (e.g., 120 or 320) to adjust reheat capacity at the secondary condenser coil (e.g., 140 or 340) when operating in a cooling mode, when operating in a dehumidification mode (e.g., in act 1270), or both.

In some embodiments, the method further includes operating in an economizer mode in which cooling at the primary cooling coil (e.g., 150, 350, or 1150, for example, act 1250 or 1320) is turned off and the secondary direct-expansion refrigeration circuit (e.g., 125 or 325) and compressor (e.g., 120 or 320) is operated (e.g., in act 1210 or 1330), for example, to dehumidify (e.g., in act 1270) the outdoor air (e.g., 305) or supply airstream (e.g., 335 or 1135) with the secondary direct-expansion refrigeration circuit (e.g., 125 or 325) or specifically the evaporator coil (e.g., 160 or 360) and, in a number of embodiments, with the dehumidification wheel (e.g., 130 or 330). Further, in various embodiments, the method includes transferring moisture (e.g., in act 1240, 1270, or 1310) from the outdoor air (e.g., 305) or supply airstream (e.g., 315 or 1115) to the return air (e.g., 345 or 1145) or exhaust airstream (e.g., 315 or 1115) with the (e.g., total energy) recovery wheel (e.g., 110 or 310).

Still further, in some embodiments, the method includes heating the outdoor air (e.g., 305) or supply airstream (e.g., 335 or 1135) when operating in a heating mode using a heating coil (e.g., within the enclosure, for instance, 101) that is separate from the primary coil (e.g., 150, 350, or 1150) and that is separate from the secondary cooling coil or secondary direct-expansion refrigeration circuit evaporator coil (e.g., 160 or 360). In some embodiments, however, the method includes heating the outdoor air (e.g., 305) or supply airstream (e.g., 335 or 1135) when operating in the heating mode (e.g., in act 1250 or 1320) using the primary coil (e.g., 150, 350, or 1150) or primary direct expansion circuit (e.g., 1122). Even further, in some embodiments, the method (e.g., 1200 or 1300) includes transferring moisture (e.g., in act 1240, 1270, or 1350) from the outdoor air (e.g., 305) or supply airstream (e.g., 335 or 1135) to the return air (e.g., 345 or 1145) or the exhaust airstream (e.g., 315 or 1115) with the dehumidification wheel (e.g., 130 or 330). Further still, in particular embodiments, the method includes transferring sensible heat (e.g., in act 1360) from the return air (e.g., 345 or 1145) or exhaust airstream (e.g., 315 or 1115) to the outdoor air (e.g., 305) or supply airstream (e.g., 335 or 1135) with the dehumidification wheel (e.g., 130 330).

Even further still, in various embodiments, the method (e.g., 1200 or 1300) includes condensing moisture out of the outdoor air (e.g., 305) or supply airstream (e.g., 335 or 1135) with the primary cooling coil (e.g., 150, 350, or 1150, for example, in act 1220, 1250, 1270, or 1320), condensing (e.g., additional) moisture out of the outdoor air (e.g., 305) or supply airstream (e.g., 335 or 1135) with the secondary cooling coil or secondary direct-expansion refrigeration circuit evaporator coil (e.g., 160 or 360, for instance, in act 1210, 1220, 1270, or 1330), transferring sensible heat to the return air (e.g., 345 or 1145) with the heating coil or secondary direct-expansion refrigeration circuit condenser coil (e.g., 140 or 340, for example, in act 1210, 1230, or 1330), or a combination thereof. Moreover, in certain embodiments, the method includes transferring heat from the secondary cooling coil or secondary direct-expansion refrigeration circuit evaporator coil (e.g., 160 or 360) to the heating coil or secondary direct-expansion refrigeration circuit condenser coil (e.g., 140 or 340) with the secondary direct-expansion refrigeration circuit (compressor (e.g., 120 or 320), the secondary direct-expansion refrigeration circuit (e.g., 125 or 325), or both (e.g., in act 1210, 1220, 1230, 1330, or a combination thereof).

In some embodiments, the method or act (e.g., 1210, 1270, or 1330) of operating the secondary compressor (e.g., 120 or 320) includes ensuring that condensation does not occur during low airflow conditions on the return air (e.g., 345 or 1145) or exhaust airstream (e.g., 315 or 1115) side, for example, on the partition (e.g., 111 or 311) described above, for instance, resulting from pressurization needs or variable volume operation. Certain embodiments include, for example, increasing the temperature entering or leaving (or both) the return air (e.g., 345 or 1145) side of the dehumidification wheel (e.g., 130 or 330), for instance, to avoid condensation, for example, during low airflow conditions, for instance, on the return air (e.g., 345 or 1145) side, for instance, on the partition (e.g., 111 or 311), for example, resulting from pressurization needs or variable volume operation.

Further still, in some embodiments, the method or act (e.g., 1210 or 1330 of operating the secondary compressor (e.g., 120 or 320) or the secondary direct-expansion refrigeration circuit (e.g., 125 or 325) includes providing cooling when the chilled water plant or chiller is turned off, for example, due to temperature lockout or time of year, as examples. Even further, certain embodiments include, for example, operating the system (e.g., 100 or 300) in a part-load mode in which cooling at the primary cooling coil (e.g., 150, 350, or 1150) is turned off and the supply airstream (e.g., 335 or 1135) is cooled using the secondary cooling coil (e.g., 160 or 360). Particular embodiments specifically include (e.g., in act 1210 or 1330) modulating cooling at the secondary cooling coil (e.g., 160 or 360), for example, to control temperature of the supply airstream (e.g., 335 or 1135), the space, or both.

Some embodiments include (e.g., when warranted by conditions) dehumidifying (e.g., in act 1270) the supply airstream (e.g., 335 or 1135), for example, with the secondary cooling coil (e.g., 160 or 360), the (e.g., desiccant-based or passive) dehumidification wheel (e.g., 130 or 330, for instance, in act 1240 or 1350), or both (e.g., in addition to or instead of cooling with the secondary cooling coil (e.g., 160 or 360), for example, when the primary cooling coil (e.g., 150, 350, or 1150, for example, operated in act 1250 or 1320) is turned off. Further, in certain embodiments, the method or act (e.g., 1240, 1270, 1350, 1360, or a combination thereof) includes slowing or stopping the dehumidification wheel (e.g., 130 or 330), for instance, when warranted by conditions, for example, to reduce or avoid reheating the supply airstream (e.g., 335 or 1135) after being cooled by the secondary cooling coil (e.g., 160 or 360), for example, when the primary cooling coil (e.g., 150, 350, or 1150) is turned off). Further still, in particular embodiments, the method or act (e.g., 1210 or 1330) of operating the secondary direct-expansion refrigeration circuit (e.g., 125 or 325) or another act, includes reducing the speed of or stopping the recovery wheel (e.g., 110 or 310), for example, when warranted by conditions, for instance, to reduce or avoid heating the supply airstream (e.g., 335 or 1135), for example, prior to being cooled by the secondary cooling coil (e.g., 160 or 360), for example, when the primary cooling coil (e.g., 150, 350, or 1150) is turned off.

Even further, in some embodiments, the method or act (e.g., 1210 or 1330), for example, of operating the secondary compressor or the secondary direct-expansion refrigeration circuit (e.g., 125 or 325), includes delivering (e.g., in act 1390) colder air than would be possible with a chilled water system alone, for instance, due to the temperature limitation of the chilled water available. In particular embodiments, for example, the method or act includes allowing air that is colder or that has a lower dew point (or both) to be produced and delivered (e.g., in act 1390), for example, in conjunction with the dehumidification wheel (e.g., 130 or 330), for instance, in comparison with a system (e.g., shown in FIGS. 2 and 4) having chilled water that does not have a secondary direct expansion circuit.

Moreover, in some embodiments, the method or act (e.g., 1210 or 1330), for example, of operating the secondary compressor (e.g., 120 or 320) or the secondary direct-expansion refrigeration circuit (e.g., 125 or 325), includes operating or modulating (or both) the secondary direct-expansion refrigeration circuit or compressor (e.g., 120 or 320), for example, the system controller (e.g., 170), to deliver (e.g., in act 1390) a warmer supply air (e.g., 337) temperature to the occupied space or active chilled beams, for instance, to avoid over-cooling of the space (e.g., in act 1250 or 1320) by the primary airflow alone, for example, when low dew point is desired (e.g., in act 1270). For example, in some embodiments, the method or act, for example, of operating the secondary compressor (e.g., 120 or 320) or the secondary direct-expansion refrigeration circuit (e.g., 125 or 325), includes operating or modulating (or both) the secondary direct-expansion refrigeration circuit (e.g., 125 or 325) or compressor (e.g., 120 or 320), for example, with the system controller (e.g., 170) to increase supply air (e.g., 337) temperature delivered (e.g., in act 1390) to the occupied space or active chilled beams, for instance, in response to space temperature relative to a thermostat temperature setpoint, or in response to supply air (e.g., delivered in act 1390) temperature, for example, to avoid over-cooling of the space by the primary airflow, for instance, when low dew point is desired.

In some embodiments, the method or act (e.g., 1210 or 1330), for example, of operating the secondary compressor (e.g., 120 or 320) or the secondary direct-expansion refrigeration circuit (e.g., 125 or 325), includes providing cooling, dehumidification (e.g., in act 1270), or condensation control, for instance, during the startup and construction phase of a building. For example, in certain embodiments, the method or act (e.g., 1210 or 1330) includes operating, controlling, or modulating (e.g., or a combination thereof) the secondary direct-expansion refrigeration circuit (e.g., 125 or 325) to provide cooling, dehumidification, condensation control, or a combination thereof during the startup and construction phase of a building. In some embodiments, due to unconditioned areas, lack of finalized air balancing or controls, the secondary direct-expansion refrigeration circuit (e.g., 125 or 325) can provide temporary cooling (e.g., in act 1210 or 1330), for instance, during times when the space humidity is high or even uncontrollable, at least to design levels. During these times, for instance, the method or act can prevent condensation, for example, on the dehumidification wheel (e.g., 130 or 330) served by a chilled water system. In various situations, this can prevent problems which can damage the wheel or cause corrosion, among other things.

In a number of embodiments, the method or act can include (e.g., operating or modulating the secondary direct-expansion refrigeration circuit (e.g., 125 or 325) specifically for (e.g., in act 1210, 1270, or 1330) reducing the relative humidity or raising the temperature of the return air (e.g., 345 or 1145) or exhaust airstream (e.g., 315 or 1115) before the (e.g., passive) dehumidification wheel (e.g., 130 or 330). In some embodiments, the method or act can include, for another example, providing temporary cooling, for instance, during times when the space humidity is high or even uncontrollable, at least to design levels. In some embodiments, the method or act can include (e.g., in act 1270), for yet another example, preventing condensation, preventing corrosion, preventing damage, or a combination thereof, for instance, on the dehumidification wheel (e.g., 130 or 330), for example, on systems served by a chilled water system.

In various embodiments, the method or act (e.g., 1210 or 1330), for example, of operating the secondary compressor (e.g., 120 or 320) or the secondary direct-expansion refrigeration circuit (e.g., 125 or 325), includes modulating down (e.g., reducing in speed or capacity) the secondary direct-expansion refrigeration circuit (e.g., 125 or 325) or secondary compressor (e.g., 120 or 320), or even turning off the secondary direct-expansion refrigeration circuit or secondary compressor, when conditions within the space have a high sensible load and a low latent load, when cold air is desired from the system or unit, when condensation on the return air (e.g., 345 or 1145) side leaving the (e.g., passive) dehumidification wheel (e.g., 130 or 330) is not a concern, or a combination thereof (e.g., all thereof) for example. Under such conditions, in some embodiments, the method (e.g., 1200 or 1300) includes cooling (e.g., in act 1210 or 1330) the supply airstream (e.g., 335 or 1135) with the primary cooling coil (e.g., 150, 350, or 1150), for instance. Under such conditions, in certain embodiments, the method includes providing dehumidification (e.g., in act 1250, 1270, or 1320) with the primary cooling coil (e.g., 150, 350, or 1150). In some embodiments, for example, the method or act includes turning off the secondary direct-expansion refrigeration circuit (e.g., 125 or 325) or compressor (e.g., 120 or 320), for example, that are operated in act 1210 or 1330, and providing cooling (e.g., in act 1220, 1250, or 1320) with the primary cooling coil (e.g., 150, 350, or 1150), for example, when conditions within the space have a high sensible load and low latent load, when cold air is desired from the unit, when condensation on the return air side (e.g., the exhaust airstream 315 or 1115) leaving the dehumidification wheel (e.g., 130 or 330) is not a concern, or a combination thereof.

In particular embodiments, the method or act (e.g., 1210 or 1330) includes reducing the speed or capacity of the secondary compressor (e.g., 120 or 320) or reducing the capacity of the secondary direct-expansion refrigeration circuit (e.g., 125 or 325) when conditions within the space have a high sensible load and low latent load, when cold air is desired from the unit, when condensation on the return air side (e.g., the exhaust airstream 315 or 1115) leaving the dehumidification wheel (e.g., 130 or 330) is not a concern, or a combination thereof. In particular embodiments, the method or act includes implementing these control strategies, for example, under conditions that are relatively hot and dry. In a number of embodiments, the method or act (e.g., 1210, 1270, or 1330) includes modulating down or turning off the secondary direct-expansion refrigeration circuit (e.g., 125 or 325) or compressor (e.g., 120 or 320), for example, in response to space temperature relative to one or more thermostat setpoints and one or more humidity or dew point measurements, for example.

In some embodiments, the method or act, for example, of operating the secondary circuit compressor (e.g., 120 or 320) or the secondary direct-expansion refrigeration circuit (e.g., 125 or 325), includes maintaining space humidity (e.g., act 1270) for example, during unoccupied hours, for instance, in a school. In various embodiments, the method or act (e.g., 1210 or 1330), for example, of operating the secondary compressor (e.g., 120 or 320) or the secondary direct-expansion refrigeration circuit (e.g., 125 or 325), includes providing an unoccupied mode where minimal outdoor air (e.g., 305), and thereby cooling load, is required. In a number of embodiments, the method or act (e.g., 1210 or 1330), for instance, of operating the secondary compressor (e.g., 120 or 320) or the secondary direct-expansion refrigeration circuit (e.g., 125 or 325), includes operating the secondary direct-expansion refrigeration circuit (e.g., 125 or 325) to perform dehumidification, (e.g., act 1270, for instance, all of the dehumidification needs of the system (e.g., 100, 300, or 1100) without operating the primary cooling coil (e.g., 150, 350, or 1150), for example, not operating the (or each) chiller or chilled water, direct expansion (e.g., 1122), or heat pump circuit.

In some embodiments, for example, the method or act includes operating or modulating the secondary direct-expansion refrigeration circuit (e.g., 125 or 325) or compressor (e.g., 120 or 320) to maintain space humidity during unoccupied hours, to provide an unoccupied mode where minimal outdoor air (e.g., 305), and thereby cooling load, is required, or both. In various embodiments, the method or act (e.g., 1210 or 1330), for example, includes operating or modulating the secondary direct-expansion refrigeration circuit (e.g., 125 or 325) or compressor (e.g., 120 or 320), for instance, during unoccupied periods, under appropriate conditions, or both, to perform dehumidification (e.g., in act 1270), for example, all of the dehumidification needs, for instance, without operating (e.g., while turning off and leaving turned off) the primary cooling coil (e.g., 150, 350, or 1150) or the chilled water, direct expansion (e.g., 1122), or heat pump circuit.

Further, various embodiments of the subject matter described herein include various combinations of the acts, structure, components, and features described herein, shown in the drawings, described in documents that are submitted herewith or incorporated by reference herein, or that are known in the art. Moreover, certain procedures can include acts such as manufacturing, obtaining, or providing components that perform functions described herein or in the documents that are incorporated by reference. The subject matter described herein also includes various means for accomplishing the various functions or acts described herein, in the documents that are submitted herewith or incorporated by reference, or that are apparent from the structure and acts described. Each function described herein is also contemplated as a means for accomplishing that function, or where appropriate, as a step for accomplishing that function. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:

1. A system for controlling temperature and humidity within a space in a building, the system comprising:
   a recovery wheel;
   a desiccant-based dehumidification wheel;
   a primary cooling coil; and
   a secondary direct-expansion refrigeration circuit comprising a secondary circuit compressor, a secondary circuit evaporator coil, and a secondary circuit condenser coil;
   wherein:
      the system forms a supply airstream that passes outdoor air first through the recovery wheel, then through the primary cooling coil, then through the secondary circuit evaporator coil, then through the desiccant-based dehumidification wheel, and then to the space; and
      the system forms an exhaust airstream that passes return air from the space first through the secondary circuit condenser coil, then through the desiccant-based dehumidification wheel, and then through the recovery wheel.

2. The system of claim 1 wherein:
   the recovery wheel is a total energy recovery wheel comprising a desiccant coating;
   the recovery wheel transfers sensible heat between the outdoor air of the supply airstream and the exhaust airstream; and
   the recovery wheel transfers moisture between the outdoor air of the supply airstream and the exhaust airstream.

3. The system of claim 1 wherein the desiccant-based dehumidification wheel is a passive dehumidification wheel and the system further comprises:
   a supply fan located in the supply airstream that moves the outdoor air first through the recovery wheel, then through the primary cooling coil, then through, the secondary circuit evaporator coil, then through the desiccant-based dehumidification wheel, and then to the space; and
   an exhaust fan located in the exhaust airstream that moves the return air from the space first through the secondary circuit condenser coil, then through the desiccant-based dehumidification wheel, and then through the recovery wheel.

4. The system of claim 1 further comprising a partition between the supply airstream and the exhaust airstream, wherein:
   the recovery wheel is located in a first opening in the partition;
   the desiccant-based dehumidification wheel is located in a second opening in the partition;
   at least adjacent to the partition, the supply airstream and the exhaust airstream travel in substantially opposite directions; and
   the system further comprises an enclosure that contains the recovery wheel, the desiccant-based dehumidification wheel, the primary cooling coil, the secondary circuit evaporator coil, the secondary circuit condenser coil, at least part of the supply airstream, at least part of the exhaust airstream, and the partition.

5. The system of claim 1 further comprising a primary direct-expansion refrigeration circuit comprising the primary cooling coil as a primary evaporator wherein the primary direct-expansion refrigeration circuit is a heat pump that both cools and heats the primary cooling coil depending on whether cooling or heating of the space is demanded.

6. The system of claim 1 further comprising a primary direct-expansion refrigeration circuit comprising:
   the primary cooling coil which acts as a primary evaporator when operating in a cooling mode;
   a primary condensing coil which acts as a condenser when operating in the cooling mode; and
   at least one primary compressor;
   wherein the exhaust airstream passes through the primary condensing coil.

7. The system of claim 6 wherein the return air of the exhaust airstream passes first through the secondary circuit condenser coil, then through the desiccant-based dehumidification wheel, then through the recovery wheel, and then through the primary condensing coil.

8. The system of claim 1 further comprising a system controller configured to:
   operate the secondary circuit compressor whenever the system is operating in a cooling mode;
   operate the secondary circuit compressor whenever the system is operating in a dehumidification mode;
   modulate cooling at the primary cooling coil to control temperature of the space when operating in the cooling mode;
   modulate cooling at the primary cooling coil to control absolute humidity level or dew point of the space when operating in the dehumidification mode;
   modulate cooling at the primary cooling coil to control temperature of the supply airstream delivered to the space when operating in the cooling mode; and
   modulate cooling at the primary cooling coil to control absolute humidity level or dew point of the supply airstream delivered to the space when operating in the dehumidification mode.

9. The system of claim 1 further comprising a system controller configured to modulate the secondary circuit compressor to adjust reheat, capacity at the secondary condenser coil when operating in a cooling mode.

10. The system of claim 1 further comprising a system controller configured to modulate rotational speed of the dehumidification wheel based on a measured temperature of the supply airstream delivered to the space to control the temperature of the supply airstream delivered to the space.

11. The system of claim 1 further comprising a system controller configured to operate the system in an economizer mode in which cooling at the primary cooling coil is turned off and the secondary circuit compressor is operated to dehumidify the supply airstream with the secondary circuit evaporator coil and the desiccant-based dehumidification wheel.

12. The system of claim 1 further comprising a system controller configured to operate the system in a part-load or recirculation mode in which cooling at the primary cooling coil is modulated down or off and cooling at the secondary cooling coil is modulated to dehumidify the supply airstream using the desiccant-based dehumidification wheel.

13. The system of claim 1 wherein the system controls temperature and humidity within the space in the building, including simultaneously:

operating the secondary circuit compressor of the secondary direct-expansion refrigeration circuit;

passing the outdoor air first through the recovery wheel, then through the primary cooling coil, then through the secondary circuit evaporator coil, then through the desiccant-based dehumidification wheel, and then to the space; and passing the return air from the space first through the secondary circuit condenser coil, then through the desiccant-based dehumidification wheel, and then through the recovery wheel.

14. The system of claim 1 wherein the recovery wheel comprises a desiccant coating.

15. The system of claim 1 wherein the system modulates the secondary circuit compressor to adjust reheat capacity at the secondary condenser coil when operating in a dehumidification mode.

16. The system of claim 1 wherein the system:
condenses moisture out of the outdoor air with the secondary circuit evaporator coil; and
transfers sensible heat to the return air with the secondary circuit condenser coil.

17. The system of claim 1 wherein the system simultaneously:
transfers a first quantity of heat from the outdoor air entering the supply airstream to the exhaust airstream;
cods the supply airstream downstream of where the system transfers the first quantity of heat, including condensing a second quantity of moisture from the supply airstream;
transfers a third quantity of heat from the supply airstream to the return air entering the exhaust airstream, wherein:
the third quantity of heat is transferred from the supply airstream downstream of where the system condenses the second quantity of moisture from the supply airstream;
transferring of the third quantity of heat from the supply airstream includes condensing a fourth quantity of moisture from the supply airstream;
transferring of the third quantity of heat from the supply airstream to the return air entering the exhaust airstream is performed using the secondary direct-expansion refrigeration circuit;
transfers a fifth quantity of moisture from the supply airstream to the exhaust airstream, wherein the fifth quantity of moisture is transferred from the supply airstream to the exhaust airstream in the supply airstream downstream of where the third quantity of heat is transferred from the supply airstream to the return air entering the exhaust airstream, and wherein the fifth quantity of moisture is transferred from the supply airstream to the exhaust airstream in the exhaust airstream downstream of where the third quantity of heat is transferred from the supply airstream to return air entering the exhaust airstream;
in conjunction with transferring the fifth quantity of moisture from the supply airstream to the exhaust airstream, the system transfers a sixth quantity of sensible heat from the exhaust airstream to the supply airstream, wherein transferring the sixth quantity of sensible heat from the exhaust airstream to the supply airstream takes place in the supply airstream downstream of where the third quantity of heat is transferred from the supply airstream to the return air entering the exhaust airstream, and wherein the sixth quantity of sensible heat is transferred from the exhaust airstream to the supply airstream in the exhaust airstream downstream of where the third quantity of heat is transferred from the supply airstream to the return air entering the exhaust airstream; and delivers the supply airstream to the space downstream of where the sixth quantity of sensible heat is transferred from the exhaust airstream to the supply airstream;
wherein:
delivering of the supply airstream to the space takes place in the supply airstream downstream of where the fifth quantity of moisture is transferred from the supply airstream to the exhaust airstream; and
the first quantity of heat is transferred from the outdoor air entering the supply airstream to the exhaust airstream in the exhaust airstream downstream of where the fifth quantity of moisture is transferred from the supply airstream to the exhaust airstream.

18. The system of claim 17 wherein:
the first quantity of heat comprises both sensible and latent heat;
transferring the first quantity of heat from the outdoor air entering the supply airstream to the exhaust airstream further comprises transferring a seventh quantity of moisture from the outdoor air entering the supply airstream to the exhaust airstream; and
the transferring of the seventh quantity of moisture from the outdoor air entering the supply airstream to the exhaust airstream takes place in the exhaust airstream downstream of where the fifth quantity of moisture is transferred from the supply airstream to the exhaust airstream.

19. The system of claim 17 wherein cooling of the supply airstream downstream of the transferring of the first quantity of heat comprises removing an eighth quantity of heat from the supply airstream and rejecting the eighth quantity of heat to the exhaust airstream downstream of where the first quantity of heat is transferred to the exhaust airstream.

20. The system of claim 1 wherein the system is configured to:
operate the secondary circuit compressor whenever the system is operating in a cooling mode;
operate the secondary circuit compressor whenever the system is operating in a dehumidification mode;
modulate cooling at the primary cooling coil to control temperature of the space when operating in the cooling mode;
modulate cooling at the primary cooling coil to control absolute humidity level or dew point of the space when operating in the dehumidification mode;
modulate cooling at the primary cooling coil to control temperature of the supply airstream delivered to the space when operating in the cooling mode;
modulate cooling at the primary cooling coil to control absolute humidity level or dew point of the supply airstream delivered to the space when operating in the dehumidification mode;
modulate the secondary circuit compressor to adjust reheat capacity at the secondary condenser coil when operating, in a cooling mode;
modulate rotational speed of the dehumidification wheel based on a measured temperature of the supply airstream delivered to the space to control the temperature of the supply airstream delivered to the space;
operate the system in an economizer mode in which cooling at the primary cooling coil is turned off and the secondary circuit compressor is operated to dehumidify the supply airstream with the secondary circuit evaporator coil and the desiccant-based dehumidification wheel; and operate the system in a part-load or recirculation mode in which cooling at the primary cooling coil is modulated down or off and cooling at the secondary cooling coil is modulated to dehumidify the supply airstream using the desiccant-based dehumidification wheel.

21. The system of claim 1 wherein approximately 25 percent of a cooling capacity of the system is provided by the secondary direct-expansion refrigeration circuit with the secondary circuit compressor.

22. The system of claim 1 wherein the primary cooling coil transfers more than three (3) times as much heat at maximum capacity as the secondary circuit evaporator coil transfers at maximum capacity.

23. The system of claim 1 wherein:
the desiccant-based dehumidification wheel removes moisture from the supply airstream;
the desiccant-based dehumidification wheel regenerates with the exhaust airstream returned from the space; and
the exhaust airstream returned from the space is at a temperature below 100 degrees F. when entering the desiccant-based dehumidification wheel.

24. The system of claim 1 wherein the desiccant-based dehumidification wheel regenerates without a regenerating airstream entering the desiccant-based dehumidification wheel having been heated to a temperature that exceeds 100 degrees F.

25. The system of claim 1 wherein the desiccant-based dehumidification wheel is a passive dehumidification wheel.

26. The system of claim 1 further comprising a primary direct-expansion refrigeration circuit comprising the primary cooling coil.

27. The system of claim 1 wherein:
the primary cooling coil is cooled with chilled water that has been cooled by one or more chillers; and
the secondary direct-expansion refrigeration circuit is used to deliver colder air than would be possible with a chilled water system alone due to a temperature limitation of chilled water available.

28. The system of claim 1 further comprising a system controller configured to operate and modulate the secondary direct-expansion refrigeration circuit to prevent condensation on the dehumidification wheel.

* * * * *

UNITED STATES PATENT AND TRADEMARK OFFICE
CERTIFICATE OF CORRECTION

PATENT NO. : 10,690,358 B2
APPLICATION NO. : 15/616702
DATED : June 23, 2020
INVENTOR(S) : John C. Fischer Page 1 of 1

It is certified that error appears in the above-identified patent and that said Letters Patent is hereby corrected as shown below:

In the Specification

At Column 19, Line 24, change the "." before "VSD" to a ",".

In the Claims

At Column 47, Line 46, in Claim 3, remove the "," after "then through".

At Column 48, Line 45, in Claim 9, remove the "," after "reheat".

At Column 49, Line 27, in Claim 17, change "code" to "cools".

At Column 50, Line 60, in Claim 20, remove the "," after "operating".

Signed and Sealed this
Twenty-second Day of September, 2020

Andrei Iancu
*Director of the United States Patent and Trademark Office*